United States Patent
Wucherpfennig et al.

(10) Patent No.: US 12,440,451 B2
(45) Date of Patent: Oct. 14, 2025

(54) COMPOSITIONS AND METHODS USING AN EPIGENETIC INHIBITOR

(71) Applicant: DANA-FARBER CANCER INSTITUTE, INC., Boston, MA (US)

(72) Inventors: Kai Wucherpfennig, Brookline, MA (US); Rong En Tay, Boston, MA (US)

(73) Assignee: DANA-FARBER CANCER INSTITUTE, INC., Boston, MA (US)

( * ) Notice: Subject to any disclaimer, the term of this patent is extended or adjusted under 35 U.S.C. 154(b) by 1100 days.

(21) Appl. No.: 16/477,113

(22) PCT Filed: Jan. 9, 2018

(86) PCT No.: PCT/US2018/013011
§ 371 (c)(1),
(2) Date: Jul. 10, 2019

(87) PCT Pub. No.: WO2018/132391
PCT Pub. Date: Jul. 19, 2018

(65) Prior Publication Data
US 2019/0358265 A1     Nov. 28, 2019

Related U.S. Application Data
(60) Provisional application No. 62/444,703, filed on Jan. 10, 2017.

(51) Int. Cl.
| | |
|---|---|
| *A61K 9/51* | (2006.01) |
| *A61K 31/415* | (2006.01) |
| *A61K 38/17* | (2006.01) |
| *A61K 40/11* | (2025.01) |
| *A61K 40/42* | (2025.01) |
| *G01N 33/50* | (2006.01) |

(52) U.S. Cl.
CPC .............. *A61K 9/51* (2013.01); *A61K 31/415* (2013.01); *A61K 38/1709* (2013.01); *A61K 40/11* (2025.01); *A61K 40/42* (2025.01); *G01N 33/505* (2013.01); *A61K 2239/57* (2023.05); *G01N 2333/98* (2013.01)

(58) Field of Classification Search
None
See application file for complete search history.

(56) References Cited

U.S. PATENT DOCUMENTS

| | | | |
|---|---|---|---|
| 2013/0210899 A1* | 8/2013 | Wood ............... | A61K 31/00 564/163 |
| 2015/0191427 A1 | 7/2015 | Holson et al. | |
| 2015/0283101 A1 | 10/2015 | Stillman et al. | |

FOREIGN PATENT DOCUMENTS

| | | | |
|---|---|---|---|
| WO | WO-2015168614 A2 * | 11/2015 | ............ A61K 47/593 |
| WO | WO 2016/177833 A1 | 11/2016 | |

OTHER PUBLICATIONS

Hsu, F.C., et al. J. Immunol. 195:1578-1590 (Year: 2015).*
Matthews, G.M., et al. Blood 126(21):2392-2403 (Year: 2015).*
Shao, K., et al. Blood 9(1): 16-30 (Year: 2015).*
Singh et al. "Panobinostat as Pan-deacetylase Inhibitor for the Treatment of Pancreatic Cancer: Recent Progress and Future Prospects", Oncol Ther. Jun. 2016; 4(1): 73-89. (Year: 2016).*
Galvin et al. "Nanoparticle-based drug delivery: case studies for cancer and cardiovascular applications", Cell Mol Life Sci. Feb. 2012;69(3):389-404. (Year: 2012).*
Monchou Fann etal.: "Abstract" Blood, vol. 108, No. 10, Nov. 15, 2006, pp. 3363-3370.
Yasuto Araki et al.: "Histone Acetylation Facilities Rapid and Robust Memory CD8 T Cell Response through Differential Expression of Effector Molecules (Eomesodermin and Its Targets: Perforin and Granzyme B)", The Journal of Immunology, vol. 180, No. 12, Jun. 15, 2008, pp. 8102-8108.
KatrinaJ. Falkenberg et al.: "Histone Deacetylases and Their Inhibitors in Cancer, Neurological Diseases and Immune Disorders", Nature Reviews Drug Discovery, vol. 13, No. 9, Aug. 18, 2014, pp. 673-691.
Christina E. Wells et al.: "Inhibition of Histone Deacetylase 3 Cause Replication Stress in Cutaneous T Cell Lymphoma", Plos One, vol. 8, No. 7, Jul. 22, 2013, p. e68915.
Araki et al., "Genome-wide Analysis of Histone Methylation Reveals Chromatin State-Based Regulation of Gene Transcription and Function of Memory DC8+ T Cells", Immunity vol. 30, pp. 912-925, Jun. 19, 2009.
Denton et al., "Differentiation-Dependent Functional and Epigenetic landscapes for Cytokine Genes in Virus-Specific CD8+ T Cells", PNAS, vol. 108, No. 37, pp. 15306-05311, Sep. 13, 2011.
Hombach et al., "T-Cell Activation by Recombinant Receptors: CD28 Costimulation Is Required for Interleukin 2 Secretion and Receptor-Mediated T-Cell Proliferation but Does Not Affect Receptor-mediated Target Cell Lysis", Cancer Research, vol. 61, pp. 1976-1982, Mar. 1, 2001.
Vo et al., "Enhanced antitumor activity induced by adoptive T-cell transfer and adjunctive use of the Histone deacetylase inhibitor LAQ824", Cancer Research 69.22 (2009): 8693-8699.
Wang et al., "EZH2 Mediates epigenetic silencing of neuroblastoma suppressor genes CASZ1 CLU, RUNX3, and NGFR" Cancer Research 72.1 (2012): 315-324.

* cited by examiner

*Primary Examiner* — Daniel E Kolker
*Assistant Examiner* — Peter Johansen
(74) *Attorney, Agent, or Firm* — Baker Donelson

(57) ABSTRACT

Provided herein are novel methods for increasing T cell effector function in a T cell populations, as well as methods for increasing T cell effector function in a subject. The methods include contacting a T cell in a T cell population with a pharmaceutical composition comprising an antagonist of histone deacetylase 3 (HD) AC3). Also provided herein are methods for identifying a compound that modulates HDAC3 activity in cytotoxic T cells.

8 Claims, 35 Drawing Sheets
Specification includes a Sequence Listing.

COMPOSITIONS AND METHODS USING AN EPIGENETIC INHIBITOR

CROSS-REFERENCE TO RELATED APPLICATIONS

This application is a National Stage filing under 35 U.S.C. § 371 of International Patent Application No. PCT/US2018/013011, filed Jan. 9, 2018, which claims the benefit of priority of U.S. Provisional Application No. 62/444,703, filed Jan. 10, 2017, the entire disclosure of which is hereby incorporated herein by reference.

STATEMENT REGARDING FEDERALLY SPONSORED RESEARCH OR DEVELOPMENT

This invention was made with Government support under R01_CA173750 awarded by the National Institutes of Health. The Government has certain rights in the invention.

SEQUENCE LISTING

The instant application contains a Sequence Listing which has been submitted electronically in ASCII format and is hereby incorporated by reference in its entirety. Said ASCII copy, created on Nov. 1, 2022, is named 613709_DFC-013US_SL.txt and is 570 bytes in size.

FIELD

This application relates to molecules that inhibit epigenetic regulators and methods of using the same.

BACKGROUND

Activated CD8$^+$ T cells (also known as cytotoxic T cells) are an important subclass of lymphocytes in the adaptive immune system responsible for killing cancer cells and cells infected with intracellular pathogens and parasites (e.g. viruses, protozoans, or bacteria). Naïve (non-activated) CD8$^+$ T cells may be activated by interaction of a T cell receptor on the CD8$^+$ T cell with a specific peptide bound to an MHC class I molecule on an antigen presenting cell. Activated CD8$^+$ T cells can then proliferate and infiltrate cancerous or infected tissue, recognize specific antigen targets in that tissue via their T cell receptors, and then specifically destroy the infected or cancerous cells in the cancerous or infected tissue by releasing cytotoxic agents and cytokines. In the case of cancers, tumor-infiltrating lymphocytes (TIL) are thought to play a role in helping to provide an antigen-specific immune response against cancers. In particular, CD8$^+$ T cells are thought to mediate antigen-specific killing of tumorigenic cells by recognition of tumor antigens and killing of cells that express such antigens.

Some cancers have shown a positive correlation between survival and frequency of CD8$^+$ TILs, leading to attempts at treating cancers using T cell immunotherapies, including cytokine treatment, immune checkpoint blockade, chimeric antigen receptors, and adoptive T cell transfer. However, treatment success has been limited, with some tumors resisting response to immunotherapy. In some instances of adoptive T cell transfer, tumor growth often recurs despite partial success in regressing tumors, demonstrating that activated effector CD8$^+$ T cells may be eliminated (e.g. deletion) and/or inactivated (e.g. functional exhaustion) by the tumor.

Similarly, chronic tissue infections by viruses and parasites may lead to elimination and/or inactivation of CD8$^+$ T cells, allowing the infectious agent to maintain its presence in the tissue.

There is a need in the art for increasing the effectiveness of CD8$^+$ tumor-infiltrating cells in cancer treatments, as well as in infectious agent treatments, so as to improve the effectiveness of those treatments.

SUMMARY

The instant disclosure provides methods for increasing T cell effector function in a T cell population, as well as increasing T cell effector function in a subject.

In one aspect, the disclosure provides a method for increasing T cell effector function in a T cell population. The method includes the step of contacting a T cell in the T cell population with a pharmaceutical composition comprising an antagonist of histone deacetylase 3 (HDAC3).

In certain embodiment, the T cell is a CD8$^+$ T cell.

In certain embodiments, the antagonist reduces the activity of the HDAC3 protein in the T cell by at least 50%, 60%, 70%, 80%, 90%, 95%, or 99%. In certain embodiments, the half maximal inhibitory concentration (IC50) of the antagonist in reducing the activity of HDAC3 is smaller than the IC50 of the antagonist in reducing the activity of HDAC1, HDAC2, or HDAC8. In certain embodiments, the IC50 of the antagonist in reducing the activity of HDAC3 is smaller than each of the IC50s of the antagonist in reducing the activity of HDAC1, HDAC2, and HDAC8. In certain embodiments, the IC50 of the antagonist in reducing the activity of HDAC3 is smaller than each of the IC50s of the antagonist in reducing the activity of HDAC1, HDAC2, HDAC4, HDAC5, HDAC6, HDAC7, HDAC8, HDAC9, HDAC10, HDAC11, SIRT1, SIRT2, SIRT3, SIRT3, SIRT4, SIRT5, SIRT6, and SIRT7. In certain embodiments, the antagonist reduces the amount of the HDAC3 protein in the T cell by at least 50%, 60%, 70%, 80%, 90%, 95%, or 99%.

In certain embodiments, the antagonist is a compound with a molecular weight smaller than 1,000 Da. In certain embodiments, the antagonist is a compound with a molecular weight smaller than 500 Da. In certain embodiments, the antagonist is RGFP966.

In certain embodiments, the antagonist comprises nucleic acid capable of hybridizing with a nucleic acid molecule encoding HDAC3, wherein the nucleic acid inhibits the expression of HDAC3. In certain embodiments, the antagonist comprises: (a) a Cas9 protein or a polynucleotide encoding thereof; and (b) a CRISPR-Cas system guide RNA polynucleotide. In certain embodiments, the antagonist comprises an antibody or an antigen-binding fragment thereof that specifically binds HDAC3.

In certain embodiments, the pharmaceutical composition further comprises a delivery vehicle. In certain embodiments, the delivery vehicle is a nanoparticle. In certain embodiments, the nanoparticle comprises a moiety that specifically binds to a T cell. In certain embodiments, the nanoparticle comprises a moiety that specifically binds to a cytotoxic T cell.

In another aspect, the disclosure provides a method for increasing T cell effector function in a subject. The method comprising administering to the subject a therapeutically effective amount of a pharmaceutical composition comprising an antagonist of HDAC3.

In yet another aspect, the disclosure provides a method for increasing T cell effector function in a subject. The method comprises (a) contacting a T cell with a pharmaceutical composition comprising an antagonist of HDAC3 ex vivo; and (b) administering the T cell to the subject.

In certain embodiments, the T cell comprises a T cell receptor or a chimeric antigen receptor that binds specifically to an antigen associated with the disease or disorder. In certain embodiments, the T cell is a cytotoxic T cell.

In certain embodiments, the antagonist reduces the activity of the HDAC3 protein in the T cell by at least 50%, 60%, 70%, 80%, 90%, 95%, or 99%. In certain embodiments, the half maximal inhibitory concentration (IC50) of the antagonist in reducing the activity of HDAC3 is smaller than the IC50 of the antagonist in reducing the activity of HDAC1, HDAC2, or HDAC8. In certain embodiments, the IC50 of the antagonist in reducing the activity of HDAC3 is smaller than each of the IC50s of the antagonist in reducing the activity of HDAC1, HDAC2, and HDAC8. In certain embodiments, the IC50 of the antagonist in reducing the activity of HDAC3 is smaller than each of the IC50s of the antagonist in reducing the activity of HDAC1, HDAC2, HDAC4, HDAC5, HDAC6, HDAC7, HDAC8, HDAC9, HDAC10, HDAC11, SIRT1, SIRT2, SIRT3, SIRT3, SIRT4, SIRT5, SIRT6, and SIRT7.

In certain embodiments, the antagonist reduces the amount of the HDAC3 protein in the T cell by at least 50%, 60%, 70%, 80%, 90%, 95%, or 99%.

In certain embodiments, the antagonist is a compound with a molecular weight smaller than 1,000 Da. In certain embodiments, the antagonist is a compound with a molecular weight smaller than 500 Da. In certain embodiments, the antagonist is RGFP966.

In certain embodiments, the antagonist comprises an antisense oligonucleotide capable of hybridizing with a nucleic acid molecule encoding HDAC3, wherein the oligonucleotide inhibits the expression of HDAC3. In certain embodiments, the antagonist comprises: (a) a Cas9 protein or a polynucleotide encoding thereof; and (b) a CRISPR-Cas system guide RNA polynucleotide. In certain embodiments, the antagonist comprises an antibody or an antigen-binding fragment thereof that specifically binds HDAC3.

In certain embodiments, the pharmaceutical composition further comprises a nanoparticle. In certain embodiments, the nanoparticle comprises a moiety that specifically binds to a T cell. In certain embodiments, the nanoparticle comprises a moiety that specifically binds to a cytotoxic T cell.

In certain embodiments, the subject has a tumor or cancer. In certain embodiments, the tumor or cancer is selected from the group consisting of: a carcinoma: a sarcoma: a lymphoma: a germ cell tumor; and a blastoma.

In certain embodiments, the methods further comprise administering one or more cancer therapies. In certain embodiments, the cancer therapy is selected from the group consisting of an immunotherapy, a hormone therapy, a signal transduction inhibitor, a gene expression modulator, an apoptosis inducer, an angiogenesis inhibitor, and an antibody-drug conjugate, a gene therapy, and a combination thereof. In certain embodiments, the immunotherapy comprises an inhibitor of an immune checkpoint protein. In certain embodiments, the immune checkpoint protein is selected from the group consisting of PD-1, PD-L1, PD-L2, CTLA-4, TIM-3, LAG-3, VISTA, CEACAMI, TNFRSF4, and IDO. In certain embodiments, the inhibitor of an immune checkpoint protein is selected from the group consisting of nivolumab, pembrolizumab, pidilizumab, MEDI0680 (AMP-514), AMP-224, BMS-935559, MEDI4736, MPDL3280A, MSB0010718C, ipilimumab, tremelimumab, epacadostat, F001287, indoximod, and NLG919.

In certain embodiments, the immunotherapy comprises an agonist of a co-stimulatory immune receptor. In certain embodiments, the co-stimulatory immune receptor is selected from the group consisting of CD27, CD28, CD40, ICOS, OX40, GITR, and CD137.

In certain embodiments, the immunotherapy comprises a monoclonal antibody that specifically binds to a tumor antigen. In certain embodiments, the monoclonal antibody is conjugated to a cytotoxic agent. In certain embodiments, the immunotherapy comprises a cancer vaccine. In certain embodiments, the immunotherapy further comprises an adjuvant.

In another aspect, the instant disclosure provides a method for identifying a compound that modulates HDAC3 activity in cytotoxic T cells, the method comprising: obtaining a test compound that inhibits HDAC3 protein activity in a prior assay: contacting a cytotoxic T cell with the test compound; and measuring the level of one or more effector CTL markers in the cytotoxic T cell, wherein a change in the level of an effector CTL marker in the cytotoxic T cell relative to the level of the effector CTL marker in another cytotoxic T cell not contacted with the compound indicates that the compound modulates HDAC3 activity in cytotoxic T cells. In certain embodiments, the change in the level of the effector CTL marker is dose-dependent relative to the concentration of the test compound.

Any effector CTL markers can be used for the method for identifying a compound that modulates HDAC3 activity in cytotoxic T cells. In certain embodiments, the effector CTL marker is selected from the group consisting of CD44, CD69, CD25, PD-1, IFN-γ, TNF-α, IL-2, granzyme B, and Ki-67. In certain embodiments, the effector CTL marker is selected from the group consisting of CD44, CD69, CD25, PD-1, IFN-γ, TNF-α, IL-2, and granzyme B, and wherein an increase in the level the effector CTL marker indicates that the compound inhibits HDAC3 activity in cytotoxic T cells. In certain embodiments, the effector CTL marker is Ki-67, and wherein a decrease in level of the effector CTL marker indicates that the compound inhibits HDAC3 activity in cytotoxic T cells.

In another aspect, the instant disclosure provides a method for identifying a compound that modulates HDAC3 activity in cytotoxic T cells, the method comprising: obtaining a test compound that inhibits HDAC3 protein activity in a prior assay: contacting a cytotoxic T cell with the test compound; and measuring the level of acetylation of a HDAC3 substrate in the cytotoxic T cell or a lysate therefrom, wherein an increase in the level of acetylation of a HDAC substrate in the cytotoxic T cell relative to the level of acetylation of the HDAC substrate in another cytotoxic T cell not contacted with the compound or a lysate therefrom indicates that the compound inhibits HDAC3 activity in cytotoxic T cells. In certain embodiments, the change in the level of acetylation of the HDAC substrate is dose-dependent relative to the concentration of the test compound.

HDAC3 substrates are known in the art or are described in the instant disclosure. The level of acetylation of any HDAC3 substrates can be measured in the method for identifying a compound that modulates HDAC3 activity in cytotoxic T cells. In certain embodiments, the HDAC3 substrate is a histone in the cytotoxic T cell. In certain embodiments, the histone acetylation is detected at the lysine residues 9 and/or 27 of histone 3. In certain embodiments, the histone acetylation is detected in a transcription regulatory region of one or more effector CTL markers. In certain embodiments, the effector CTL marker is selected from the group consisting of CD44, CD69, CD25, PD-1, TBX21, RUNX3, NFATC1, PRDM1, STAT1, ID2, EOMES, BCL6, IFN-γ, TNF-α, IL-2, granzyme A, granzyme B, PRF1, and FASL. In certain embodiments, the HDAC3 substrate is a synthetic peptide conjugated to a detectable label. The detectable label can be any label (e.g., a non-natural label) that permits detection of acetylation of de-acetylation in a sample, such as a fluorescent label (e.g., a fluorescence donor, a fluorescence quencher). In certain embodiments, the activity of HDAC3 is measured in a live or fixed cytotoxic T cell. In certain embodiments, the activity of HDAC3 is measured in a lysate from a cytotoxic T cell. In certain embodiments, the activity of HDAC3 is measured in a solution purified from a lysate from a cytotoxic T cell.

In certain embodiments of any one of the foregoing aspects of method for identifying a compound that modulates HDAC3 activity in cytotoxic T cells, the cytotoxic T cell has been activated prior to contacting with the test compound. Alternatively or additionally, in certain embodiments of any one of the foregoing aspects of method for identifying a compound that modulates HDAC3 activity in cytotoxic T cells, the method further comprises activating the cytotoxic T cell. Methods of activating cytotoxic T cells are known in the art, and some are described in the instant disclosure. In certain embodiments, the cytotoxic T cell has been or is activated by contacting with an antigen-presenting cell that presents an antigen specifically binding to the T cell receptor (TCR) expressed by the cytotoxic T cell. In certain embodiments, the antigen-presenting cell is a bone marrow-derived dendritic cell (BMDC). In certain embodiments, the cytotoxic T cell has been or is activated by an agent that directly or indirectly crosslinks TCR (e.g., an antibody that specifically binds to CD3, or phytohemagglutinin). In certain embodiments, the cytotoxic T cell has been or is contacted with one or more cytokines (e.g., IL-2) or other molecules (e.g., an antibody that specifically binds to CD28) that promotes or facilitates the effector function of cytotoxic T cells.

The foregoing aspects of method for identifying a compound that modulates HDAC3 activity in cytotoxic T cells require that the test compound inhibits HDAC3 protein activity in a prior assay. In certain embodiments, the prior assay is a cell-free assay. In certain embodiments, the cell-free assay is a biochemical assay for measuring the enzymatic activity of purified HDAC3 protein. Such cell-free assays are known in the art, and may comprise a substrate, In certain embodiments, the test compound is a small molecule compound. In certain embodiments, comprising examining at least five (e.g., at least 10, 15, 20, 25, 30, 40, 50, 60, 70, 80, 90, 100, 150, 200, 250, 300, 400, 500, 600, 700, 800, 900, 1,000, 1,500, 2,000, 2,500, 3,000, 4,000, 5,000, 6,000, 7,000, 8,000, 9,000, or 10,000) compounds.

BRIEF DESCRIPTION OF THE DRAWINGS

FIG. 10B, bottom panel, shows immunoblots for HDAC3 protein and GAPDH in CD8$^+$ and CD4$^+$ cells from HDAC3-wildtype and HDAC3-CD8 cKO mice.

DETAILED DESCRIPTION

Figure 1:
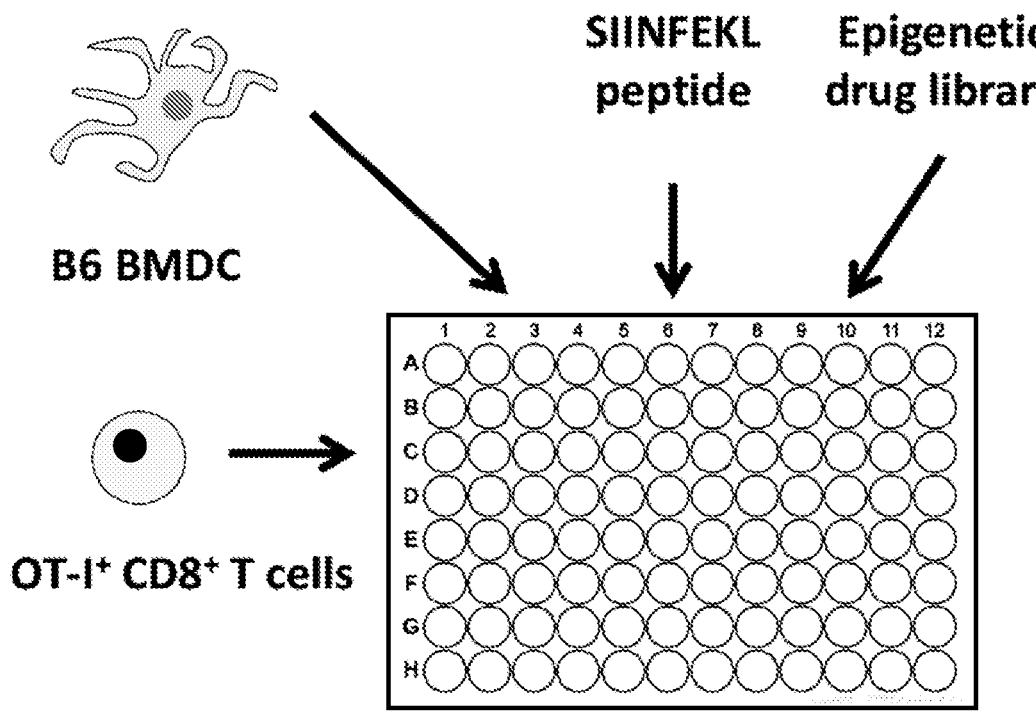
FIG. 1 is a schematic diagram an epigenetic inhibitor screening process using an in vitro CD8$^+$ T cell activation assay.

It is to be understood that the methods described in this disclosure are not limited to particular methods and experimental conditions disclosed herein, as such methods and conditions may vary. It is also to be understood that the terminology used herein is for the purpose of describing particular embodiments only, and is not intended to be limiting.

Furthermore, the experiments described herein, unless otherwise indicated, use conventional molecular and cellular biological and immunological techniques within the skill of the art. Such techniques are well known to the skilled worker, and are explained fully in the literature. See, e.g., Ausubel, et al., ed., Current Protocols in Molecular Biology, John Wiley & Sons, Inc., NY, N.Y. (1987-2008), including all supplements, Molecular Cloning: A Laboratory Manual (Fourth Edition) by MR Green and J. Sambrook and Harlow et al., Antibodies: A Laboratory Manual, Chapter 14, Cold Spring Harbor Laboratory, Cold Spring Harbor (2013, 2$^{nd}$ edition), each of which is incorporated by reference herein.

I. Definitions

Unless otherwise defined herein, scientific and technical terms used herein have the meanings that are commonly understood by those of ordinary skill in the art. In the event of any latent ambiguity, definitions provided herein take precedent over any dictionary or extrinsic definition. Unless otherwise required by context, singular terms shall include pluralities and plural terms shall include the singular. The use of "or" means "and/or" unless stated otherwise. The use of the term "including", as well as other forms, such as "includes" and "included", is not limiting.

Generally, nomenclatures used in connection with cell and tissue culture, molecular biology, immunology, microbiology, genetics, protein and nucleic acid chemistry, and hybridization described herein are those well-known and commonly used in the art. The methods and techniques provided herein are generally performed according to conventional methods well known in the art and as described in various general and more specific references that are cited and discussed throughout the present specification unless otherwise indicated. Enzymatic reactions and purification techniques are performed according to manufacturer's specifications, as commonly accomplished in the art or as described herein. The nomenclatures used in connection with, and the laboratory procedures and techniques of, analytical chemistry, synthetic organic chemistry, and medicinal and pharmaceutical chemistry described herein are those well-known and commonly used in the art. Standard techniques are used for chemical syntheses, chemical analyses, pharmaceutical preparation, formulation, and delivery, and treatment of subjects.

That the disclosure may be more readily understood, select terms are defined below.

As used herein, the term "increasing T cell effector function" refers to the increased ability of a T cell population to recognize one or more specific antigens on a target cell type, to express or release molecules following recognition of the antigen on a target cell type, and/or to have an increased cytotoxic effect against a target cell type. For example, increasing T cell effector function in a T cell population may include increasing the activation of a population of T cells by increasing proliferation of the population of T cells, increasing the cytotoxic activity of the T cell population for one or more antigenic targets (e.g. a tumor cell), and/or increasing the secretion or expression of effector molecules by the T cell population (e.g. cytotoxic molecules such as perforin, granzymes, or Fas ligand: or cytokines such as TNF-α, TNF-beta, or IFN-γ).

As used herein, the term "antagonist" refers to a molecule that interacts with and inhibits the biochemical activity of another molecule. For example, a small molecule may interact with an enzyme (e.g. HDAC3) and inhibit the enzyme's catalytic activity. In another example a protein (e.g. antibody) may interact with another protein (e.g. a signaling molecule) and inhibit the ability of the signaling molecule to interact with its target. In another example, an antagonist may be a nucleic acid molecule hybridizes with a nucleic acid encoding the protein, thereby inhibiting the expression of that protein.

As used herein, the term "agonist" refers to a molecule that interacts with and increases the biochemical activity of another molecule. For example, a molecule may directly or indirectly interact with an enzyme or transcription factor (e.g. RUNX3) and increase the enzyme's catalytic activity or increase the activity of the transcription factor. In another example a protein (e.g. antibody) may interact with another protein (e.g. a signaling molecule) and increase the ability of the signaling molecule to interact with its target.

As used herein, the phrase "administered simultaneously" or "simultaneous administration" refers to administration of a second molecule to a subject or cells in vitro at the same time a first molecule is administered. The second molecule may be in the same pharmaceutical composition or in a different pharmaceutical composition as the first molecule.

As used herein, the phrase "administered sequentially" or "sequential administration" refers to administration of a second molecule to a subject or cells in vitro at a different time a first molecule is administered. The second molecule may be administered before or after the first molecule is administered.

As used herein, the term "effector CTL marker" refers to any marker that is present differentially (e.g., higher, lower, or in a different isoform) in a cytotoxic T lymphocyte (CTL) with an effector function, relative to, for example, a naïve $CD8^+$ T cell, a memory CTL, or a CTL with a reduced effector function. Effector CTL markers are well known in the art. Exemplary effector CTL markers include without limitation CD44, CD69, CD25, PD-1, transcription factors (e.g., TBX21, RUNX3, NFATC1, PRDM1, STAT1, ID2, EOMES, or BCL6), effector cytokines (e.g., IFN-γ, TNF-α, or IL-2), cytotoxic factors (e.g., granzyme A, granzyme B, PRF1 (Perforin), or FASL), and cell proliferation markers (e.g., Ki-67). The levels of expression markers can be measured as the percentage of cells expressing the marker at a level above a threshold (e.g., by flow cytometry): the levels of markers that are secreted into the culture media can be measured as the amount of the marker in each cell culture (e.g., by ELISA). More methods of measuring the levels of effector CTL markers are known in the art, e.g., as described in the example section herein.

As used herein, the term "small molecule" refers to a molecule with a molecular weight smaller than 1,000 Da.

As used herein, the term "agonist" refers to a molecule that initiates a physiological response when interacting with a receptor. For example, a small molecule or a protein (e.g. an agonistic anti-CD40 antibody) may interact with a receptor (e.g. a PD-1 cell surface receptor) to cause a conformational change in the receptor, thereby activating the receptor.

As used herein, the term "therapeutically effective amount" refers to an amount of a compound or composition effective to "treat" a disease or disorder in a subject or mammal.

As used herein, "treating" or "treatment" or "alleviation" refers to both therapeutic treatment and prophylactic or preventative measures: wherein the object is to prevent or slow down (lessen) the targeted pathologic condition or disorder. Those in need of treatment include those already with the disorder as well as those prone to have the disorder or those in whom the disorder is to be prevented. A subject or mammal is successfully "treated" for a cancer if, after receiving a therapeutic amount of an HDAC3 inhibitor according to the methods of the present disclosure, the subject shows observable and/or measurable reduction in or absence of one or more of the following: reduction in tumor size, reduction in metastasis, and/or relief to some extent, of one or more of the symptoms associated with the disease: reduced morbidity and mortality, and improvement in quality of life issues. The above parameters for assessing successful treatment and improvement in the disease are readily measurable by routine procedures familiar to a physician.

As used herein, the term "immunotherapy" refers to therapeutic agents that induce the immune system to target cancer cells. As used herein, immunotherapies include monoclonal antibodies, immune checkpoint inhibitors, T cell receptor therapy, and chimeric antigen receptor therapy.

The term "chimeric antigen receptor" (CAR) refers to an engineered receptor expressed by a cell (e.g. a T cell) that includes an extracellular binding domain (e.g. a single-chain variable fragment), a transmembrane domain (e.g. CD3-zeta transmembrane domain), and an intracellular signaling domain (e.g. CD3-zeta signaling domain) such that interaction of a molecule (e.g. an antigen) with the binding domain causes activation of the signaling domain inside the cell, thereby causing the cell to change behavior.

The phrase "antigen associated with the disease or disorder" refers to a molecule that can induce a response in an immune cell (e.g. T cell, CAR-T cell), such as activation of T cell. The antigen may be a protein from a tumor cell or from an infectious agent (e.g. virus, bacteria, or parasite).

The term "hormone therapy" refers to therapeutic agents, surgeries, and procedures that reduce the levels of hormones that stimulate cancer cell proliferation.

As used herein, the term "signal transduction inhibitor" refers to therapeutic agents that inhibit proteins that stimulate cancer cell proliferation. Examples include, but are not limited to, epidermal growth factor receptor (EGFR) inhibitors, human epidermal growth factor receptor 2 (HER2) inhibitors, BCR-ABL tyrosine-kinase inhibitors (TKI), anaplastic lymphoma kinase (ALK) inhibitors, and B-RAF inhibitors.

"Gene expression modulator" refers to a therapeutic agent that reduces the expression of a gene that increases cancer cell proliferation. The gene expression modulator may modulate gene expression at the level of transcription by DNA-binding agents, small molecules, or synthetic oligonucleotides. Alternatively, the gene expression modulator may modulate gene expression post-transcriptionally via RNA interference.

"Apoptosis inducer" refers to therapeutic drugs that induce apoptosis in cancer cells. For example, proteasome inhibitors prevent degradation of proteins that would otherwise induce apoptosis.

"Angiogenesis inhibitor" refers to therapeutic agents that prevent formation of new blood vessels in tumors. For example, angiogenesis inhibitors may target vascular endothelial growth factor (VEGF).

"Antibody-drug conjugate" refers to an antibody or antibody fragment that is chemically and stably linked to a biological active cytotoxic agent or drug.

As used herein the term "cytotoxic agent" refers to any molecule that can cause cell death and/or prevent cell replication. Exemplary cytotoxic agents include, without limitation, chemotherapeutic agents (e.g. methotrexate, placlitaxel, brentuximab, or doxirubicin), radioactive particles (e.g. yttrium-90 or iodine-131).

The term "cancer vaccines" is used herein to refer to therapeutic agents that target viruses that cause cancers.

The term "gene therapy," as used herein, refers to administration of oncolytic agents, such as viruses that are genetically engineered to target and destroy cancer cells.

As used herein, the term "carcinoma" refers to a cancer derived from epithelial tissue.

As used herein, the term "sarcoma" refers to a cancer derived from connective or non-epithelial tissue.

As used herein, the term "lymphoma" refers to a cancer of cells derived from the lymph nodes.

As used herein, the term "germ cell tumor" refers to a tumor derived from germ cells.

As used herein, the term "blastoma" refers to a cancer derived from a precursor cells.

As used herein, the phrase "pharmaceutically acceptable" or "therapeutically acceptable" refers to molecular entities and compositions that are physiologically tolerable and preferably do not typically produce an allergic or similar untoward reaction, such as gastric upset, dizziness and the like, when administered to a human. Preferably, as used herein, the term "pharmaceutically acceptable" means approved by a regulatory agency of the Federal or a State government or listed in the U.S. Pharmacopeia or other generally recognized pharmacopeia (e.g., Remington's Pharmaceutical Sciences) for use in animals, and more particularly in humans.

As used herein, the term "specifically bind" or "specific binding" refers to non-covalent or covalent interaction between a first molecule type (e.g. a small molecule, an antibody, or a nucleic acid sequence) and a second molecule type (e.g. an enzyme, a receptor, or a complementary nucleic acid). The first molecule type has a much higher likelihood of binding to the second molecule type relative to other types of molecules. For example, a small molecule that specifically binds to an enzyme has a much higher likelihood of binding to a particular enzyme or enzyme type (e.g. HDAC3), and a much lower likelihood of binding to different enzymes or enzyme types (e.g. SIRT7). In another example, a nucleic acid probe with a certain nucleotide sequence has a much higher likelihood of binding a nucleic acid target having a nucleotide sequence complementary to that of the nucleic acid probe.

Conversely, the nucleic acid probe has a much lower likelihood of binding to other nucleic acids with a nucleotide sequence that is not complementary.

The terms "nucleic acid" and "polynucleotide" are used interchangeably herein to refer to a polymer of two or more nucleotides or nucleotide analogues (such as ribonucleic acid having methylene bridge between the 2'-O and 4-C atoms of the ribose ring) capable of hybridizing to a complementary nucleic acid. As used herein, this term includes, without limitation, single- or double-stranded DNA, RNA, LNA, and PNA or mixed polymers. Nucleic acids may include genomic sequences, extra-genomic and plasmid sequences, and smaller engineered gene segments that express, or may be adapted to express, polypeptides.

II. Histone Deacetylase

Histone deacetylase 3 (HDAC3) is an enzyme that removes acetylase from lysine residues on the N-terminal of core histones H2A, H2B, H3, and H4 to change chromosome structure and thereby reduce the access of transcription factors to chromosomal DNA. Deacetylated histones act as epigenetic transcriptional repressors. Histone deacetylases may be classified in several classes: class I (includes HDAC1-3 and HDAC8), class IIA (includes HDAC 4-5, HDAC7, HDAC9), class IIB (includes HDAC6 and HDAC10), class III (includes SIRT1-7), and class IV (HDAC11). HDAC3 localizes to the nucleus of cells and is ubiquitous in tissues throughout the body. HDAC3 has been shown to be involved in the regulation of gene transcription and change in function of $CD8^+$ T cells between a memory function and an effector function (see Proc Natl Acad Sci USA. 2011 Sep. 13: 108 (37): 15306-11; and Immunity 2009 Jun. 19: 30 (6): 912-25, incorporated by reference herein).

In some embodiments of the HDAC3 inhibitors described herein, the inhibitor may reduce the activity of the HDAC3 protein by at least 50%, 60%, 70%, 80%, 90%, 95%, or 99%. In some embodiments, the half maximal inhibitory concentration (IC50) of the HDAC3 inhibitor in reducing the activity of HDAC3 protein is smaller than the IC50 of the HDAC3 inhibitor in reducing the activity of HDAC1, HDAC2, or HDAC8. In some embodiments, the IC50 of the HDAC3 inhibitor in reducing the activity of HDAC3 is smaller than each of the IC50s of the HDAC3 inhibitor in reducing the activity of HDAC1, HDAC2, and HDAC8. In some embodiments, the IC50 of the antagonist in reducing the activity of HDAC3 is smaller than each of the IC50s of the antagonist in reducing the activity of HDAC1, HDAC2, HDAC4, HDAC5, HDAC6, HDAC7, HDAC8, HDAC9, HDAC10, HDAC11, SIRT1, SIRT2, SIRT3, SIRT3, SIRT4, SIRT5, SIRT6, and SIRT7.

III. Methods of Use

In one aspect, the instant disclosure provides a method of treating a subject using the HDAC3 inhibitors and pharmaceutical compositions disclosed herein. Any disease or disorder in a subject that would benefit from inhibition of HDAC3 can be treated using the HDAC3 inhibitors disclosed herein, including cancer and infectious diseases. The HDAC3 inhibitors disclosed herein are particularly useful for activating $CD8^+$ T cells, and accordingly can be used as a therapy for subjects with cancer or infectious diseases. For example, in certain embodiments, the instant disclosure provides a method of increasing T-cell activation in response to an antigen in a subject, the method comprising administering to the subject an effective amount of an HDAC3 inhibitor or pharmaceutical composition thereof, as disclosed herein. In certain embodiments, the instant disclosure provides a method of treating cancer in a subject, the method comprising administering to the subject an effective amount of the antibody or pharmaceutical composition, as disclosed herein. In certain embodiments, the subject has previously received a cancer therapy. In certain embodiments, the subject has not previously received any cancer therapy. In certain embodiments, the cancer is an advanced or metastatic cancer.

Cancer Types for Treatment

Cancers that can be treated with an HDAC3 inhibitor or pharmaceutical compositions disclosed herein include, without limitation, solid cancer (e.g., relapsed or refractory solid cancer, and advanced or metastatic solid cancer), carcinoma, sarcoma, melanoma (e.g., stage III or stage IV melanoma), small cell lung cancer, non-small cell lung cancer, urothelial cancer, ovarian cancer, prostate cancer (e.g., metastatic hormone-refractory prostate cancer and progressive metastatic prostate cancer), pancreatic cancer, breast cancer (e.g., $HER2^+$ breast cancer or relapsed/refractory $HER2^+$ breast cancer)), head and neck cancer (e.g., relapsed/refractory head and neck squamous cell carcinoma (HNSCC)), glioma, malignant glioma, glioblastoma multiforme, brain metastasis, Merkel cell cancer, gastric cancer, gastroesophageal cancer, renal cell carcinoma, uveal melanoma, colon cancer, cervical cancer, lymphoma (e.g., relapsed or refractory lymphoma), non-Hodgkin's lymphoma, Hodgkin's lymphoma, leukemia, and multiple myeloma. In certain embodiments, the cancer is treated with intratumoral administration of the HDAC3 inhibitors disclosed herein. Cancers that can be treated with intratumoral administration of the HDAC3 inhibitors or pharmaceutical compositions disclosed herein include, without limitation, solid tumors (e.g., advanced or metastatic solid tumors), head and neck cancer (e.g., relapsed/refractory head and neck squamous cell carcinoma (HNSCC)), and breast cancer (e.g., $HER2^+$ breast cancer (e.g., relapsed/refractory $HER2^+$ breast cancer)).

Additional cancers that can be treated with the HDAC3 inhibitors or pharmaceutical compositions disclosed herein include, without limitation, B cell lymphomas (e.g., B cell chronic lymphocytic leukemia, B cell non-Hodgkin lymphoma, cutaneous B cell lymphoma, diffuse large B cell lymphoma), basal cell carcinoma, bladder cancer, blastoma, brain metastasis, breast cancer, Burkitt lymphoma, carcinoma (e.g., adenocarcinoma, such as at the gastroesophageal junction), cervical cancer, colon cancer, colorectal cancer (colon cancer and rectal cancer), endometrial carcinoma, esophageal cancer, Ewing sarcoma, follicular lymphoma, gastric cancer, gastroesophageal junction carcinoma, gastrointestinal cancer, glioblastoma (e.g., glioblastoma multiforme, newly diagnosed or recurrent), glioma, head and neck cancer (e.g., head and neck squamous cell carcinoma), hepatic metastasis, Hodgkin's and non-Hodgkin's lymphoma, kidney cancer (e.g., renal cell carcinoma and Wilms' tumors), laryngeal cancer, leukemia (e.g., chronic myelocytic leukemia, hairy cell leukemia), liver cancer (e.g., hepatic carcinoma and hepatoma), lung cancer (e.g., non-small cell lung cancer and small-cell lung cancer), lymphoblastic lymphoma, lymphoma, mantle cell lymphoma, metastatic brain tumor, metastatic cancer, myeloma (e.g., multiple myeloma), neuroblastoma, ocular melanoma, oropharyngeal cancer, osteosarcoma, ovarian cancer, pancreatic cancer (e.g., pancreatic ductal adenocarcinoma), prostate cancer (e.g., hormone refractory (e.g., castration resistant), metastatic, metastatic hormone refractory (e.g., castration resistant, androgen independent)), renal cell carcinoma (e.g., metastatic), salivary gland carcinoma, sarcoma (e.g., rhabdomyosarcoma), skin cancer (e.g., melanoma (e.g., metastatic melanoma)), soft tissue sarcoma, solid tumor, squamous cell carcinoma, synovia sarcoma, testicular cancer, thyroid cancer, transitional cell cancer (urothelial cell cancer), uveal melanoma (e.g., metastatic), verrucous carcinoma, vulval cancer, and Waldenstrom macroglobulinemia.

In some embodiments, the cancer treated in accordance with the methods described herein is a human sarcoma or carcinoma, e.g., fibrosarcoma, myxosarcoma, liposarcoma, chondrosarcoma, osteogenic sarcoma, chordoma, angiosarcoma, endotheliosarcoma, lymphangiosarcoma, lymphangioendotheliosarcoma, synovioma, mesothelioma, Ewing's tumor, leiomyosarcoma, rhabdomyosarcoma, colon carcinoma, pancreatic cancer, breast cancer, ovarian cancer, prostate cancer, squamous cell carcinoma, basal cell carcinoma, adenocarcinoma, sweat gland carcinoma, sebaceous gland carcinoma, papillary carcinoma, papillary adenocarcinomas, cystadenocarcinoma, medullary carcinoma, bronchogenic carcinoma, renal cell carcinoma (e.g., metastatic), hepatoma, bile duct carcinoma, choriocarcinoma, seminoma, embryonal carcinoma, Wilms' tumor, cervical cancer, testicular tumor, lung carcinoma, small cell lung carcinoma, bladder carcinoma, epithelial carcinoma, glioma, glioblastoma multiforme, astrocytoma, medulloblastoma, craniopharyngioma, ependymoma, pinealoma, hemangioblastoma, acoustic neuroma, oligodendroglioma, meningioma, melanoma, neuroblastoma, or retinoblastoma. In certain embodiments, the cancer treated in accordance with the methods described herein is an acute lymphocytic leukemia or acute myelocytic leukemia (e.g., myeloblasts, promyelocytic, myelo monocytic, monocytic, and erythroleukemia): chronic leukemia (chronic myelocytic (granulocytic) leukemia or chronic lymphocytic leukemia): Hodgkin's disease: non-Hodgkin's disease: acute myeloid leukemia: B-cell lymphoma: T-cell lymphoma: anaplastic large cell lymphoma: intraocular lymphoma: follicular lymphoma: small intestine lymphoma: or splenic marginal zone lymphoma. In certain embodiments, the cancer treated in accordance with the methods described herein is multiple myeloma, Waldenstrom's macroglobulinemia, heavy chain disease, gastrointestinal stromal tumors, head and/or neck cancer (e.g., squamous cell carcinoma of the hypopharynx, squamous cell carcinoma of the larynx, cell carcinoma of the oropharynx, or verrucous carcinoma of the larynx), endometrial stromal sarcoma, mast cell sarcoma, adult soft tissue sarcoma, uterine sarcoma, Merkel cell carcinoma, urothelial carcinoma, melanoma with brain metastases, uveal melanoma, uveal melanoma with liver metastases, non-small cell lung cancer, rectal cancer, or myelodysplastic syndrome. In some embodiments, the cancer treated in accordance with the methods is metastatic.

In certain embodiments, the cancer treated in accordance with the methods described herein includes prostate cancer, breast cancer, lung cancer, colorectal cancer, melanoma, bronchial cancer, bladder cancer, brain or central nervous system cancer, peripheral nervous system cancer, uterine or endometrial cancer, cancer of the oral cavity or pharynx, non-Hodgkin's lymphoma, thyroid cancer, kidney cancer, biliary tract cancer, small bowel or appendix cancer, salivary gland cancer, thyroid gland cancer, adrenal gland cancer, squamous cell cancer, mesothelioma, osteocarcinoma, thyoma/thymic carcinoma, glioblastoma, myelodysplastic syndrome, soft tissue sarcoma, diffuse intrinsic pontine glioma (DIPG), adenocarcinoma, osteosarcoma, chondrosarcoma, leukemia, or pancreatic cancer. In some embodiments, the cancer treated in accordance with the methods described herein includes a carcinoma (e.g., an adenocarcinoma), lymphoma, blastoma, melanoma, sarcoma, or leukemia. In certain embodiments, the cancer treated in accordance with the methods described herein includes squamous cell cancer, small-cell lung cancer, non-small cell lung cancer, gastrointestinal cancer, Hodgkin's lymphoma, non-Hodgkin's lymphoma, pancreatic cancer, glioblastoma, glioma, cervical cancer, ovarian cancer, liver cancer (e.g., hepatic carcinoma and hepatoma), bladder cancer, breast cancer, inflammatory breast cancer, Merkel cell carcinoma, colon cancer, colorectal cancer, stomach cancer, urinary bladder cancer, endometrial carcinoma, myeloma (e.g., multiple myeloma), salivary gland, carcinoma, kidney cancer (e.g., renal cell carcinoma and Wilms' tumors), basal cell carcinoma, melanoma, prostate cancer, vulval cancer, thyroid cancer, testicular cancer, esophageal cancer, serous adenocarcinoma or various types of head and neck cancer. In certain embodiments, the cancer treated in accordance with the methods described herein includes desmoplastic melanoma, inflammatory breast cancer, thymoma, rectal cancer, anal cancer, or surgically treatable or non-surgically treatable brain stem glioma. In a specific embodiment, the cancer is a solid tumor.

Infectious Disease Treatments

In certain embodiments, the instant disclosure provides a method of preventing or treating an infectious disease in a subject, the method comprising administering to the subject an effective amount of an HDAC3 inhibitor or pharmaceutical composition thereof, as disclosed herein. In one embodiment, provided herein are methods for preventing and/or treating an infection (e.g., a viral infection, a bacterial infection, a fungal infection, a protozoal infection, or a parasitic infection). The infection prevented and/or treated in accordance with the methods can be caused by an infectious agent identified herein. In a specific embodiment, an HDAC3 inhibitor described herein or a composition thereof is the only active agent administered to a subject. In some embodiments, an HDAC3 inhibitor described herein or a composition thereof is used in combination with anti-infective interventions (e.g., antivirals, antibacterials, antifungals, or anti-helminthics) for the treatment of infectious diseases.

Infectious diseases that can be treated and/or prevented by HDAC3 inhibitors or pharmaceutical compositions disclosed herein are caused by infectious agents including but not limited to bacteria, parasites, fungi, protozae, and viruses. In a specific embodiment, the infectious disease treated and/or prevented by HDAC3 inhibitors or pharmaceutical compositions disclosed herein is caused by a virus. Viral diseases or viral infections that can be prevented and/or treated in accordance with the methods described herein include, but are not limited to, those caused by hepatitis type A, hepatitis type B, hepatitis type C, influenza (e.g., influenza A or influenza B), varicella, adenovirus, herpes simplex type I (HSV-I), herpes simplex type II (HSV-II), rinderpest, rhinovirus, echovirus, rotavirus, respiratory syncytial virus, papilloma virus, papovavirus, cytomegalovirus, echinovirus, arbovirus, huntavirus, coxsackie virus, mumps virus, measles virus, rubella virus, polio virus, small pox, Epstein Barr virus, human immunodeficiency virus type I (HIV-I), human immunodeficiency virus type II (HIV-II), and agents of viral diseases such as viral meningitis, encephalitis, dengue or small pox.

Bacterial infections that can be prevented and/or treated include infections caused by *Escherichia coli, Klebsiella pneumoniae, Staphylococcus aureus, Enterococcus faecalis, Proteus vulgaris, Staphylococcus viridans*, and *Pseudomonas aeruginosa*. Bacterial diseases caused by bacteria (e.g., *Escherichia coli, Klebsiella pneumoniae, Staphylococcus aureus, Enterococcus faecalis, Proteus vulgaris, Staphylococcus viridans*, and *Pseudomonas aeruginosa*) that can be prevented and/or treated in accordance with the methods described herein include, but are not limited to, Mycobacteria *rickettsia, Mycoplasma, Neisseria, S. pneumonia, Borrelia burgdorferi* (Lyme disease), *Bacillus antracis* (anthrax), tetanus, *Streptococcus, Staphylococcus, mycobacterium*, pertissus, cholera, plague, diphtheria, *chlamydia, S. aureus* and *legionella*.

Protozoal diseases or protozoal infections caused by protozoa that can be prevented and/or treated in accordance with the methods described herein include, but are not limited to, *leishmania*, coccidiosis, *Trypanosoma Schistosoma* or malaria. Parasitic diseases or parasitic infections caused by parasites that can be prevented and/or treated in accordance with the methods described herein include, but are not limited to, *chlamydia* and *rickettsia*.

Fungal diseases or fungal infections that can be prevented and/or treated in accordance with the methods described herein include, but are not limited to, those caused by *Candida* infections, zygomycosis, *Candida mastitis*, progressive disseminated trichosporonosis with latent trichosporonemia, disseminated candidiasis, pulmonary paracoccidioidomycosis, pulmonary aspergillosis, *Pneumocystis carinii* pneumonia, cryptococcal meningitis, coccidioidal meningoencephalitis and cerebrospinal vasculitis, *Aspergillus niger* infection, *Fusarium* keratitis, paranasal sinus mycoses, *Aspergillus fumigatus* endocarditis, tibial dyschondroplasia, *Candida glabrata* vaginitis, oropharyngeal candidiasis, X-linked chronic granulomatous disease, tinea pedis, cutaneous candidiasis, mycotic placentitis, disseminated trichosporonosis, allergic bronchopulmonary aspergillosis, mycotic keratitis, *Cryptococcus neoformans* infection, fungal peritonitis, *Curvularia geniculata* infection, staphylococcal endophthalmitis, sporotrichosis, and dermatophytosis.

In certain embodiments, the infectious disease is acute. In certain embodiments, the infectious disease is chronic. In certain embodiments, the infectious disease is caused by flavivirus, e.g., West Nile virus, Saint Louis encephalitis virus, Powassan virus, tick-borne encephalitis virus, dengue virus, zika virus, Kyasanur Forest disease virus, yellow fever virus, and chikungunya virus. In certain embodiments, the infectious disease is caused by Ebola virus. In certain embodiments, the infectious disease is caused by influenza virus. In certain embodiments, the infectious disease is caused by human immunodeficiency virus (HIV), hepatitis B virus (HBV) or hepatitis C virus (HCV). In certain embodiments, the HDAC3 inhibitor or pharmaceutical composition thereof, as disclosed herein, promotes viral control. In certain embodiments, the HDAC3 inhibitor or pharmaceutical composition thereof, as disclosed herein, eliminates viral reservoirs.

The present invention relates in one aspect to an HDAC3 inhibitor disclosed herein and/or a pharmaceutical composition comprising an HDAC3 inhibitor disclosed herein and a pharmaceutically acceptable carrier or excipient, for use as a medicament.

The present invention relates, in one aspect, to an HDAC3 inhibitor disclosed herein, and/or its use in combination with pharmaceutically acceptable carriers or excipients, for preparing pharmaceutical compositions or medicaments for immunotherapy (e.g., an immunotherapy for increasing T-cell activation in response to an antigen in a subject, treating cancer, or treating or preventing infectious diseases).

The present disclosure relates in one aspect to an HDAC3 inhibitor of the disclosure and/or a pharmaceutical composition of the disclosure comprising an HDAC3 inhibitor described herein and a pharmaceutically acceptable carrier or excipient, for use in a method for the treatment of cancer.

The present invention relates in one aspect to an HDAC3 inhibitor of the disclosure and/or a pharmaceutical composition of the disclosure comprising an HDAC3 inhibitor of the disclosure and a pharmaceutically acceptable carrier or excipient, for use in a method for activating CD8$^+$ T cells against tumors and/or for therapy for subjects with cancer.

The present invention relates in one aspect to an HDAC3 inhibitor of the disclosure and/or a pharmaceutical composition of the disclosure comprising an HDAC3 inhibitor of the disclosure and a pharmaceutically acceptable carrier or excipient, for use in a method for the treatment of an infectious disease.

Cancer Therapies

The HDAC3 inhibitor may be administered with one or more cancer therapies, including an immunotherapy, a hormone therapy, a signal transduction inhibitor, a gene expression modulator, an apoptosis inducer, an angiogenesis inhibitor, and an antibody-drug conjugate, a cancer vaccine, and a gene therapy. According to some embodiments, the immunotherapy is a T cell receptor (TCR) therapy targeting a tumor antigen associated with the cancer, such as an isolated recombinant TCR. In some cases, the immunotherapy is a chimeric antigen receptor (CAR) therapy targeting the tumor antigen. The immunotherapy may be a monoclonal antibody targeting the tumor antigen, and may be conjugated to a chemotherapy drug or a radioactive particle. According to some embodiments, the immunotherapy is an inhibitor of a checkpoint protein.

The methods of the present disclosure contemplate administration of HDAC3 inhibitors with one or more cancer therapies. Cancer therapies include, but are not limited to: immunotherapies, such as monoclonal antibodies, bispecific antibodies that target a tumor antigen and an immune cell-specific protein, immune checkpoint inhibitors, T cell receptor therapy, and chimeric antigen receptor therapy: hormone therapy: signal transduction inhibitors: gene expression modulators: apoptosis inducers: angiogenesis inhibitors: antibody-drug conjugates, cancer vaccines, and gene therapies.

Monoclonal antibody immunotherapy includes administration of monoclonal antibodies that bind antigens on cancer cells, inducing an immune response, e.g.

alumtuzumab; and antibodies that bind growth factors and growth factor receptors, inhibiting cancer cell proliferation, e.g. trastuzumab.

T Cell Receptor (TCR) Therapy

In an embodiment, TCR therapy is administered. The TCR therapy may be an isolated recombinant TCR. Alternatively, the TCR therapy comprises a cell expressing a recombinant TCR on the surface that specifically binds to a major histocompatibility complex (MHC) molecule complexed with one or more tumor antigens. Recombinant TCR-expressing cells may be generated by methods known in the art. Host T cells may be isolated from a subject having cancer or expressing tumor antigens and transfected or transduced with nucleic acid constructs encoding a recombinant TCR, then administered to the subject from whom they were isolated (Hombach, et al. 2001, Cancer Res. 61:1976-1982, incorporated by reference herein in its entirety).

An alternative approach is to infuse a subject with a polyclonal T cell product. Monocytic cells or dendritic cells may be electroporated with mRNA encoding tumor antigens, and co-cultured in vivo with T cells to produce polyclonal T cells. Alternatively, the DCs with mRNA encoding tumor antigens can be administered to a subject directly as a vaccine composition.

Chimeric Antigen Receptor (CAR) Therapies

In an embodiment of the present disclosure, CAR therapy is administered. The CAR therapy may comprise a cell expressing a chimeric antigen receptor on the surface that specifically binds to a tumor antigen. CAR-expressing cells may be generated by methods known in the art, and may be administered to the subject from whom they were isolated.

Immune Checkpoint Protein Inhibitors

In certain embodiments, the methods of the present disclosure include administration of immune checkpoint protein inhibitors. Exemplary immune checkpoint protein inhibitors that may be administered include, without limitation, antagonistic antibodies, such as anti-PD-1, anti-PD-L1, PD-L2, anti-cytotoxic T-lymphocyte-associated protein 4 (anti-CTLA-4), anti-T cell immunoglobulin and mucin protein 3 (anti-TIM-3), anti-lymphocyte-activation protein 3 (anti-LAG-3), anti-carcinoembryonic antigen-related cell adhesion molecule 1 (anti-CEACAMl), agonistic anti-glucocorticoid-induced tumor necrosis factor receptor-related protein (anti-GITR), or agonistic anti-tumor necrosis factor receptor superfamily, member 4 (anti-TNFRSF4). Or, the subject can also be administered an indoleamine-pyrrole 2,3-dioxygenase (IDO) inhibitor, such as 4-amino-N-(3-chloro-4-fluorophenyl)-N'-hydroxy-1,2,5-oxadiazole-3-carboximidamide, norharmane, rosmarinic acid, a cyclooxygenase-2 (COX-2) inhibitor, or alpha-methyl tryptophan.

Antibody-Drug Conjugates

In an embodiment, a cancer therapy comprising an antibody conjugated to a chemotherapy drug or radioactive particle is employed. Antibody-drug conjugates may be designed by methods known in the art. For example, see Kovtun et al. 2006, Cancer Res. 66:3214; Goldenberg 2002 J Nucl Med 43:693-713, incorporated by reference herein in its entirety.

Gene Therapies

In some embodiments, a CRISPR-Cas system may be used to inhibit expression of HDAC3 in cultured T cells used to treat a cancer (e.g. a cell line or T cells removed from a cancer patient), or to treat T cells within an organism, such as a human.

Generally, the "CRISPR system" or the "CRISPR-Cas system" refers collectively to transcripts and other elements involved in the expression of or directing the activity of CRISPR-associated ("Cas") genes, including sequences encoding a Cas gene, a tracr (trans-activating CRISPR) sequence (e.g. tracrRNA or an active partial tracrRNA), a tracr-mate sequence (encompassing a "direct repeat" and a tracrRNA-processed partial direct repeat in the context of an endogenous CRISPR system), a guide sequence (also referred to as a "spacer" in the context of an endogenous CRISPR system), or other sequences and transcripts from a CRISPR locus. Exemplary CRISPR-Cas systems are described in Intl. Pub. Nos. WO2014/204727A1 and WO2016/049251A1, each of which is incorporated herein by reference.

The term "guide sequence" refers to the about 20 bp sequence within the guide RNA (gRNA) that specifies the target site and may be used interchangeably with the terms "guide" or "spacer". The term "tracr mate sequence" may also be used interchangeably with the term "direct repeat(s)".

In some embodiments, one or more elements of a CRISPR system is derived from a type I, type II, or type III CRISPR system. In some embodiments, at least one element of a CRISPR system is derived from a particular organism comprising an endogenous CRISPR system, such as *Streptococcus pyogenes*. In general, a CRISPR system is characterized by elements that promote the formation of a CRISPR complex at the site of a target sequence (also referred to as a protospacer in the context of an endogenous CRISPR system).

An example type II CRISPR system is the type II CRISPR locus from *Streptococcus pyogenes* SF370, which contains a cluster of four genes Cas9, Casl, Cas2, and Csnl, as well as two non-coding RNA elements, tracrRNA and a characteristic array of repetitive sequences (direct repeats) interspaced by short stretches of non-repetitive sequences (spacers, about 30 bp each). In this system, targeted DNA double-strand break (DSB) is generated in four sequential steps. First, two non-coding RNAs, the pre-crRNA array and tracrRNA, are transcribed from the CRISPR locus. Second, tracrRNA hybridizes to the direct repeats of pre-crRNA, which is then processed into mature crRNAs containing individual spacer sequences. Third, the mature crRNA:tracrRNA complex directs Cas9 to the DNA target consisting of the protospacer and the corresponding PAM via heteroduplex formation between the spacer region of the crRNA and the protospacer DNA. Finally, Cas9 mediates cleavage of target DNA upstream of PAM to create a double-stranded break within the protospacer. This example describes a process for adapting this RNA-programmable nuclease system to direct CRISPR complex activity in the nuclei of eukaryotic cells.

In the context of formation of a CRISPR complex, "target sequence" refers to a sequence to which a guide sequence is designed to have complementarity, where hybridization between a target sequence and a guide sequence promotes the formation of a CRISPR complex. Full complementarity is not necessarily required, provided there is sufficient complementarity to cause hybridization and promote formation of a CRISPR complex. A target sequence may comprise any polynucleotide, such as DNA or RNA polynucleotides. In some embodiments, a target sequence is located in the nucleus or cytoplasm of a cell. In some embodiments, the target sequence may be within an organelle of a eukaryotic cell, for example, mitochondrion or chloroplast.

A sequence or template that may be used for recombination into the targeted locus comprising the target sequences is referred to as an "editing template" or "editing polynucleotide" or "editing sequence". In aspects of the invention, an exogenous template polynucleotide may be referred to as an editing template. In an aspect of the disclosure the recombination is homologous recombination.

Typically, in the context of an endogenous CRISPR system, formation of a CRISPR complex (comprising a guide sequence hybridized to a target sequence and complexed with one or more Cas proteins) results in cleavage of one or both strands in or near (e.g. within 1, 2, 3, 4, 5, 6, 7, 8, 9, 10, 20, 50, or more base pairs from) the target sequence. Without wishing to be bound by theory, the tracr sequence, which may comprise or consist of all or a portion of a wild-type tracr sequence (e.g. about or more than about 20, 26, 32, 45, 48, 54, 63, 67, 85, or more nucleotides of a wild-type tracr sequence), may also form part of a CRISPR complex, such as by hybridization along at least a portion of the tracr sequence to all or a portion of a tracr mate sequence that is operably linked to the guide sequence. In some embodiments, the tracr sequence has sufficient complementarity to a tracr mate sequence to hybridize and participate in formation of a CRISPR complex. As with the target sequence, it is believed that complete complementarity is not needed, provided there is sufficient to be functional. In some embodiments, the tracr sequence has at least 50%, 60%, 70%, 80%, 90%, 95% or 99% of sequence complementarity along the length of the tracr mate sequence when optimally aligned.

In some embodiments, one or more vectors driving expression of one or more elements of a CRISPR system are introduced into a host cell such that expression of the elements of the CRISPR system direct formation of a CRISPR complex at one or more target sites. For example, a Cas enzyme, a guide sequence linked to a tracr-mate sequence, and a tracr sequence could each be operably linked to separate regulatory elements on separate vectors. Alternatively, two or more of the elements expressed from the same or different regulatory elements, may be combined in a single vector, with one or more additional vectors providing any components of the CRISPR system not included in the first vector. CRISPR system elements that are combined in a single vector may be arranged in any suitable orientation, such as one element located 5' with respect to ("upstream" of) or 3' with respect to ("downstream" of) a second element. The coding sequence of one element may be located on the same or opposite strand of the coding sequence of a second element, and oriented in the same or opposite direction. In some embodiments, a single promoter drives expression of a transcript encoding a CRISPR enzyme and one or more of the guide sequence, tracr mate sequence (optionally operably linked to the guide sequence), and a tracr sequence embedded within one or more intron sequences (e.g. each in a different intron, two or more in at least one intron, or all in a single intron). In some embodiments, the CRISPR enzyme, guide sequence, tracr mate sequence, and tracr sequence are operably linked to and expressed from the same promoter.

In certain aspects the invention involves vectors. A used herein, a "vector" is a tool that allows or facilitates the transfer of an entity from one environment to another. It is a replicon, such as a plasmid, phage, or cosmid, into which another DNA segment may be inserted so as to bring about the replication of the inserted segment. Generally, a vector is capable of replication when associated with the proper control elements. In general, the term "vector" refers to a nucleic acid molecule capable of transporting another nucleic acid to which it has been linked. Vectors include, but are not limited to, nucleic acid molecules that are single-stranded, double-stranded, or partially double-stranded: nucleic acid molecules that comprise one or more free ends, no free ends (e.g. circular): nucleic acid molecules that comprise DNA, RNA, or both; and other varieties of polynucleotides known in the art. One type of vector is a "plasmid," which refers to a circular double stranded DNA loop into which additional DNA segments can be inserted, such as by standard molecular cloning techniques. Another type of vector is a viral vector, wherein virally-derived DNA or RNA sequences are present in the vector for packaging into a virus (e.g. retroviruses, replication defective retroviruses, adenoviruses, replication defective adenoviruses, and adeno-associated viruses (AAV's)). Viral vectors also include polynucleotides carried by a virus for transfection into a host cell. Certain vectors are capable of autonomous replication in a host cell into which they are introduced (e.g. bacterial vectors having a bacterial origin of replication and episomal mammalian vectors). Other vectors (e.g., non-episomal mammalian vectors) are integrated into the genome of a host cell upon introduction into the host cell, and thereby are replicated along with the host genome. Moreover, certain vectors are capable of directing the expression of genes to which they are operatively-linked. Such vectors are referred to herein as "expression vectors." Common expression vectors of utility in recombinant DNA techniques are often in the form of plasmids.

In some embodiments of gene therapy, a zinc finger nuclease (ZFN) dimers may be introduced to cells via a vector (either in culture or within an organism) in order to edit the genome of the cell. Chimeric ZFN proteins having three to six zinc finger repeats that specifically bind nine to eighteen nucleotide base pairs, allowing recognition of a specific nucleic acid sequence depending on the ZFNs used. The chimeric ZFN protein include a double-stranded nucleic acid cleavage domain (e.g. FokI) that cleaves nucleic acid to stimulate the treated cell's natural DNA-repair functions, such as homologous recombination, homology directed repair, and non-homologous end joining (NHEJ). These repair mechanisms allow genes to be inactivated by introduction of errors into the nucleic acid sequence or introduction of foreign nucleic acids.

In some embodiments, gene therapy may be accomplished using transcription activator-like nucleases (TALEN). These chimeric proteins may be introduced to a cell using a vector, and include a TAL effector nucleic acid-binding domain engineered to bind a specific nucleic acid sequence, fused with a nucleic acid nuclease domain (e.g. FokI). Once a TAL effector nucleic acid-binding domain interacts with the double-stranded nucleic acid sequence it is engineered to bind, the nuclease domain cleaves the double-stranded nucleic acid, stimulating the treated cell's natural DNA-repair functions, such as homologous recombination, homology directed repair, and non-homologous end joining (NHEJ). These repair mechanisms allow genes to be inactivated by introduction of errors into the nucleic acid sequence or introduction of foreign nucleic acids.

Nucleic Acid Formulations

Nucleic acid molecules can be formulated using one or more liposomes, lipoplexes, or lipid nanoparticles. In certain embodiments, pharmaceutical compositions of a nucleic acid molecule include liposomes. Liposomes may be used as a delivery vehicle for the administration of pharmaceutical formulations. Liposomes can be of different sizes, such as a multilamellar vesicle (MLV) that may be hundreds of nanometers in diameter and may contain a series of concentric bilayers separated by narrow aqueous compartments, a small unicellular vesicle (SUV) that may be smaller than 50 nm in diameter, and a large unilamellar vesicle (LUV) that may be between 50 and 500 nm in diameter. Liposome design may include opsonins or ligands in order to improve the attachment of liposomes to unhealthy tissue or to activate events such as endocytosis. Liposomes may contain a low or a high pH in order to improve the delivery of the pharmaceutical formulations.

The formation of liposomes may depend on the physicochemical characteristics such as the pharmaceutical formulation entrapped and the liposomal ingredients, the nature of the medium in which the lipid vesicles are dispersed, the effective concentration of the entrapped substance and its potential toxicity, any additional processes involved during the application and/or delivery of the vesicles, the optimization size, polydispersity and the shelf-life of the vesicles for the intended application, and the batch-to-batch reproducibility and possibility of large-scale production of safe and efficient liposomal products. For a thorough discussion of liposome, lipoplex and lipid nanoparticles constitution, see US20130244278: see also US20130245105 and US20130245107, each of which is incorporated by reference herein in its entirety.

Nucleic acid molecules can be formulated using natural and/or synthetic polymers. Examples of polymers which can be used for delivery include DYNAMIC POLYCONJUGATE (Arrowhead Research Corp., Pasadena, CA) formulations from MIR US Bio (Madison, WI) and Roche Madison (Madison, WI), PHASERX polymer formulations such as SMARTT POLYMER TECHNOLOGY (Seattle, WA), DMRI/DOPE, poloxamer, VAXFECTIN adjuvant from Vical (San Diego, CA), chitosan, cyclodextrin from Calando Pharmaceuticals (Pasadena, CA), dendrimers and poly (lactic-co-glycolic acid) (PLGA) polymers, RONDEL (RNAi/Oligonucleotide Nanoparticle Delivery) polymers (Arrowhead Research Corporation, Pasadena, CA) and pH responsive co-block polymers such as, but not limited to, PHASERX (Seattle, WA).

An example of chitosan formulation includes a core of positively charged chitosan and an outer portion of negatively charged substrate (U.S. Pub. No. 20120258176, incorporated by reference herein in its entirety). Chitosan includes N-trimethyl chitosan, mono-N-carboxymethyl chitosan (MCC), N-palmitoyl chitosan (NPCS), EDTA-chitosan, low molecular weight chitosan, chitosan derivatives, or combinations thereof.

The polymers used can undergo processing to reduce and/or inhibit the attachment of unwanted substances such as bacteria, to the surface of the polymer. The polymer may be processed by methods known and/or described in the art and/or described in WO2012/150467 (incorporated by reference herein in its entirety).

An example of PLGA formulations include PLGA injectable depots (e.g., ELIGARD formed by dissolving PLGA in 66% N-methyl-2-pyrrolidone (NMP) and the remainder being aqueous solvent and leuprolide. Once injected, the PLGA and leuprolide peptide precipitates into the subcutaneous space).

Many polymer approaches have demonstrated efficacy in delivering oligonucleotides in vivo into the cell cytoplasm (deFougerolles, Hum Gene Ther. 2008 19:125-132). Two polymer approaches that have yielded robust in vivo delivery of nucleic acids are dynamic polyconjugates and cyclodextrin-based nanoparticles. The first of these delivery approaches uses dynamic polyconjugates and has been shown in vivo in mice to effectively deliver small interfering RNA (siRNA) and silence endogenous target mRNA in hepatocytes (Rozema et al., Proc Natl Acad Sci USA. 2007 104:12982-12887, incorporated by reference herein in its entirety). This particular approach is a multicomponent polymer system of which key features include a membrane-active polymer to which nucleic acid is covalently coupled via a disulfide bond and where both PEG (for charge masking) and N-acetylgalactosamine (for hepatocyte targeting) groups are linked via pH-sensitive bonds (Rozema et al., Proc Natl Acad Sci USA. 2007 104:12982-12887, incorporated by reference herein in its entirety). On binding to the hepatocyte and entry into the endosome, the polymer complex disassembles in the low-pH environment, with the polymer exposing its positive charge, leading to endosomal escape and cytoplasmic release of the siRNA from the polymer. Through replacement of the N-acetylgalactosamine group with a mannose group, it was shown one could alter targeting from asialoglycoprotein receptor-expressing hepatocytes to sinusoidal endothelium and Kupffer cells.

Another polymer approach involves using transferrin-targeted cyclodextrin containing polycation nanoparticles. These nanoparticles have demonstrated targeted silencing of the EWS-FLI gene product in transferrin receptor-expressing Ewing's sarcoma tumor cells (Hu-Lieskovan et al. Cancer Res. 2005 65:8984-8982, incorporated by reference herein in its entirety) and small interfering RNA (siRNA) formulated in these nanoparticles was well tolerated in non-human primates (Heidel et al., Proc Natl Acad Sci USA 2007 104:571521, incorporated by reference herein in its entirety). Both of these delivery strategies incorporate rational approaches using both targeted delivery and endosomal escape mechanisms.

The polymer formulation can permit the sustained or delayed release of nucleic acid molecules (e.g., following intramuscular or subcutaneous injection). The altered release profile for the nucleic acid molecule can result in, for example, translation of an encoded protein over an extended period of time. The polymer formulation may also be used to increase the stability of the nucleic acid molecule. Biodegradable polymers have been previously used to protect nucleic acids from degradation and been shown to result in sustained release of payloads in vivo (Rozema et al., Proc Natl Acad Sci USA. 2007 104:12982-12887: Sullivan et al., Expert Opin Drug Deliv. 2010 7:1433-1446; Convertine et al., Biomacromolecules. 2010 Oct. 1: Chu et al., Acc Chem Res. 2012 Jan. 13: Manganiello et al., Biomaterials. 2012 33:2301-2309: Benoit et al., Biomacromolecules. 2011 12:2708-2714: Singha et al., Nucleic Acid Ther. 2011 2:133-147; deFougerolles Hum Gene Ther. 2008 19:125-132; Schaffert and Wagner, Gene Ther. 2008 16:1131-1138; Chaturvedi et al., Expert Opin Drug Deliv. 2011 8:1455-1468: Davis, Mol. Pharm. 2009 6:659-668: Davis, Nature 2010 464:1067-1070; each of which is incorporated by reference herein in its entirety).

The pharmaceutical compositions can be sustained release formulations. The sustained release formulations can be for subcutaneous delivery. Sustained release formulations may include PLGA microspheres, ethylene vinyl acetate (EVAc), poloxamer, GELSITE (Nanotherapeutics, Inc. Alachua, FL), HYLENEX (Halozyme Therapeutics, San Diego, CA), surgical sealants such as fibrinogen polymers (Ethicon Inc. Cornelia, GA), TISSELL (Baxter International, Inc., Deerfield, IL), PEG-based sealants, and COSEAL (Baxter International, Inc.). Nucleic acids may be formulated in PLGA microspheres by preparing the PLGA microspheres with tunable release rates (e.g., days and weeks) and encapsulating the nucleic acid in the PLGA microspheres while maintaining the integrity of the nucleic acid during the encapsulation process. EVAc are non-biodegradeable, biocompatible polymers which are used extensively in preclinical sustained release implant applications. Poloxamer F-407 NF is a hydrophilic, nonionic surfactant triblock copolymer of polyoxyethy lene-poly oxy propy lenepolyoxyethylene having a low viscosity at temperatures less than 5° C. and forms a solid gel at temperatures greater than 15° C. PEG-based surgical sealants comprise two synthetic PEG components mixed in a delivery device which can be prepared in one minute, seals in 3 minutes and is reabsorbed within 30 days. GELSITE and natural polymers are capable of in situ gelation at the site of administration. They have been shown to interact with protein and peptide therapeutic candidates through ionic interaction to provide a stabilizing effect.

Polymer formulations can also be selectively targeted through expression of different ligands as exemplified by folate, transferrin, and N-acetylgalactosamine (GalNAc) (Benoit et al., Biomacromolecules. 2011 12:2708-2714: Rozema et al., Proc Natl Acad Sci USA. 2007 104:12982-12887: Davis, Mol. Pharm. 2009 6:659-668: Davis, Nature 2010 464:1067-1070). Nucleic acid molecules may be formulated with a PLGA-PEG block copolymer (see US Pub. No. US20120004293 and U.S. Pat. No. 8,236,330) or PLGA-PEG-PLGA block copolymers (see U.S. Pat. No. 6,004,573). Nucleic acid molecules may be formulated with a diblock copolymer of PEG and PLA or PEG and PLGA (see U.S. Pat. No. 8,246,968; each of which is incorporated by reference herein in its entirety).

A polyamine derivative may be used to deliver nucleic acid molecules or to treat and/or prevent a disease or to be included in an implantable or injectable device (U.S. Pub. No. 20100260817: incorporated by reference herein in its entirety). A pharmaceutical composition may include the nucleic acid molecules and the polyamine derivative described in U.S. Pub. No. 20100260817. Nucleic acids may be delivered using a polyamine polymer such as a polymer comprising a 1,3-dipolar addition polymer prepared by combining a carbohydrate diazide monomer with a dilkyne unite comprising oligoamines (U.S. Pat. No. 8,236,280; incorporated by reference herein in its entirety).

Nucleic acids may be formulated with at least one polymer and/or derivatives thereof described in WO2011/115862, WO2012/082574 and WO2012/068187 and U.S. Pub. No. 2012/0283427 (each of which is incorporated by reference herein in its entirety). Nucleic acids may be formulated with a polymer of formula Z as described in WO2011/115862 (incorporated by reference herein in its entirety). Nucleic acids may be formulated with a polymer of formula Z, Z' or Z" as described in International Pub. Nos. WO2012/082574 or WO2012/068187 (each of which is incorporated by reference herein in its entirety). The polymers formulated with nucleic acids may be synthesized by the method described in Intl. Pub. Nos. WO2012/082574 or WO2012/068187 (each of which is incorporated by reference herein in its entirety).

Formulations of nucleic acid molecules may include at least one amine-containing polymer such as polylysine, polyethylene imine, poly (amidoamine) dendrimers or combinations thereof. Nucleic acid molecules may be formulated with at least one crosslinkable polyester. Crosslinkable polyesters include those known in the art and described in US Pub. No. 20120269761. The described polymers may be conjugated to a lipid-terminating PEG. PLGA may be conjugated to a lipid-terminating PEG forming PLGA-DSPE-PEG. PEG conjugates are described in International Publication No. WO2008103276 (incorporated by reference herein in its entirety). The polymers may be conjugated using a ligand conjugate such as, but not limited to, the conjugates described in U.S. Pat. No. 8,273,363 (incorporated by reference herein in its entirety).

Nucleic acid molecules may be conjugated with another compound, such as those described in U.S. Pat. Nos. 7,964,578 and 7,833,992 (each of which is incorporated by reference herein in its entirety). Nucleic acid molecules may be conjugated with conjugates of formula 1-122 as described in U.S. Pat. Nos. 7,964,578 and 7,833,992 (each of which is incorporated by reference herein in its entirety). Nucleic acid molecules may be conjugated with a metal such as gold. (See e.g., Giljohann et al. J. Amer. Chem. Soc. 2009 131 (6): 2072-2073, incorporated by reference herein in its entirety). In another example, nucleic acid molecules may be conjugated and/or encapsulated in gold-nanoparticles (see WO2012/16269 and US20120302940, each of which is incorporated by reference herein in its entirety). As described in US2010/0004313 (incorporated by reference herein in its entirety), a gene delivery composition may include a nucleotide sequence and a poloxamer. For example, nucleic acid molecules may be used in a gene delivery composition with the poloxamer described in US2010/0004313.

Nucleic acid molecules may be formulated in a polyplex of one or more polymers (U.S. Pat. Pub. 2012/0237565 and U.S. Pat. Pub. 2012/0270927, each of which is incorporated by reference herein in its entirety). In one embodiment, the polyplex comprises two or more cationic polymers. The cationic polymer may comprise a poly (ethylene imine) (PEI) such as linear PEI. Further details are provided in U.S. Pat. Pub. 2013/0244278 (incorporated by reference herein in its entirety).

Nucleic acid molecules can also be formulated as a nanoparticle using a combination of polymers, lipids, and/or other biodegradable agents, such as calcium phosphate. Components may be combined in a core-shell, hybrid, and/or layer-by-layer architecture, to allow for fine-tuning of the nanoparticle so delivery of the nucleic acid molecule may be enhanced (Wang et al., Nat Mater. 2006 5:791-796; Fuller et al., Biomaterials. 2008 29:1526-1532: DeKoker et al., Adv Drug Deliv Rev. 2011 63:748-761: Endres et al., Biomaterials. 2011 32:7721-7731: Su et al. Mol Pharm. 2011 Jun. 6; 8 (3): 774-87: each of which is incorporated by reference herein in its entirety). As a non-limiting example, the nanoparticle may comprise a plurality of polymers such as hydrophilic-hydrophobic polymers (e.g., PEG-PLGA), hydrophobic polymers (e.g., PEG) and/or hydrophilic polymers (see WO2012/0225129; incorporated by reference herein in its entirety). The composition of nanoparticles is thoroughly discussed in U.S. Pat. Pub. 2013/0244278 and U.S. Pat. Pub. 2015/0086612 (each of which is incorporated by reference herein in its entirety).

Biodegradable calcium phosphate nanoparticles in combination with lipids and/or polymers have been shown to deliver nucleic acid molecules in vivo. In one embodiment, a lipid coated calcium phosphate nanoparticle, which may also contain a targeting ligand such as anisamide, may be used to deliver the nucleic acid molecule. For example, to effectively deliver siRNA in a mouse metastatic lung model a lipid coated calcium phosphate nanoparticle was used (Li et al., J Contr Rel. 2010 142:416-421: Li et al., J Contr Rel. 2012 158:108-114; Yang et al., Mol Ther. 2012 20:609-615; each of which is incorporated by reference herein in its entirety). This delivery system combines both a targeted nanoparticle and a component to enhance the endosomal escape, calcium phosphate, in order to improve delivery of the nucleic acid.

Calcium phosphate with a PEG-polyanion block copolymer may be used to deliver nucleic acid molecules (Kazikawa et al., J Contr Rel. 2004 97:345-356: Kazikawa et al., J Contr Rel. 2006 111:368-370; each of which is incorporated by reference herein in its entirety).

A PEG-charge-conversional polymer (Pitella et al., Biomaterials. 2011 32:31063114; incorporated by reference herein in its entirety) may be used to form a nanoparticle to deliver nucleic acid molecules. The PEG-charge-conversional polymer may improve upon the PEG-polyanion block copolymers by being cleaved into a polycation at acidic pH, thus enhancing endosomal escape.

In certain embodiments, the formulation comprising nucleic acid molecules is a nanoparticle that may comprise at least one lipid. The lipid may be selected from DLin-DMA, DLin-K-DMA, 98N12-5, C12-200, DLin-MC3-DMA, DLin-KC2-DMA, DODMA, PLGA, PEG, PEG-DMG and PEGylated lipids. In another aspect, the lipid may be a cationic lipid such as DLin-DMA, DLin-D-DMA, DLin-MC3-DMA, DLin-KC2-DMA and DODMA.

The lipid to nucleic acid molecule ratio in the formulation may be between 10:1 and 30:10. The mean size of the nanoparticle formulation comprising the nucleic acid molecules may be between 60 and 225 nm. The PDI of the nanoparticle formulation comprising the nucleic acid molecules may be between 0.03 and 0.15. The zeta potential of the lipid may be from −10 to +10 at a pH of 7.4.

The formulations of nucleic acid molecules may comprise a fusogenic lipid, cholesterol and a PEG lipid. The formulation may have a molar ratio 50:10:38.5:1.5-3.0 (cationic lipid: fusogenic lipid: cholesterol: PEG lipid). The PEG lipid may be, for example, PEG-c-DOMG, PEG-DMG. The fusogenic lipid may be DSPC.

The formulation of nucleic acid molecules may be a PLGA microsphere that may be between 4 and 20 µm. The nucleic acid molecules may be released from the formulation at less than 50% in a 48 hour time period. The PLGA microsphere formulation may be stable in serum.

Stability may be determined relative to unformulated nucleic acid of 90%. The loading weight percent of the nucleic acid molecule PLGA microsphere may be at least 0.05%, at least 0.1%, at least 0.2%, at least 0.3%, at least 0.4% or at least 0.5%. The encapsulation efficiency of the nucleic acid molecules in the PLGA microsphere may be at least 50%, at least 70%, at least 90% or at least 97%.

A lipid nanoparticle of the present disclosure may be formulated in a sealant such as, but not limited to, a fibrin sealant.

The use of core-shell nanoparticles has additionally focused on a high-throughput approach to synthesize cationic cross-linked nanogel cores and various shells (see Siegwart et al., Proc Natl Acad Sci USA. 2011 108:12996-13001: incorporated by reference herein in its entirety). The complexation, delivery, and internalization of the polymeric nanoparticles can be precisely controlled by altering the chemical composition in both the core and shell components of the nanoparticle. For example, the core-shell nanoparticles may efficiently deliver nucleic acids to mouse hepatocytes after they covalently attach cholesterol to the nanoparticle.

A hollow lipid core comprising a middle PLGA layer and an outer neutral lipid layer containing PEG may be used to delivery of nucleic acid molecules. In mice bearing a luciferase-expressing tumor, it was determined that the lipid-polymer-lipid hybrid nanoparticle significantly suppressed luciferase expression, as compared to a conventional lipoplex (Shi et al., Angew Chem Int Ed. 2011 50:7027-7031: incorporated by reference herein in its entirety).

The lipid nanoparticles may comprise a core of the nucleic acid molecules and a polymer shell. The polymer shell may be any of the polymers known in the art. The polymer shell may be used to protect the modified nucleic acids in the core. Core-shell nanoparticles for use with the nucleic acid molecules are described and may be formed by the methods described in U.S. Pat. No. 8,313,777 (incorporated by reference herein in its entirety). The core-shell nanoparticles may comprise a core of the nucleic acid molecules and a polymer shell. The polymer shell may be any of the polymers described herein and are known in the art. Further details are provided in U.S. Pat. Pub. 2013/0244278 (incorporated by reference herein in its entirety).

Adjuvants

Certain embodiments of the methods disclosed herein comprise administration of an HDAC3 inhibitor with a cancer therapy, such as an immunotherapy or vaccine, and an adjuvant to enhance the immune response.

A variety of adjuvants may be employed, including, for example, systemic adjuvants and mucosal adjuvants. A systemic adjuvant is an adjuvant that can be delivered parenterally. Systemic adjuvants include adjuvants that create a depot effect, adjuvants that stimulate the immune system, and adjuvants that do both. An adjuvant that creates a depot effect is an adjuvant that causes the antigen to be slowly released in the body, thus prolonging the exposure of immune cells to the antigen. This class of adjuvants includes alum (e.g., aluminum hydroxide, aluminum phosphate): or emulsion-based formulations including mineral oil, non-mineral oil, water-in-oil or oil-in-water-in oil emulsion, oil-in-water emulsions such as Seppic ISA series of Montanide adjuvants (e.g., Montanide ISA 720, AirLiquide, Paris, France): MF-59 (a squalene-in-water emulsion stabilized with Span 85 and Tween 80; Chiron Corporation, Emeryville, Calif.; and PROVAX (an oil-in-water emulsion containing a stabilizing detergent and a micelle-forming agent: IDEC Pharmaceuticals Corp., San Diego, CA).

Other adjuvants stimulate the immune system and result in, e.g. more pronounced immune cell secretion of cytokines or IgG or improved cytolytic potential. This class of adjuvants includes immunostimulatory nucleic acids, such as CpG oligonucleotides: saponins purified from the bark of the *Q. Saponaria* tree, such as QS21 and QS7: STING ligands: TLR2 agonists: TLR5 agonists (e.g., flagellin): TLR7 agonists: poly [di(carboxylatophenoxy) phosphazene (PCPP polymer: Virus Research Institute, USA): RNA mimetics such as polyinosinic: polycytidylic acid (poly I: C) or poly I: C stabilized with poly-lysine (poly-ICLC [HILTONOL: Oncovir, Inc.]: derivatives of lipopolysaccharides (LPS) such as monophosphoryl lipid A (MPL; Ribi ImmunoChem Research, Inc., Hamilton, MT), muramyl dipeptide (MDP: Ribi) and threony lmuramyl dipeptide (t-MDP: Ribi): OM-174 (a glucosamine disaccharide related to lipid A: OM Pharma SA, Meyrin, Switzerland); and *Leishmania* elongation factor (a purified *Leishmania* protein: Corixa Corp., Seattle, WA).

Other systemic adjuvants are adjuvants that create a depot effect and stimulate the immune system. These compounds have both of the above-identified functions of systemic adjuvants. This class of adjuvants includes but is not limited to ISCOMs (Immunostimulating complexes which contain mixed saponins, lipids and form virus-sized particles with pores that can hold antigen: CSL, Melbourne, Australia):

AS01 which is a liposome based formulation containing MPL and QS21 (GlaxoSmithKline, Belgium): AS02 (GlaxoSmithKline, which is an oil-in-water emulsion containing MPL and QS21: GlaxoSmithKline, Rixensart, Belgium): AS04 (which contains alum and MPL: GlaxoSmithKline, Belgium): AS 15 which is a liposome based formulation containing CpG oligonucleotides, MPL and QS21 (GlaxoSmithKline, Belgium): non-ionic block copolymers that form micelles such as CRL 1005 (these contain a linear chain of hydrophobic polyoxypropylene flanked by chains of polyoxyethylene: Vaxcel, Inc., Norcross, GA); and Syntex Adjuvant Formulation (SAF, an oil-in-water emulsion containing Tween 80 and a nonionic block copolymer: Syntex Chemicals, Inc., Boulder, CO).

Useful mucosal adjuvants are capable of inducing a mucosal immune response in a subject when administered to a mucosal surface in conjunction with complexes of the present disclosure. Mucosal adjuvants include CpG nucleic acids (e.g. PCT published patent application WO1999/061056), bacterial toxins: e.g., Cholera toxin (CT), CT derivatives including but not limited to CT B subunit (CTB); CTD53 (Val to Asp): CTK97 (Val to Lys): CTK104 (Tyr to Lys): CTD53/K63 (Val to Asp, Ser to Lys): CTH54 (Arg to His): CTN107 (His to Asn): CTE114 (Ser to Glu): CTE112K (Glu to Lys): CTS6IF (Ser to Phe): CTS 106 (Pro to Lys); and CTK63 (Ser to Lys), Zonula occludens toxin (zot), *Escherichia coli* heat-labile enterotoxin, Labile toxin (LT), LT derivatives including but not limited to LT B subunit (LTB): LT7K (Arg to Lys): LT6IF (Ser to Phe): LT112K (Glu to Lys): LT118E (Gly to Glu): LT146E (Arg to Glu): LT192G (Arg to Gly): LTK63 (Ser to Lys); and LTR72 (Ala to Arg), Pertussis toxin, PT. including PT-9K/129G: toxin derivatives (see below): lipid A derivatives (e.g., monophosphoryl lipid A, MPL): muramyl dipeptide (MDP) derivatives: bacterial outer membrane proteins (e.g., outer surface protein A (OspA) lipoprotein of *Borrelia burgdorferi*, outer membrane protein of *Neisseria meningitidis*): oil-in-water emulsions (e.g., MF59; aluminum salts (Isaka et al., 1998, 1999); and saponins (e.g., QS21, Agenus Inc., Lexington, MA), ISCOMs, MF-59 (a squalene-in-water emulsion stabilized with Span 85 and Tween 80; Chiron Corp., Emeryville, CA): the Seppic ISA series of Montanide adjuvants (e.g., Montanide ISA 720: AirLiquide, Paris, France): PROVAX (an oil-in-water emulsion containing a stabilizing detergent and a micelle-forming agent: IDEC Pharmaceuticals Corp., San Diego, CA): Syntext adjuvant formulation (SAF: Syntex Chemicals, Inc., Boulder, CO): poly [di(carboxylatophenoxy)]phosphazene (PCPP polymer: Virus Research Institute, USA) and *Leishmania* elongation factor (Corixa Corporation, Seattle, WA)

Other useful adjuvants include: inflammasome inducers such as NLRP3 inflammasome inducers (e.g., alum crystals, ATP, chitosan, calcium pyrophosphate dihydrate crystals, hemozoin, monosodium urate crystals, nano-SiCK nigericin, and mincle agonists), AIM2 inflammasome inducers (e.g., poly (dA:dT)), NLRC4 inflammasome inducers (e.g., flagellin), NLRP1 inflammasome inducers (e.g., muramyl dipeptide), and noncanonical inflammasome inducers (e.g., P-1,3-glucan from *A. faecalis*. heat-killed *C. albicans*. PD-glucan from lichen *Lasallia pustulata*. and hot alkali treated zymosan); NOD1 agonists such as D-y-Glu-mDAP and L-Ala-y-D-Glu-mDAP: NOD2 agonists such as murabutide, muramyl dipeptide, muramyl tripeptide, muramyl tetrapeptide, and N-glycolylated muramyl dipeptide: NOD1/NOD2 agonists such as MurNAc-L-Ala-y-D-Glu-mDAP-PGN-like molecule and peptidoglycan: bryostatin-1, and toll-like receptor (TLR) agonists such as TLR2 ligands (e.g., heat-killed bacteria and cell-wall components), TLR3 ligands (e.g., poly (A: U) and poly (I: C)), TLR4 ligands (e.g., lipopolysaccharides and monophosphoryl lipid A), TLR5 ligands (e.g., flagellin and heat killed *Salmonella typhimurium*), TLR7/8 ligands (e.g., single-stranded RNAs), TLR9 ligands (e.g., CpG oligodeoxynucleotides), and TLR13 ligands (e.g., 23S rRNA derived oligoribonucleotide).

Adjuvants of the present disclosure may be administered prior to, during, or following administration of the cancer therapies. Administration of the adjuvant and immunotherapeutic or vaccine compositions can be at the same or different administration sites.

In certain embodiments, these methods comprise administering an additional therapeutic agent to the subject. In certain embodiments, the additional therapeutic agent is a chemotherapeutic or a checkpoint targeting agent. In certain embodiments, the checkpoint targeting agent is selected from the group consisting of an antagonist anti-PD-1 antibody, an antagonist anti-PD-L1 antibody, an antagonist anti-PD-L2 antibody, an antagonist anti-CTLA-4 antibody, an antagonist anti-TIM-3 antibody, an antagonist anti-LAG-3 antibody, an antagonist anti-CEACAM1 antibody, an agonist anti-GITR antibody, an agonist anti-OX40 antibody, an agonist anti-CD137 antibody, an agonist anti-DR3 antibody, an agonist anti-TNFSF14 antibody, and an agonist anti-CD27 antibody. In certain embodiments, the checkpoint targeting agent is an antagonist anti-PD-1 antibody. In certain embodiments, the checkpoint targeting agent is an antagonist anti-PD-L1 antibody. In certain embodiments, the checkpoint targeting agent is an antagonist anti-LAG-3 antibody. In certain embodiments, the additional therapeutic agent is an agonist to a tumor necrosis factor receptor superfamily member or a tumor necrosis factor superfamily member.

In certain embodiments, the present invention relates to (a) an HDAC3 inhibitor of the disclosure and/or a pharmaceutical composition of the invention comprising an HDAC3 inhibitor of the disclosure and a pharmaceutically acceptable carrier or excipient and (b) an additional therapeutic agent, for use as a medicament. In a preferred embodiment, the additional therapeutic agent is a chemotherapeutic or a checkpoint targeting agent.

In certain embodiments, the present invention relates to (a) an HDAC3 inhibitor of the disclosure and/or a pharmaceutical composition of the invention comprising an HDAC3 inhibitor of the disclosure and a pharmaceutically acceptable carrier or excipient and (b) an additional therapeutic agent, for use in a method for the treatment of cancer.

In certain embodiments, the present invention relates to (a) an HDAC3 inhibitor of the disclosure and/or a pharmaceutical composition of the invention comprising an HDAC3 inhibitor of the disclosure and a pharmaceutically acceptable carrier or excipient and (b) an additional therapeutic agent, for use in a method for the treatment of an infectious disease.

In certain embodiments, an HDAC3 inhibitor disclosed herein is administered to a subject in combination with a compound that targets an immunomodulatory enzyme(s) such as IDO (indoleamine-(2,3)-dioxygenase) and/or TDO (tryptophan 2,3-dioxygenase). In certain embodiments, such compound is selected from the group consisting of epacadostat (Incyte Corp: see, e.g., WO 2010/005958 which is incorporated by reference herein in its entirety), F001287 (Flexus Biosciences), indoximod (New Link Genetics), and NLG919 (New Link Genetics). In one embodiment, the compound is epacadostat. In another embodiment, the compound is F001287. In another embodiment, the compound is indoximod. In another embodiment, the compound is NLG919.

In certain embodiments, the present invention relates to (a) an HDAC3 inhibitor of the disclosure and/or a pharmaceutical composition of the invention comprising an HDAC3 inhibitor of the disclosure and a pharmaceutically acceptable carrier or excipient and (b) a compound that targets an immunomodulatory enzyme, for use as a medicament. In a preferred embodiment, the compound targets IDO and/or TDO.

In certain embodiments, the present invention relates to (a) an HDAC3 inhibitor of the disclosure and/or a pharmaceutical composition of the invention comprising an HDAC3 inhibitor of the disclosure and a pharmaceutically acceptable carrier or excipient and (b) a compound that targets an immunomodulatory enzyme, for use in a method for the treatment of cancer. In a preferred embodiment, the compound targets IDO and/or TDO.

In certain embodiments, an HDAC3 inhibitor disclosed herein is administered to a subject in combination with a vaccine. In certain embodiments, the vaccine is a heat shock protein based tumor vaccine or a heat shock protein based pathogen vaccine. In a specific embodiment, an HDAC3 inhibitor disclosed herein is administered to a subject in combination with a heat shock protein based tumor-vaccine. Heat shock proteins (HSPs) are a family of highly conserved proteins found ubiquitously across all species. Their expression can be powerfully induced to much higher levels as a result of heat shock or other forms of stress, including exposure to toxins, oxidative stress or glucose deprivation. Five families have been classified according to molecular weight: HSP-110, -90, -70, -60 and -28. HSPs deliver immunogenic peptides through the cross-presentation pathway in antigen presenting cells (APCs) such as macrophages and dendritic cells (DCs), leading to T cell activation. HSPs function as chaperone carriers of tumor-associated antigenic peptides forming complexes able to induce tumor-specific immunity. Upon release from dying tumor cells, the HSP-antigen complexes are taken up by antigen-presenting cells (APCs) wherein the antigens are processed into peptides that bind MHC class I and class II molecules leading to the activation of anti-tumor $CD8^+$ and $CD4^+$ T cells. The immunity elicited by HSP complexes derived from tumor preparations is specifically directed against the unique antigenic peptide repertoire expressed by the cancer of each subject.

Treatment Administration

In certain embodiments, the present invention relates to (a) an HDAC3 inhibitor of the disclosure and/or a pharmaceutical composition of the invention comprising an HDAC3 inhibitor of the disclosure and a pharmaceutically acceptable carrier or excipient and (b) a vaccine, for use in a method for the treatment of cancer. In one embodiment, the vaccine is a heat shock protein based tumor vaccine.

The an HDAC3 inhibitor of the disclosure and the additional therapeutic agent (e.g., chemotherapeutic, checkpoint targeting agent, IDO inhibitor, and/or vaccine) can be administered separately, sequentially or concurrently as separate dosage forms. In one embodiment, an HDAC3 inhibitor of the disclosure is administered parenterally, and an IDO inhibitor is administered orally.

In certain embodiments, an HDAC3 inhibitor disclosed herein is administered intratumorally. In certain embodiments, an HDAC3 inhibitor disclosed herein is administered to a subject intratumorally in combination with an additional therapeutic agent. In certain embodiments, the additional therapeutic agent is administered systemically. In certain embodiments, the subject has solid tumors. In certain embodiments, the subject has head and neck squamous cell carcinoma (HNSCC). In certain embodiments, the subject has $HER2^+$ breast cancer. In certain embodiments, the additional therapeutic agent that is administered systemically is an anti-PD-1 antibody (e.g., pembrolizumab or nivolumab). In certain embodiments, the additional therapeutic agent that is administered systemically is an anti-EGFR antibody (e.g., cetuximab). In certain embodiments, the additional therapeutic agent that is administered systemically is an anti-HER2 antibody (e.g., trastuzumab). In certain embodiments, the additional therapeutic agent that is administered systemically is a chemotherapeutic agent (e.g., gemcitabine). In certain embodiments, the subject has solid tumors and the additional therapeutic agent that is administered systemically is an anti-PD-1 antibody (e.g., pembrolizumab or nivolumab). In certain embodiments, the subject has head and neck squamous cell carcinoma (HNSCC) and the additional therapeutic agent that is administered systemically is an anti-EGFR antibody (e.g., cetuximab). In certain embodiments, the subject has $HER2^+$ breast cancer and the additional therapeutic agent that is administered systemically is an anti-HER2 antibody (e.g., trastuzumab). In certain embodiments, the subject further received a chemotherapeutic agent (e.g., gemcitabine). In one aspect, the present invention relates to an HDAC3 inhibitor of the disclosure and/or pharmaceutical composition of the present disclosure, and optionally an additional therapeutic agent, for use in a method for the treatment of cancer, wherein the HDAC3 inhibitor and/or pharmaceutical composition of the present invention is administered intratumorally to the subject. In one preferred embodiment, an additional therapeutic agent is administered to the subject, more preferably, an additional therapeutic agent is administered systemically to the subject.

In certain embodiments, an anti-PD-1 antibody is used in methods disclosed herein. In certain embodiments, the anti-PD-1 antibody is nivolumab, also known as BMS-936558 or MDX1106, developed by Bristol-Myers Squibb. In certain embodiments, the anti-PD-1 antibody is pembrolizumab, also known as lambrolizumab or MK-3475, developed by Merck & Co. In certain embodiments, the anti-PD-1 antibody is pidilizumab, also known as CT-011, developed by CureTech. In certain embodiments, the anti-PD-1 antibody is MEDI0680, also known as AMP-514, developed by Medimmune. In certain embodiments, the anti-PD-1 antibody is PDR001 developed by Novartis Pharmaceuticals. In certain embodiments, the anti-PD-1 antibody is REGN2810 developed by Regeneron Pharmaceuticals. In certain embodiments, the anti-PD-1 antibody is PF-06801591 developed by Pfizer. In certain embodiments, the anti-PD-1 antibody is BGB-A317 developed by BeiGene. In certain embodiments, the anti-PD-1 antibody is TSR-042 developed by AnaptysBio and Tesaro. In certain embodiments, the anti-PD-1 antibody is SHR-1210 developed by Hengrui.

Further non-limiting examples of anti-PD-1 antibodies that may be used in treatment methods disclosed herein are disclosed in the following patents and patent applications, which are incorporated herein by reference in their entireties for all purposes: U.S. Pat. Nos. 6,808,710; 7,332,582; 7,488,802; 8,008,449; U.S. Pat. No. 8,114,845; 8,168,757; 8,354,509; 8,686,119; 8,735,553; 8,747,847; 8,779,105; 8,927,697; 8,993,731; 9,102,727; 9,205,148; U.S. Publication No. US 2013/0202623 A1; U.S. Publication No. US 2013/0291136 A1; U.S. Publication No. US 2014/0044738 A1; U.S. Publication No. US 2014/0356363 A1; U.S. Publication No. US 2016/0075783 A1; and PCT Publication No. WO 2013/033091 A1; PCT Publication No. WO 2015/036394 A1: PCT Publication No. WO 2014/179664 A2; PCT Publication No. WO 2014/209804 A1; PCT Publication No. WO 2014/206107 A1; PCT Publication No. WO 2015/058573 A1; PCT Publication No. WO 2015/085847 A1; PCT Publication No. WO 2015/200119 A1; PCT Publication No. WO 2016/015685 A1; and PCT Publication No. WO 2016/020856 A1.

In certain embodiments, an anti-PD-L1 antibody is used in methods disclosed herein. In certain embodiments, the anti-PD-L1 antibody is atezolizumab developed by Genentech. In certain embodiments, the anti-PD-L1 antibody is durvalumab developed by AstraZeneca, Celgene and Medimmune. In certain embodiments, the anti-PD-L1 antibody is avelumab, also known as MSB0010718C, developed by Merck Serono and Pfizer. In certain embodiments, the anti-PD-L1 antibody is MDX-1105 developed by Bristol-Myers Squibb. In certain embodiments, the anti-PD-L1 antibody is AMP-224 developed by Amplimmune and GSK.

Non-limiting examples of anti-PD-L1 antibodies that may be used in treatment methods disclosed herein are disclosed in the following patents and patent applications, which are incorporated herein by reference in their entireties for all purposes: U.S. Pat. No. 7,943,743; 8,168,179; 8,217,149; 8,552,154; 8,779,108; 8,981,063; 9,175,082; U.S. Publication No. US 2010/0203056 A1; U.S. Publication No. US 2003/0232323 A1; U.S. Publication No. US 2013/0323249 A1; U.S. Publication No. US 2014/0341917 A1; U.S. Publication No. US 2014/0044738 A1; U.S. Publication No. US 2015/0203580 A1; U.S. Publication No. US 2015/0225483 A1; U.S. Publication No. US 2015/0346208 A1; U.S. Publication No. US 2015/0355184 A1; and PCT Publication No. WO 2014/100079 A1; PCT Publication No. WO 2014/022758 A1; PCT Publication No. WO 2014/055897 A2; PCT Publication No. WO 2015/061668 A1; PCT Publication No. WO 2015/109124 A1; PCT Publication No. WO 2015/195163 A1; PCT Publication No. WO 2016/000619 A1; and PCT Publication No. WO 2016/030350 A1.

In certain embodiments, an anti-LAG-3 antibody is used in methods disclosed herein. In certain embodiments, the anti-LAG-3 antibody is BMS-986016 developed by Bristol-Myers Squibb. In certain embodiments, the anti-LAG-3 antibody is LAG525 developed by Novartis. In certain embodiments, the anti-LAG-3 antibody is GSK2831781 developed by GSK.

Non-limiting examples of anti-LAG-3 antibodies that may be used in treatment methods disclosed herein are disclosed in the following patents and patent applications, which are incorporated herein by reference in their entireties for all purposes: U.S. Pat. No. 9,244,059: U.S. Publication No. US 2011/0150892 A1: U.S. Publication No. US 2014/0093511 A1: U.S. Publication No. US 2014/0286935 A1: U.S. Publication No. US 2015/0259420 A1; and PCT Publication No. WO 2015/042246 A1: PCT Publication No. WO 2015/116539 A1: PCT Publication No. WO 2015/200119 A1; and PCT Publication No. WO 2016/028672 A1.

In certain embodiments, an anti-EGFR antibody is used in methods disclosed herein. In certain embodiments, the anti-EGFR antibody is cetuximab developed by Bristol-Myers Squibb and ImClone, panitumumab developed by Abgenix and Amgen, nimotuzumab developed by CMI Cuba and YM Biosciences, necitumumab developed by ImClone, zalutumumab developed by Genmab, matuzumab developed by Takeda, Sym004 developed by Merck Serono and Symphogen, imgatuzumab developed by Glycart and Roche, duligotumab developed by Genentech and Roche, depatuxizumab developed by Abbott, depatuxizumab mafodotin developed by Abbvie, MM-151 developed by Adimab and Merrimack, GO 118 developed by Green Cross, AMG 595 developed by Amgen and ImmunoGen, CetuGEX developed by Glycotope, laprituximab emtansine developed by ImmunoGen, JNJ-61186372 developed by Genmab and Janssen Biotech, SCT200 developed by Sinocelltech, LY3164530 developed by Lilly, HLX07 developed by Shanghai Henlius, or SYN004 developed by Synermore.

In certain embodiments, an anti-HER2 antibody is used in methods disclosed herein. In certain embodiments, the anti-HER2 antibody is trastuzumab developed by Genentech and Roche, trastuzumab emtansine developed by Genentech and Roche, pertuzumab developed by Genentech, ertumaxomab developed by Fresenius, margetuximab developed by MacroGenics, MM-111 developed by Merrimack, CT-P06 developed by Celltrion, PF-05280014 developed by Pfizer, MM-302 developed by Merrimack, SB3 developed by Merck & Co, CMAB302 developed by Shanghai CP Guojian, TrasGEX developed by Glycotope, ARX788 developed by Ambrx and Zhejiang Medicine, SYD985 developed by Synthon, FS102 developed by Bristol-Myers Squibb and f-star, BCD-022 developed by Biocad, ABP 980 developed by Amgen, DS-8201a developed by Daiichi Sankyo, HLX02 developed by Shanghai Henlius, or CANMAb developed by Biocon and Mylan.

HDAC3 inhibitors or pharmaceutical composition described herein may be delivered to a subject by a variety of routes. These include, but are not limited to, parenteral, intranasal, intratracheal, oral, intradermal, topical, intramuscular, intraperitoneal, transdermal, intravenous, intratumoral, conjunctival and subcutaneous routes. Pulmonary administration can also be employed, e.g., by use of an inhaler or nebulizer, and formulation with an aerosolizing agent for use as a spray. In certain embodiments, the antibody or pharmaceutical composition described herein is delivered subcutaneously or intravenously. In certain embodiments, the antibody or pharmaceutical composition described herein is delivered intratumorally. In certain embodiments, the HDAC3 inhibitor or pharmaceutical composition disclosed herein is delivered to a tumor draining lymph node. In certain embodiments, the antibody or pharmaceutical composition described herein is delivered via a localized administration (e.g., subcutaneous administration). In certain embodiments, the HDAC3 inhibitor or pharmaceutical composition disclosed herein is delivered systemically. In certain embodiments, the HDAC3 inhibitor or pharmaceutical composition disclosed herein is delivered locally.

In one aspect, the present invention relates to an HDAC3 inhibitor and/or pharmaceutical composition of the present disclosure, and optionally an additional therapeutic agent, for use in a method for the treatment of cancer, wherein the HDAC3 inhibitor and/or pharmaceutical composition of the present disclosure is delivered intratumorally to the subject, is delivered to a tumor draining lymph node of a subject, or is delivered via a localized administration (e.g., subcutaneous administration) to a subject. Other delivery systems well known in the art can be used for delivery of the proteins and pharmaceutical compositions of the present disclosure, for example via aqueous solutions, encapsulation in microparticles, or microcapsules.

Pharmaceutical Compositions

Pharmaceutical compositions containing proteins of the present disclosure may be combined with a pharmaceutically acceptable carrier. The term carrier refers to diluents, adjuvants and/or excipients such as fillers, binders, disintegrating agents, lubricants, silica flow conditioner, stabilizing agents or vehicles with which the peptide, peptide derivative or peptidomimetic is administered. Such pharmaceutical carriers include sterile liquids such as water and oils including mineral oil, vegetable oil (e.g., peanut oil, soy bean oil, sesame oil and canola oil), animal oil or oil of synthetic origin. Aqueous glycerol and dextrose solutions as well as saline solutions may also be employed as liquid carriers of the pharmaceutical compositions of the present disclosure. Of course, the choice of the carrier depends on the nature of the peptide, peptide derivative or peptidomimetic, its solubility and other physiological properties as well as the target site of delivery and application. Examples of suitable pharmaceutical carriers are described in Remington: The Science and Practice of Pharmacy by Alfonso R. Gennaro, 2003, 21st edition, Mack Publishing Company (incorporated by reference herein in its entirety).

Further pharmaceutically suitable materials that may be incorporated in pharmaceutical preparations include absorption enhancers, pH regulators and buffers, osmolarity adjusters, preservatives, stabilizers, antioxidants, surfactants, thickeners, emollient, dispersing agents, flavoring agents, coloring agents and wetting agents.

Examples of suitable pharmaceutical excipients include, water, glucose, sucrose, lactose, glycol, ethanol, glycerol monostearate, gelatin, rice, starch, flour, chalk, sodium stearate, malt, sodium chloride and the like. The pharmaceutical compositions can take the form of solutions, capsules, tablets, creams, gels, powders, sustained release formulations and the like. The composition can be formulated as a suppository, with traditional binders and carriers such as triglycerides (see Remington: The Science and Practice of Pharmacy by Alfonso R. Gennaro, 2003, 21st edition, Mack Publishing Company: incorporated by reference herein in its entirety). Such compositions contain a therapeutically effective amount of the therapeutic composition, together with a suitable amount of carrier so as to provide the form for proper administration to the subject. The formulations are designed so as to suit the mode of administration and the target site of action (e.g., a particular organ or cell type).

Pharmaceutical compositions can be formulated as neutral or salt forms. Pharmaceutically acceptable salts include those that form with free amino groups and those that react with free carboxyl groups. Non-toxic alkali metal, alkaline earth metal and ammonium salts commonly used in the pharmaceutical industry include sodium, potassium, lithium, calcium, magnesium, barium, ammonium, and protamine zinc salts, which are prepared by methods well known in the art. The term also includes non-toxic acid addition salts, which are generally prepared by reacting the compounds of the present disclosure with suitable organic or inorganic acid. Representative salts include the hydrobromide, hydrochloride, valerate, oxalate, oleate, laureate, borate, benzoate, sulfate, bisulfate, acetate, phosphate, tysolate, citrate, maleate, fumarate, tartrate, succinate, napsylate salts and the like.

Examples of fillers or binders that may be used in accordance with the present disclosure include acacia, alginic acid, calcium phosphate (dibasic), carboxymethylcellulose, carboxy methylcellulose sodium, hydroxyethylcellulose, hydroxypropylcellulose, hydroxypropylmethylcellulose, dextrin, dextrates, sucrose, tylose, pregelatinized starch, calcium sulfate, amylose, glycine, bentonite, maltose, sorbitol, ethylcellulose, disodium hydrogen phosphate, disodium phosphate, disodium pyrosulfite, polyvinyl alcohol, gelatin, glucose, guar gum, liquid glucose, compressible sugar, magnesium aluminum silicate, maltodextrin, polyethylene oxide, polymethacrylates, povidone, sodium alginate, tragacanth, microcrystalline cellulose, starch, and zein. Another most preferred filler or binder consists of microcrystalline cellulose.

Examples of disintegrating agents that may be used include alginic acid, carboxymethylcellulose, carboxymethylcellulose sodium, hydroxypropylcellulose (low substituted), microcrystalline cellulose, powdered cellulose, colloidal silicon dioxide, sodium croscarmellose, crospovidone, methylcellulose, polacrilin potassium, povidone, sodium alginate, sodium starch glycolate, starch, disodium disulfite, disodium edathamil, disodium edetate, disodiumethylenediaminetetraacetate (EDTA) crosslinked polyvinylpyrollidines, pregelatinized starch, carboxymethyl starch, sodium carboxymethyl starch and microcrystalline cellulose.

Examples of lubricants include calcium stearate, canola oil, glyceryl palmitostearate, hydrogenated vegetable oil (type I), magnesium oxide, magnesium stearate, mineral oil, poloxamer, polyethylene glycol, sodium lauryl sulfate, sodium stearate fumarate, stearic acid, talc, zinc stearate, glyceryl behapate, magnesium lauryl sulfate, boric acid, sodium benzoate, sodium acetate, sodium benzoate/sodium acetate (in combination) and DL leucine.

Examples of silica flow conditioners include colloidal silicon dioxide, magnesium aluminum silicate and guar gum. Another most preferred silica flow conditioner consists of silicon dioxide.

Examples of stabilizing agents include acacia, albumin, polyvinyl alcohol, alginic acid, bentonite, dicalcium phosphate, carboxymethylcellulose, hydroxypropylcellulose, colloidal silicon dioxide, cyclodextrins, glyceryl monostearate, hydroxypropyl methylcellulose, magnesium trisilicate, magnesium aluminum silicate, propylene glycol, propylene glycol alginate, sodium alginate, carnauba wax, xanthan gum, starch, stearate(s), stearic acid, stearic monoglyceride and stearyl alcohol.

The amount of an HDAC3 inhibitor or composition which will be effective in the treatment and/or prevention of a condition will depend on the nature of the disease, and can be determined by standard clinical techniques.

The precise dose to be employed in a composition will also depend on the route of administration, and the seriousness of the infection or disease caused by it, and should be decided according to the judgment of the practitioner and each subject's circumstances. For example, effective doses may also vary depending upon means of administration, target site, physiological state of the subject (including age, body weight and health), whether the subject is human or an animal, other medications administered, or whether treatment is prophylactic or therapeutic. Usually, the subject is a human but non-human mammals including transgenic mammals can also be treated. Treatment dosages are optimally titrated to optimize safety and efficacy.

It will be readily apparent to those skilled in the art that other suitable modifications and adaptations of the methods described herein may be made using suitable equivalents without departing from the scope of the embodiments disclosed herein. Having now described certain embodiments in detail, the same will be more clearly understood by reference to the following examples, which are included for purposes of illustration only and are not intended to be limiting.

Example 1: Epigenetic Inhibitor Screening

To screen for compounds that may inhibit epigenetic enzymes, an in vitro model of T cell activation by antigen-loaded antigen presenting cells (APCs) was used. CD8+ T cells were harvested from OT-I T cell receptor transgenic mice. OT-I mice are transgenic for the mouse Tcra-V2 and Tcrb-V5 genes, which form a T cell receptor that recognizes the SIINFEKL peptide (SEQ ID NO: 1) epitope of chicken ovalbumin presented in the context of the Kb MHC I molecule. This allows testing of T cell activation in response to addition of SIINFEKL peptide (SEQ ID NO: 1). The APCs used for T cell activation were bone marrow-derived dendritic cells (BMDCs) harvested from congenic H-2b-MHC haplotype C57BL/6 (B6) mice.

FIG. 1 shows a schematic diagram of the cells and compounds used in the screening process. To set up the screen, BMDCs were harvested, irradiated, and seeded into 96-well tissue culture plates (5×104/well) in the presence of 200 nM SIINFEKL peptide (SEQ ID NO: 1) for antigen loading. OT-I+ CD8+ T cells were freshly isolated from peripheral lymphoid organs of OT-I mice and added to the BMDCs in 96-well plates (5×104/well). One hundred epigenetic inhibitor drugs from a custom library provided by Dr. David Fisher (Massachusetts General Hospital, Boston, MA) were added separately to individual wells for a final concentration of 10 µM or 1 µM. Negative (non-drug treated) wells were given an equivalent volume of DMSO vehicle.

The OT-I+ CD8+ T cells were cultured for 10 days at 37° C., with media changes at days 3, 5, and 7. After 10 days, T cells were collected from the 96-well plates and analyzed by flow cytometry for markers of cell viability, effector differentiation, cytokine secretion, and cytotoxicity.

For each marker assessed, a change of greater than two standard deviations from the mean of the negative control wells was deemed a significant change. To generate a list of candidate drug hits, the drugs were ranked based on the number of markers in which drug treatment resulted in significant phenotypic changes.

The preliminary screen revealed a number of HDAC inhibitors that significantly altered the T cell effector phenotype. A secondary screen was conducted with these HDAC inhibitors, and it was found that only RGFP966, a HDAC3-specific inhibitor, consistently augmented the effector phenotype of CD8+ T cells in the in vitro activation assay when given at a dose of 10 µM.

Example 2: Flow Cytometry Analysis of Phenotype of OT-I+ CD8+ T Cells Activated in the Presence of RGFP966

To validate the phenotypic changes observed with RGFP966 treatment during the screen, the in vitro activation assay was repeated to compare T cells treated with RGFP966 with vehicle-treated control cells. OT-I+ CD8+ T cells were activated with SIINFEKL-pulsed BMDCs as in Example 1 for 7 days, with media changes at days 3 and 5. T cells were then collected and analyzed by flow cytometry for markers of effector differentiation (CD25, PD-1), cytokine secretion (IFN-γ, TNF-α, IL-2), and cytotoxicity (granzyme B).

Figure 2A:
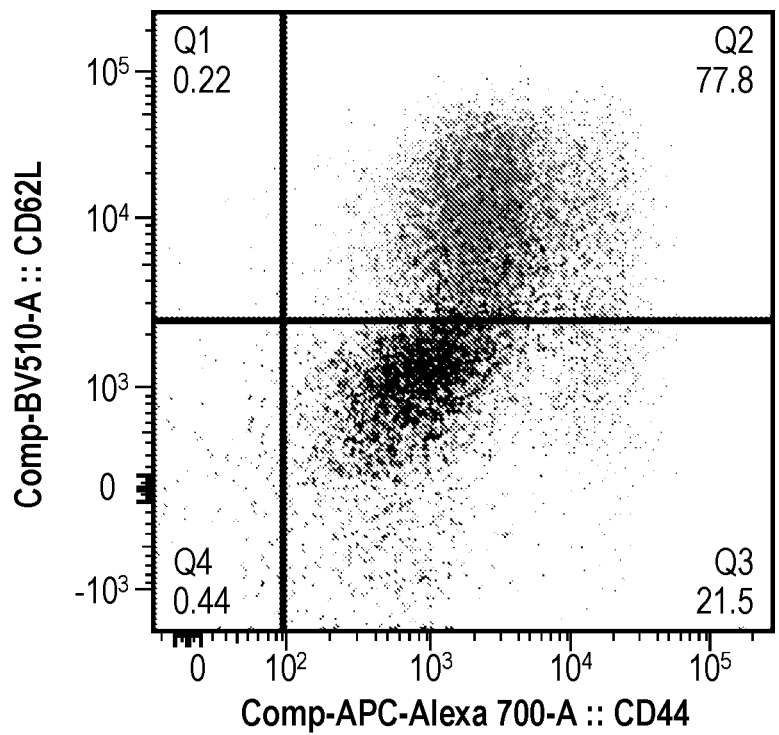
FIG. 2A is a scatterplot depicting flow cytometry analysis of CD8$^+$ T cells treated with RGFP966. The cells were analyzed for the markers CD44 and CD62L to identify effector and memory T cells. Light gray dots indicate CD8$^+$ T cells treated with 10 μM RGFP966, and dark gray dots indicate vehicle-treated CD8$^+$ T cells. Details are discussed in Example 2.

The HDAC3 inhibitor molecule RGFP966 was found to increase the expression of effector cell markers by administration of RGFP966 as compared with vehicle controls. FIG. 2A shows a flow cytometry scatterplot of cultured OT-I+ CD8+ T cells with and without RGFP966 treatment labeled for markers CD44 and CD62L to identify effector and memory T cells. Light gray dots (seen mostly in quadrant 2) indicate CD8+ T cells treated with 10 µM RGFP966, and dark gray dots (seen mostly in quadrant 3) indicate vehicle-treated CD8+ T cells. Activated T cells have high expression of CD62L and intermediate to high expression of CD44, while naïve T cells exhibit high expression of CD62L and low expression of CD44. Memory T cells are identified by high expression of CD44 and low expression CD62L. The flow cytometric data of FIG. 2A show that a much greater population of RGFP966-treated OT-I+ CD8+ T cells (light gray dots) have high expression of CD62L and intermediate to high expression of CD44, indicating activated effector T cells, whereas untreated OT-I+ CD8+ T cells (dark gray dots) show lower expression of both CD44 and CD62L, indicating that they are mostly memory T cells.

Figure 2B:
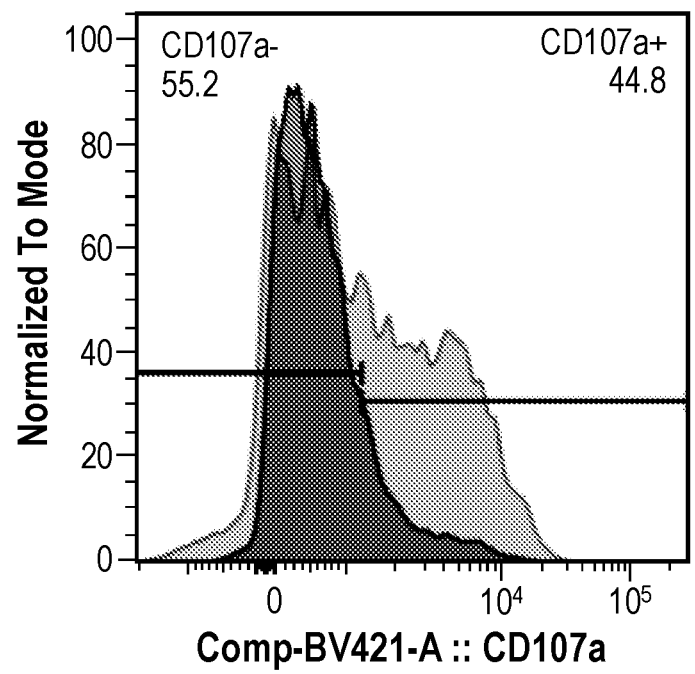
FIG. 2B is a normalized histogram depicting the relative expression of CD107a (a marker of T cell activation) by activated OT-I$^+$ CD8$^+$ T cells, detected using flow cytometry. The dark gray curve indicates CD107a positive CD8$^+$ T cells treated with vehicle; the light gray curve indicates CD107a positive CD8$^+$ T cells treated with 10 μM RGFP966.
Figure 2C:
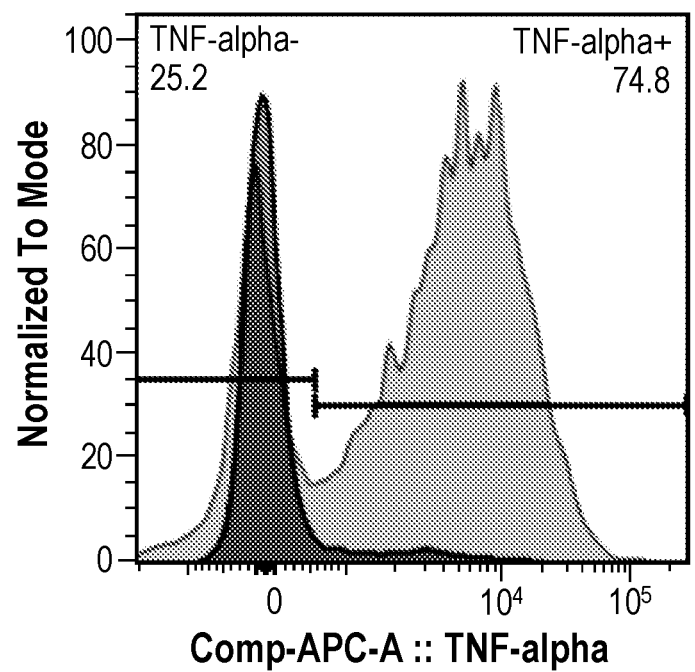
FIG. 2C is a normalized histogram depicting the relative expression of TNF-α (a marker of T cell activation) by activated OT-I$^+$ CD8$^+$ T cells, detected using flow cytometry. The dark gray histogram indicates TNF-α positive CD8$^+$ T cells treated with vehicle control; the light gray histogram indicates TNF-α positive CD8$^+$ T cells treated with 10 μM RGFP966.

Treated and untreated cells cultured using the in vitro activation assay described above were also analyzed for the expression of CD107a and TNF-α, phenotypic markers for effector differentiation, and analyzed by flow cytometry as described above. FIG. 2B shows a normalized histogram comparing the relative expression of CD107a between 10 µM RGFP966-treated T cells and T cells treated with vehicle control. The dark gray curve indicates CD107a positive CD8+ T cells treated with vehicle: the light gray curve indicates CD107a positive CD8+ T cells treated with 10 M RGFP966. The RGFP966-treated T cells showed many more CD107a positive cells than the vehicle controls, indicating that many more of the RGFP966-treated T cells were activated. FIG. 2C shows a normalized histogram depicting the relative expression of TNF-α by activated OT-I+ CD8+ T cells, detected using flow cytometry. The dark gray curve indicates CD107a positive CD8+ T cells treated with vehicle: the light gray histogram indicates CD107a positive CD8+ T cells treated with 10 µM RGFP966. The RGFP966-treated T cells have a larger number of TNF-α positive cells than the untreated T cells, indicating along with CD107a that RGFP966 increases CD8+ T cell activation.

An additional study was done on the effects of RGFP966 on T cell expression of phenotypic markers of CD8+ effector differentiation. T cells were treated with RGFP966 and vehicle using the in vitro activation assay and flow cytometry techniques described above. OT-I+ CD8+ T cells were activated with SIINFEKL-pulsed BMDCs (see above) for 7 days, with media changes at days 3 and 5. T cells were collected and analyzed by flow cytometry for markers of effector differentiation (CD25, PD-1), cytokine secretion (IFN-γ, TNF-α, IL-2), and cytotoxicity (granzyme B).

Figure 2D:
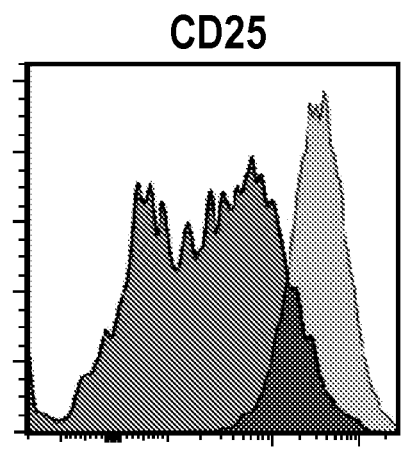
FIG. 2D is a flow cytometry histogram for the marker CD25 in an activated T cell assay.
Figure 2E:
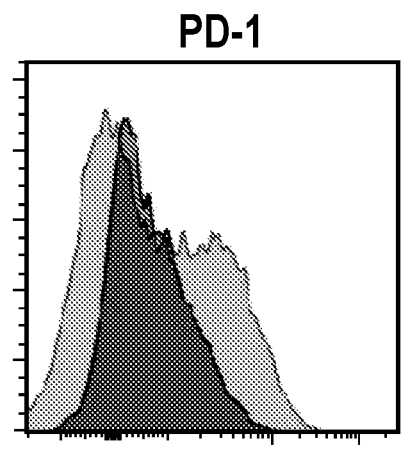
FIG. 2E is a flow cytometry histogram for the marker PD-1 in an activated T cell assay.
Figure 2F:
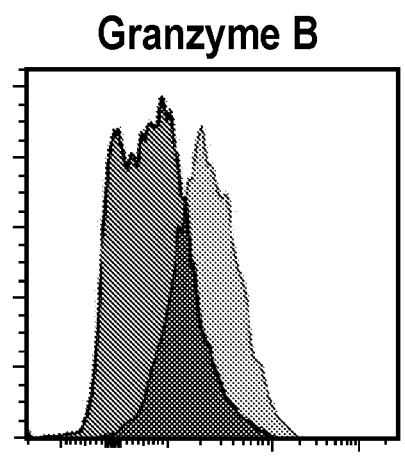
FIG. 2F is a flow cytometry histogram for the marker granzyme B in an activated T cell assay.
Figure 2G:
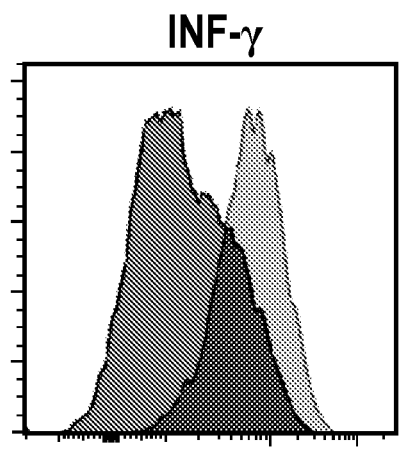
FIG. 2G is a flow cytometry histogram for the marker IFN-γ in an activated T cell assay.
Figure 2H:
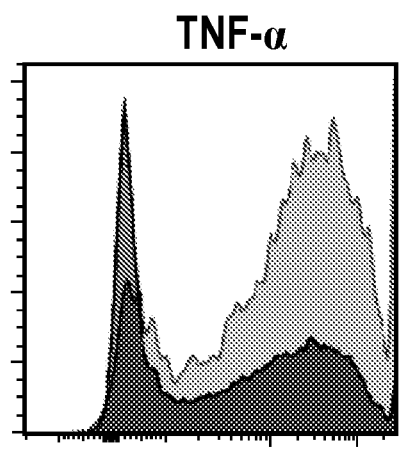
FIG. 2H is a flow cytometry histogram for the marker TNF-α in an activated T cell assay.
Figure 2I:
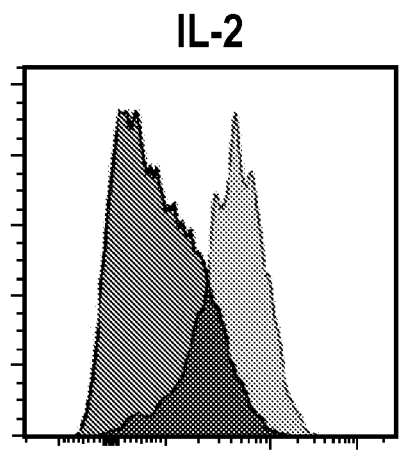
FIG. 2I is a flow cytometry histogram for the marker IL-2 in an activated T cell assay.

FIGS. 2D-2I show normalized histograms for various markers of effector T cell differentiation (x-axis is fluorescence intensity, y-axis is cell number). CD8+ T cells treated with 10 µM RGFP966 (light gray curves) had a phenotype more consistent with that of highly-activated effector CD8+ T cells than the phenotype of DMSO-vehicle treated CD8+ T cells (dark gray curves). FIG. 2D shows a histogram of the marker CD25, FIG. 2E shows a histogram for the marker PD-1, FIG. 2F shows a histogram for the marker granzyme B, FIG. 2G shows a histogram for the marker IFN-γ, FIG. 2H shows a histogram for the marker TNF-α, and FIG. 2I shows a histogram for the marker IL-2.

Figure 2J:
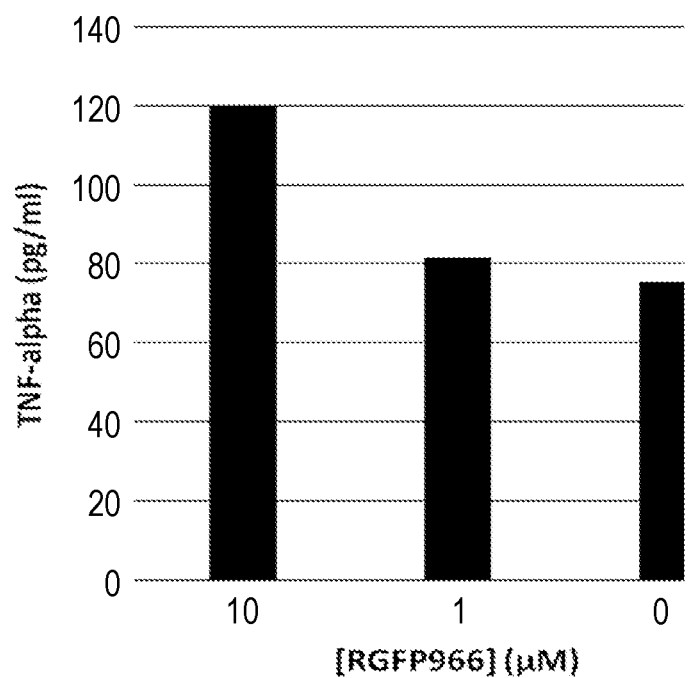
FIG. 2J is a bar chart showing the amount of TNF-α expression (in pg/ml) detected for activated OT-I$^+$ CD8$^+$ T cells that have been treated with 10 UM and 1 μM RGFP966, as well as vehicle.

FIG. 2J shows measurement of TNF-α expression by RGFP966-treated cells in pg/mL, illustrating the dose-dependent effect of RGFP966 on T cell activation. T cells treated with 10 µM RGFP966 show increased expression of the activation marker TNF-α as compared with T cells treated with only 1 µM RGFP966 or vehicle control.

The data demonstrated that RGFP966-treated CD8+ T cells expressed (1) higher levels of CD25 and PD-1, indicating greater activation: (2) higher levels of the CD8+ effector cytokines IFN-γ, TNF-α, and IL-2; and (3) more of the cytotoxic effector protein granzyme B relative to DMSO-treated cells. These data demonstrate that RGFP966 treatment during CD8+ T cell activation could augment their cytotoxicity.

Example 3: Proliferation of T Cells in Response to RGFP966

Figure 3:
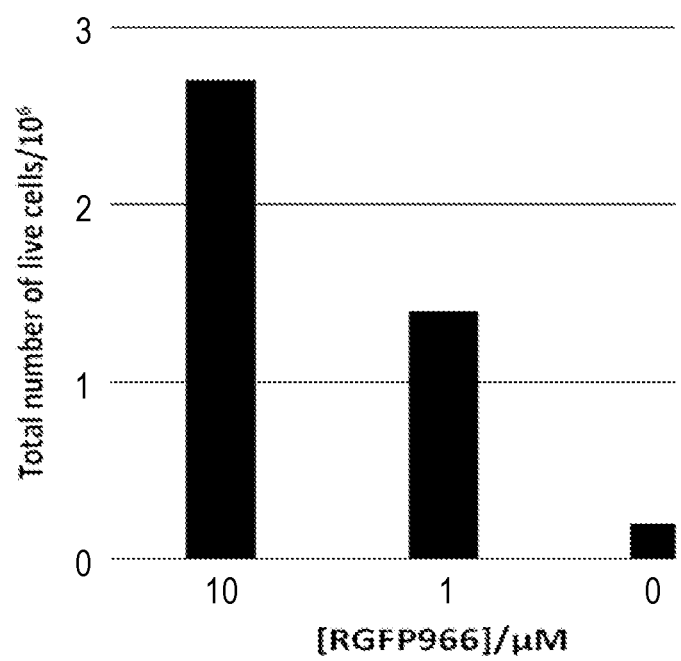
FIG. 3 is a bar chart showing the total number of live cells detected for activated OT-I$^+$ CD8$^+$ T cells that have been treated with 10 UM and 1 μM RGFP966, as well as vehicle control. Details are discussed in Example 3.

T cells treated with RGFP966 also show increased proliferation relative to untreated T cells. FIG. 3 is a bar chart the total number of live cells detected in flow cytometry for activated OT-I+ CD8+ T cells that have been treated with 10 µM, 1 µM RGFP966, and no RGFP966 (vehicle control). RGFP966-treated T cells show a dose-dependent response to the molecule, with 10 µM RGFP966 increasing T cell proliferation as compared to T cells treated with 1 µM RGFP966, and the 1 µM RGFP966 dose increasing T cell proliferation over vehicle control.

Example 4: Activated T Cell Cytotoxicity in Response to RGFP966

In order to functionally assess the phenotype of OT-I+ CD8+ T cells activated in the presence of RGFP966, the ability of the activated T cells to kill B16 melanoma tumor cell targets expressing the cognate SIINFEKL (SEQ ID NO: 1) antigen of the OT-I TCR was assayed.

The B16-Ova cells were engineered to express chicken ovalbumin in their cytosol, and express SIINFEKL (SEQ ID NO: 1) on Kb MHC I molecules when treated with IFN-γ. In preparation for the cytotoxicity assay, B16-Ova cells were treated with 10 ng/ml IFN-γ for 48 hours prior to harvest and loading with $^{51}$Cr radionuclide. After radiolabeling, B16-Ova cells were seeded into 96-well plates (5×10³/well) and allowed to adhere for 1 hour prior to addition of CD8+ effector cells.

OT-I+ CD8+ T cells were activated as described above using SIINFEKL-pulsed BMDCs in the presence of 10 µM, 1 µM, or 0 µM RGFP966. After 7 days of activation, T cells were harvested, washed to remove the drug, and counted. OT-I+ CD8+ effector cells were added to the assay plates containing B16-Ova target cells at the indicated ratios: there was no drug present during the cytotoxicity assay. Specific killing of targets was assessed by measurement of 51Cr release from the culture supernatant 4 hours after co-culture.

Figure 4A:
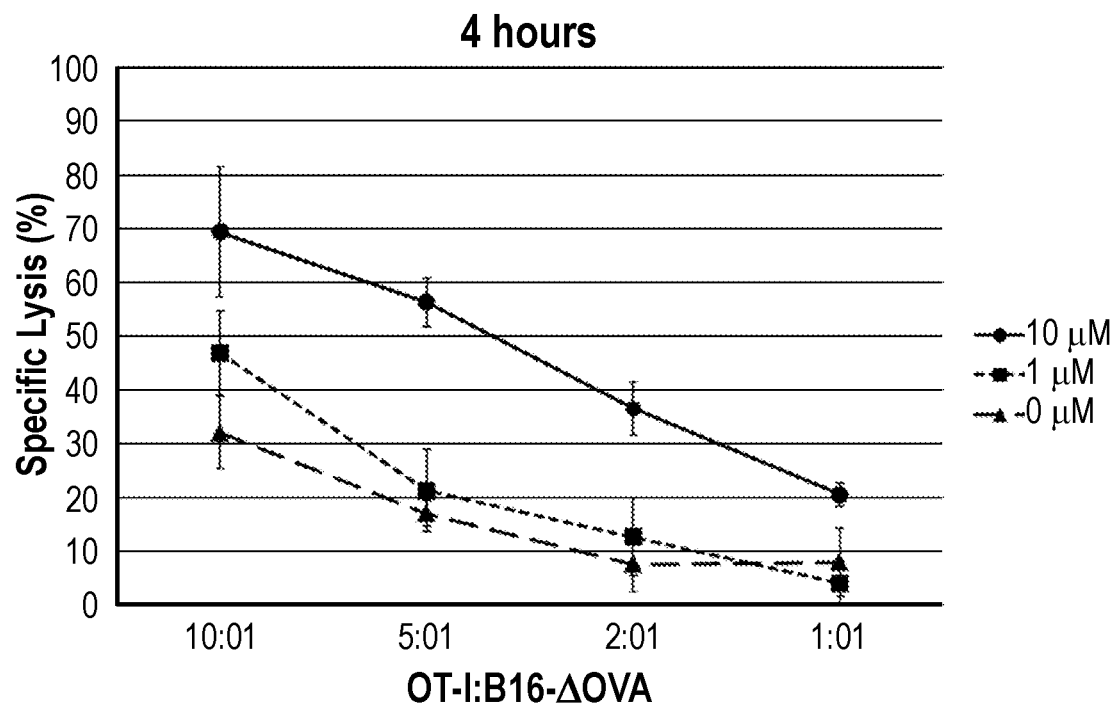
FIG. 4A is a line graph showing the percentage of specific lysis of ovalbumin-expressing cells by activated OT-I$^+$ CD8$^+$ T cells that have been treated with 10 μM and 1 μM RGFP966, as well as with vehicle control. Details are discussed in Example 4.
Figure 4B:
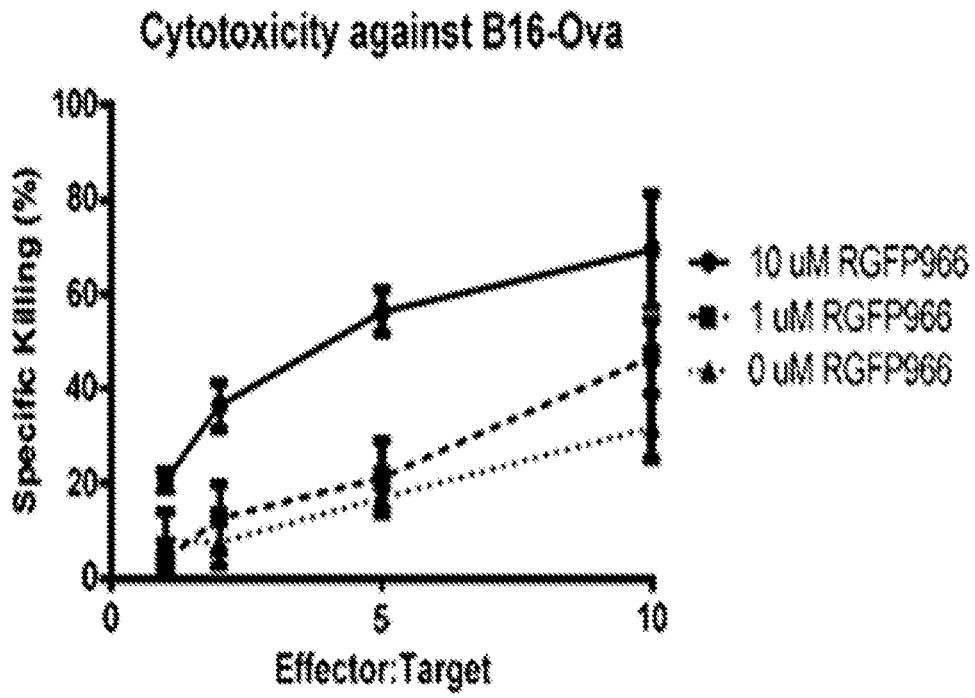
FIG. 4B shows a line graph plotting the percentage of specific cell lysis by T cell effector: target ratio, at ratios of 0:1, 5:1, and 10:1.

T cells treated with RGFP966 also show enhanced cytotoxicity against cells expressing target antigen. FIG. 4A is a line graph showing the percentage of specific lysis of SIINFEKL-pulsed BMDCs by activated OT-I+ CD8+ T cells treated with 10 µM and 1 µM RGFP966, as well as with vehicle control. Analysis of cell-specific lysis was examined after four hours of co-incubation. OT-I+ CD8+ T cells were tested at various ratios relative to the target SIINFEKL-pulsed BMDCs (10:1, 5:1, 2:1 and 1:1). Specific lysis of cells expressing target antigen was enhanced to nearly 70% for T cells treated with 10 µM RGFP966 (circle data points). The cytolytic effect of RGFP966 is dose-dependent, with 1 µM RGFP966-treated T cells showing only about 45% specific lysis (square data points), and the vehicle showing only about 30% specific lysis (triangle data points). FIG. 4B is a line graph plotting the effector: target ratio of RGFP966-treated and vehicle-treated T cells to target SIINFEKL-pulsed BMDCs at ratios of 0:1, 5:1, and 10:1.

CD8+ T cells activated in the presence of the HDAC3 inhibitor RGFP966 were able to kill cognate antigen-expressing target cells more effectively than untreated cells. This increase in cytotoxicity with RGFP966 treatment occurred in a dose-dependent manner, with 1 µM RGFP966 treatment showing a modest but non-significant increase in cytotoxicity over control treatment. This was consistent with the augmented effector phenotype observed by flow cytometry described above.

Example 5: RGFP966 Acts in a CD8+ T Cell-Intrinsic Manner to Augment the Activated T Cell Effector Phenotype It was important to determine whether the observed effect of RGFP966 on CD8+ T cells post-activation was due to the drug acting on T cells, on the antigen-presenting cells, or both. To do so, the effect of RGFP966 treatment on CD8+ T cells activated was compared in parallel using either antigen-pulsed BMDCs or antibodies against CD3 and CD28. The latter method of activating T cells is free of APCs and allowed determination of whether the effect of RGFP966 required the presence of APCs.

96-well tissue culture plates were coated with 10 µg/ml α-CD3 antibodies overnight at 4° C., then washed with PBS prior to addition of OT-I+ CD8+ T cells (2×105/well) and α-CD28 antibody (2 µg/ml) (labeled as anti-CD3 and anti-CD28). OT-I+ CD8+ T cells from the same batch of cells were also activated in parallel on antigen-loaded BMDCs (labeled as BMDC+SIINFEKL (SEQ ID NO: 1)) were prepared as described above. T cells were activated for 7 days, with media changes on days 3 and 5, then collected for flow cytometry phenotype analysis.

Figure 5A:
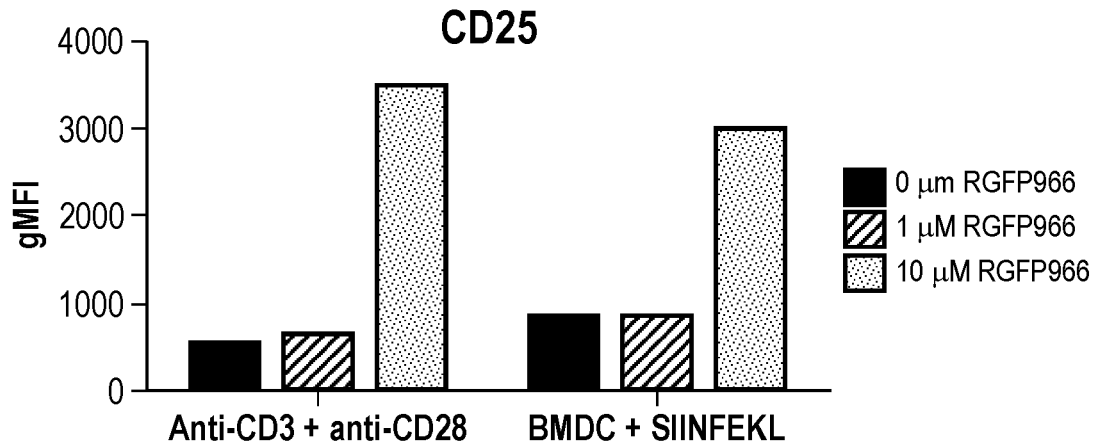
FIG. 5A shows a bar chart of the percentage of CD25 marker-bearing cells by flow cytometry, following treatment with an HDAC3 inhibitor. Details are discussed in Example 5.
Figure 5B:
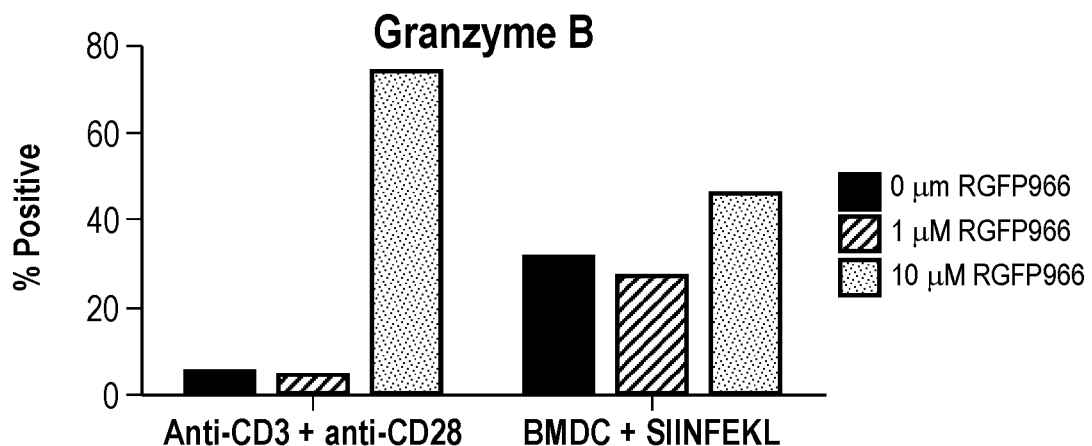
FIG. 5B shows a bar chart of the percentage of granzyme B marker-bearing cells by flow cytometry, following treatment with an HDAC3 inhibitor.
Figure 5C:
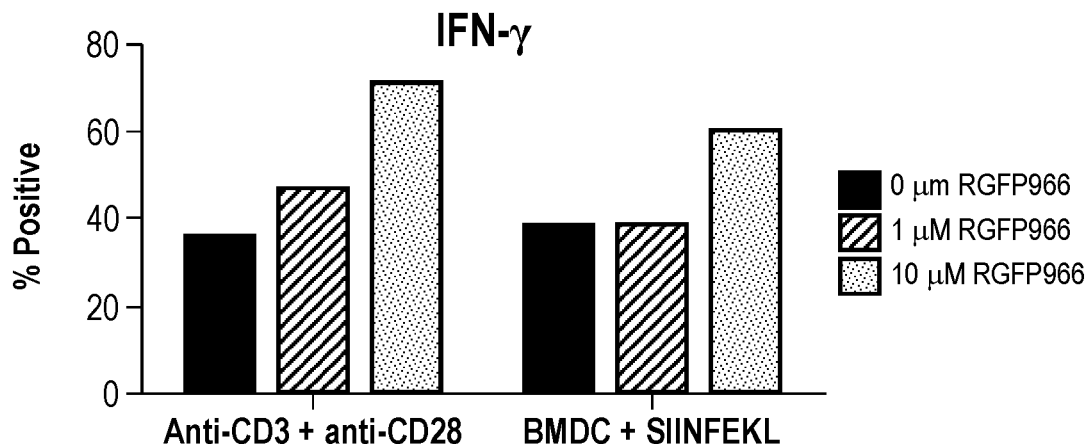
FIG. 5C shows a bar chart of the percentage of IFN-γ marker-bearing cells by flow cytometry, following treatment with an HDAC3 inhibitor.
Figure 5D:
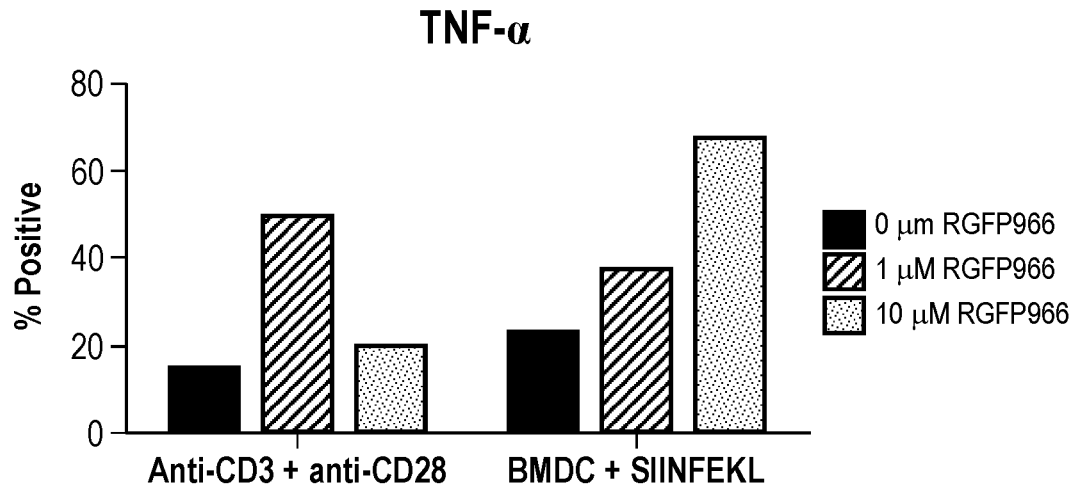
FIG. 5D shows a bar chart of the percentage of TNF-α marker-bearing cells by flow cytometry, following treatment with an HDAC3 inhibitor.
Figure 5E:
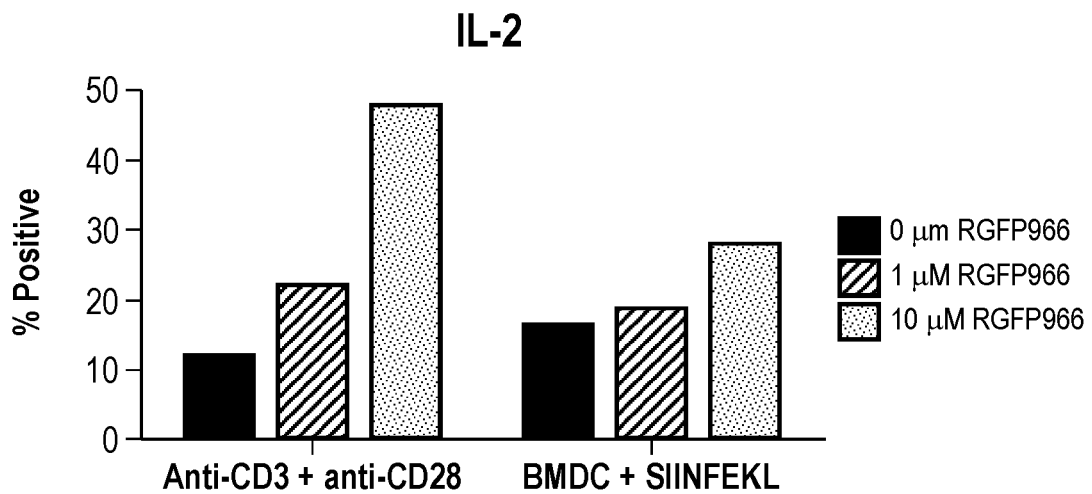
FIG. 5E shows a bar chart of the percentage of IL-2 marker-bearing cells by flow cytometry, following treatment with an HDAC3 inhibitor.

FIGS. 5A-5E show bar charts illustrating the percentage of cells detected with various markers following treatment with RPFG966. FIG. 5A shows cells with the marker CD25, FIG. 5B shows the marker granzyme B, FIG. 5C shows the marker IFN-γ, FIG. 5D shows the marker TNF-α, FIG. 5E shows the marker IL-2. Overall, RGFP966 treatment of OT-I+ CD8+ T cells during activation augmented their T cell effector phenotype across both methods of T cell activation. This was evidenced by their increased expression of the activation marker CD25, increased levels of effector cytokine expression, and increased granzyme B positivity relative to DMSO-treated control samples. These data indicated that the observed T cell phenotype post-activation with RGFP966 treatment was due to a T cell-intrinsic effect of the drug.

Example 6: Validation of HDAC3 by CRISPR/Cas9 Mediated Deletion in T Cells

Evaluating the Phenotype of HDAC3-Deficient CD8+ T Cells Post-Activation

In order to determine whether the augmented T cell effector phenotype observed with RGFP966 treatment was a result of HDAC3 inhibition, the effect of genetic deletion of HDAC3 on OT-I+ CD8+ T cell activation in vitro was evaluated using SIINFEKL-pulsed BMDCs.

To do so, CRISPR technology was utilized to generate HDAC3- and LacZ-KO CD8+ T cells in vitro. OT-I+ CD8+ Cas9+ T cells were spin-transduced with lentiviral vectors expressing gRNA sequences targeting either HDAC3 or LacZ (a non-mouse genome binding sequence) following conditioning for 2 days in 100 ng/ml IL-15 and 5 ng/ml IL-7. Transduced cells were cultured for a further 3 days with 50 ng/ml IL-15, 2.5 ng/ml IL-7, and 2 ng/ml IL-2, purified for lentiviral marker expression, and then transferred to plates seeded with SIINFEKL-pulsed irradiated BMDCs for T cell activation.

As controls for the augmented effector phenotype, a portion of cells from the same batch of OT-I+ CD8+ Cas9+

Figure 6A:
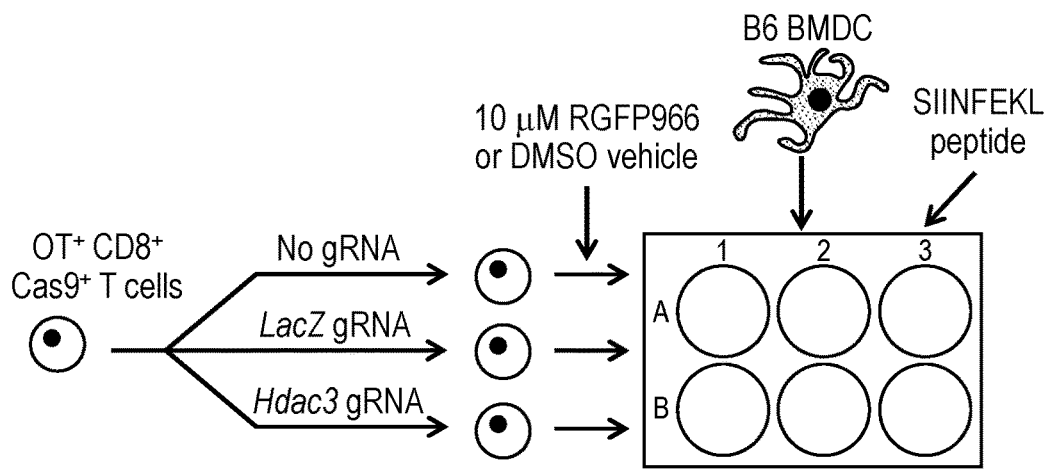
FIG. 6A is a schematic diagram of an epigenetic inhibitor assay using T cells with HDAC3 removed using CRISPR/Cas-9. Details are discussed in Example 6.

T cells was treated with the same cytokine conditioning regimen in parallel without lentivirus, and then treated with either 10 µM RGFP966 (positive control) or an equivalent volume of DMSO vehicle (negative control) during activation with BMDCs. T cells were activated for 7 days, with media changes on days 3 and 5. FIG. 6A shows a schematic diagram for the cell types and RGFP966 treatments described above.

Western Blot Analysis of HDAC3-Targeting gRNA Sequences

The protein reduction of HDAC3-targeting gRNA sequences was evaluated using western blot analysis for HDAC3 over a time course. Lentiviral vectors expressing gRNAs targeting LacZ, or one of two gRNA sequences targeting different regions of the HDAC3 genomic locus (gRNA 5 and 58) were transduced into OT-I$^+$ CD8$^+$ Cas9$^+$ T cells. Three days after transduction, T cells were magnetically selected for Thy1.1 lentiviral marker expression to >94% purity and cultured for a further 4 days. 1×10$^6$ cells were collected on the day of purification and at the end of the cell culture (day 3 and day 7 post-transduction, respectively), and immunoblotted for HDAC3 and GAPDH expression (protein loading control).

M—mock-transduced cells, kDa—molecular weight standard ladder, LZ-LacZ gRNA-transduced cells, g5 and g58— HDAC3 gRNA-transduced cells (gRNA 5 and 58, respectively).

Figure 6B:
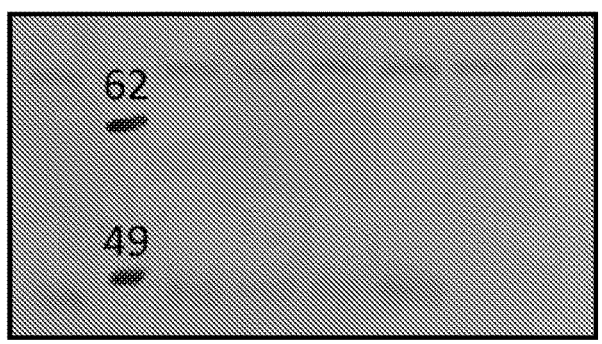
FIG. 6B depicts western blot images of proteins extracted from the Cas-9 transformed T cells of FIG. 6A.
Figure 6B:
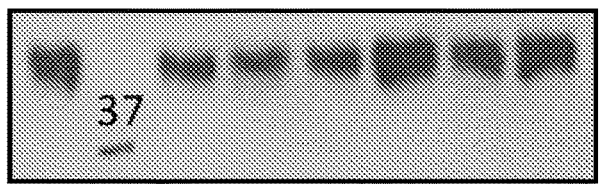

FIG. 6B shows western blot images of protein extracts from the epigenetic inhibitor assay described above. Both HDAC3-targeting gRNAs reduced HDAC3 protein to 80% of the level expressed by LacZ gRNA-transduced cells by day 3 post-transduction: HDAC3 was virtually undetectable in the two HDAC3 gRNA-transduced samples by 7 days post-transduction. The data confirmed that transduction of either these two gRNAs would yield bona fide HDAC3-knockout T cells. For subsequent analyses, gRNA 5 was used to generate HDAC3-KO T cells unless otherwise noted.

Flow Cytometry Analysis of Phenotype of HDAC3-Deficient CD8$^+$ T Cells Post-Activation CD8$^+$ T cells were isolated from peripheral lymphoid organs of OT-I$^+$ Cas9$^+$ mice, treated with 4 different conditions as described in (A), and activated on SIINFEKL-pulsed irradiated BMDCs for 7 days, with media changes on days 3 and 5. Cells were collected on day 7 and analyzed for expression of activation markers, CD8$^+$ T cell effector cytokines, and cytotoxicity markers by flow cytometry.

Figure 6C:
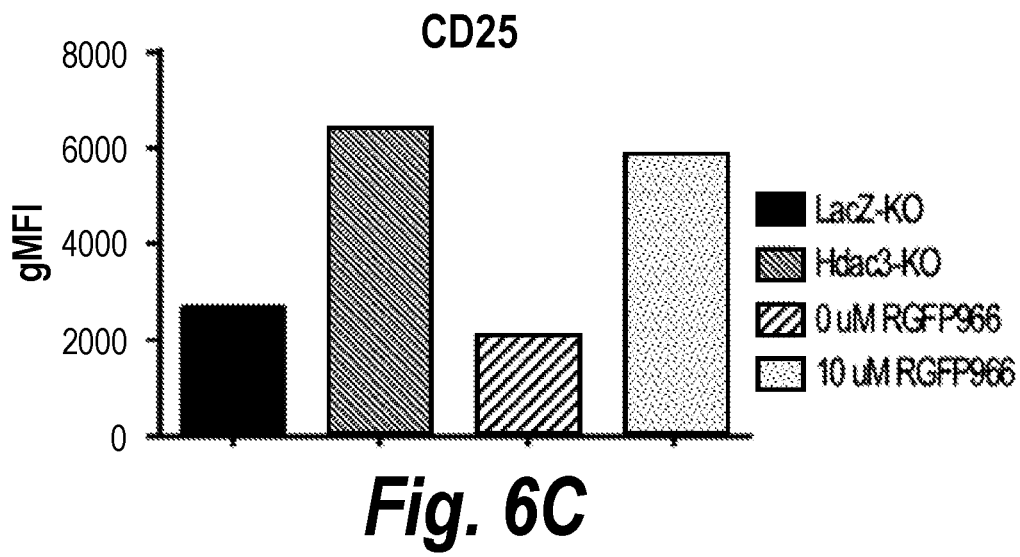
FIG. 6C shows a bar chart of the percentage of Cas-9 transformed T cells and RPFG966-treated activated T cells that express the marker CD25.
Figure 6D:
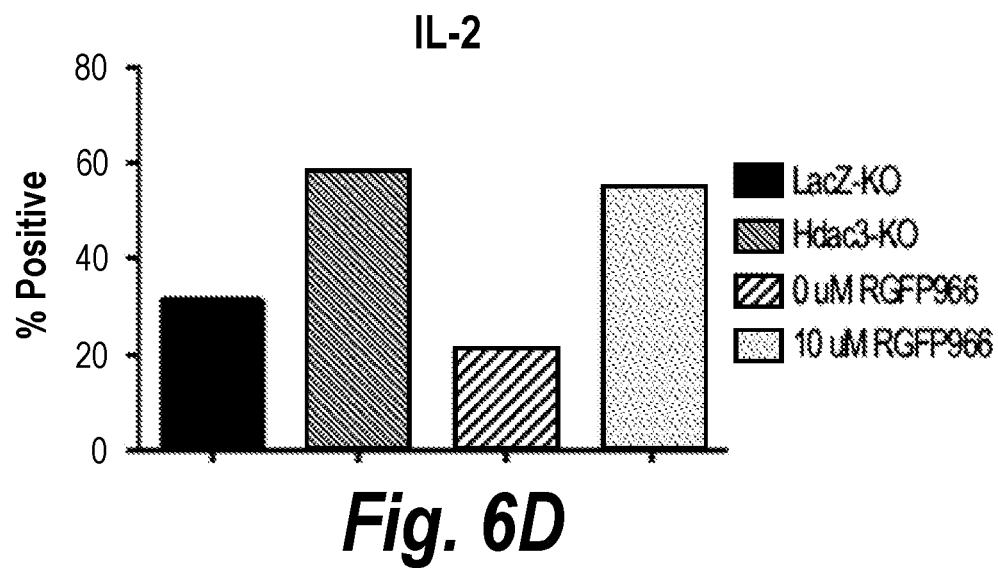
FIG. 6D shows a bar chart of the percentage of Cas-9 transformed T cells and RPFG966-treated activated T cells that express the marker IL-2.
Figure 6E:
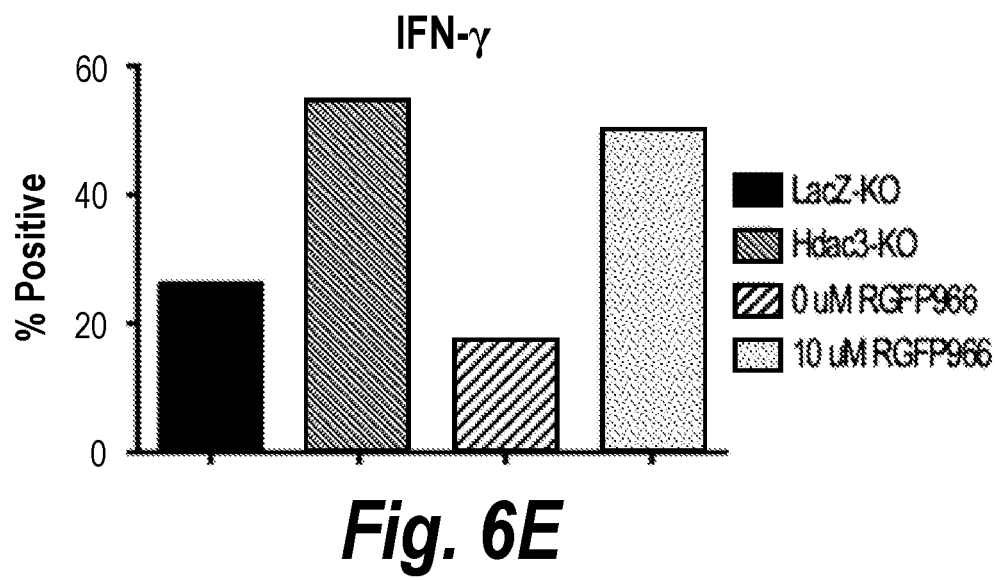
FIG. 6E shows a bar chart of the percentage of Cas-9 transformed T cells and RPFG966-treated activated T cells that express the marker IFN-γ.
Figure 6F:
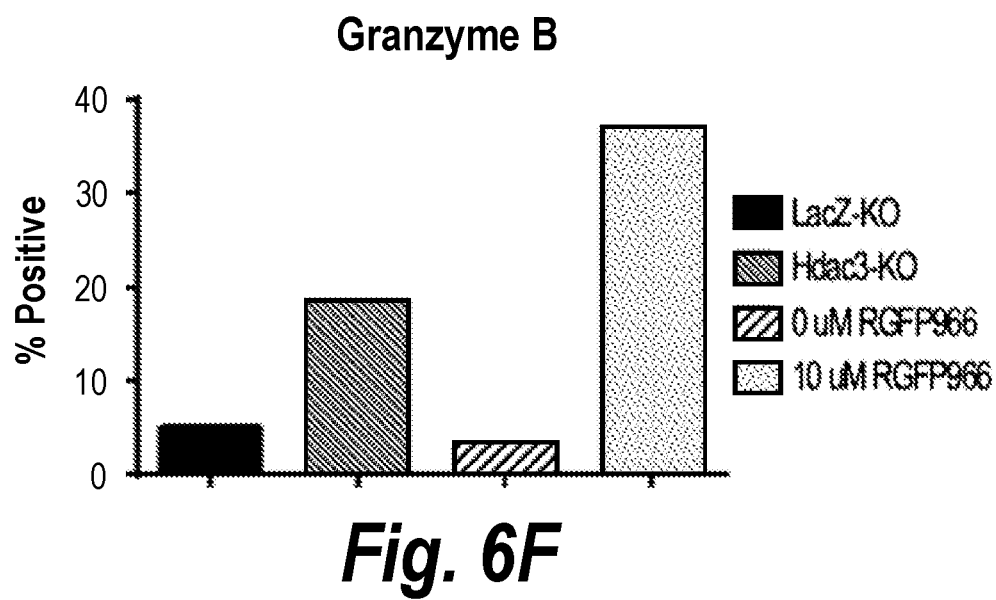
FIG. 6F shows a bar chart of the percentage of Cas-9 transformed T cells and RPFG966-treated activated T cells that express the marker granzyme B.

FIGS. 6C-6F show bar charts of the phenotypic markers analyzed: FIG. 6C is CD25 (mean fluorescence intensity on y-axis), FIG. 6D is IL-2, FIG. 6E is IFN-γ, and FIG. 6F is granzyme B. Overall, HDAC3 deletion phenocopied the effect of RGFP966 treatment in augmenting CD8$^+$ T cell effector phenotype by increasing expression of the activation marker CD25, levels of the effector cytokines IL-2 and IFN-γ, as well as expression of the cytotoxic effector protein granzyme B. These data demonstrated that HDAC3-deficient CD8$^+$ T cells might be more efficient at killing cognate antigen-expressing targets, similar to RGFP966-treated CD8$^+$ T cells.

In Vitro Cytotoxicity of OT-I$^+$ CD8$^+$ T Cells Against B16-Ova Tumor Cell Targets To verify that genetic ablation of HDAC3 functionally recapitulated the augmented cytotoxic effector phenotype of HDAC3 inhibition using RGFP966, HDAC3-KO T cells were generated from OT-I$^+$ CD8$^+$ Cas9$^+$ T cells as described above, and compared with RGFP966-treated T cells from the same batch in an in vitro cytotoxicity assay.

Figure 6G:
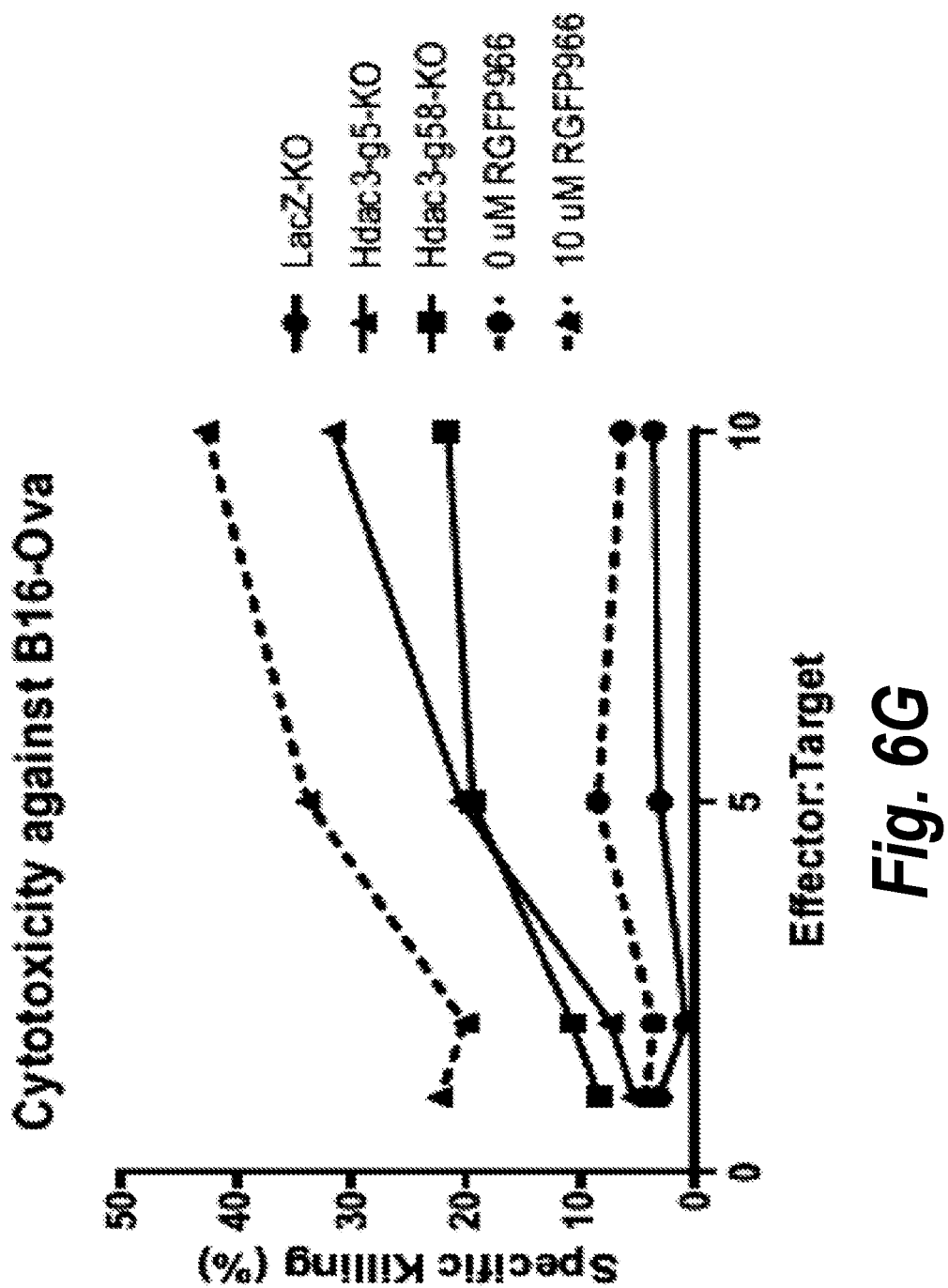
FIG. 6G is a line graph of a cytotoxicity assay for RGFP966-treated T cells and for Cas-9 transformed T cells with genetically deleted HDAC3.

The cytotoxicity assay was performed as described above. FIG. 6G shows a graph comparing the percentage of specific killing for HDAC3 knockout T cells. Whereas LacZ-KO OT-I$^+$ CD8$^+$ T cells displayed comparable cytotoxicity against B16-Ova cells to DMSO-treated control OT-I$^+$ CD8$^+$ T cells, HDAC3-KO OT-I$^+$ CD8$^+$ T cells were significantly more cytotoxic than either of the two negative controls, being about 50-60% as cytotoxic as 10 µM RGFP966-treated OT-I$^+$ CD8$^+$ T cells. This effect was observed across HDAC3-KO T cells generated using gRNA 5 or gRNA 58.

Overall, the data from these experiments using pharmacological and genetic perturbations of HDAC3 confirm that HDAC3 negatively regulates CD8$^+$ T cell effector phenotype during activation.

Example 7: HDAC3 Negatively Regulates CD8$^+$ T Cell Effector Phenotype During Early Activation RGFP966 Dosing Scheme to Uncover Time Window of Action of HDAC3 During CD8$^+$ T Cell Activation To uncover the mechanism of action of HDAC3 negative regulation of CD8$^+$ T cell effector phenotype, the time window of RGFP966 action within the time course of T cell activation was determined.

Figure 7A:
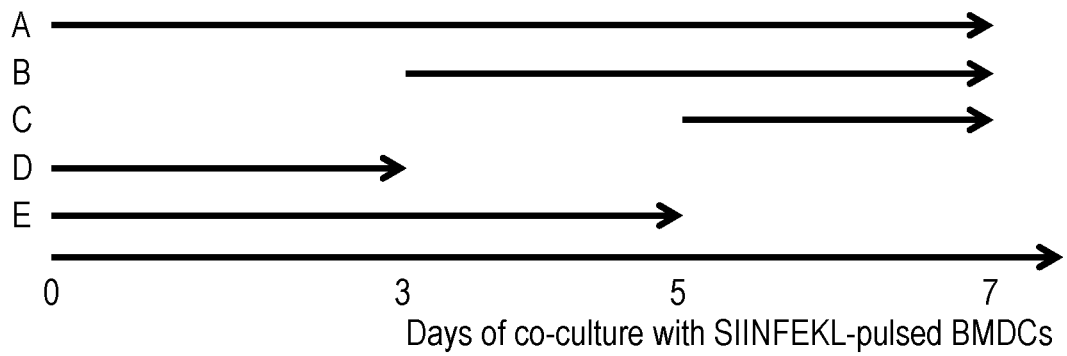
FIG. 7A is a schematic diagram illustrating various RGFP966 dose durations tested on activated T cells. Details are discussed in Example 7.

OT-I$^+$ CD8$^+$ T cells were activated with antigen-pulsed BMDCs as described above, and dosed with RGFP966 for different durations of time as depicted in the schematic diagram of FIG. 7A: dose duration A of RGFP966 exposure was from day 0 to day 7 of co-culture: dose duration B of RGFP966 exposure was from day 3 to day 7 of co-culture: dose duration C of RGFP966 exposure was from day 5 to day 7 of co-culture: dose duration D of RGFP966 exposure was from day 0 to day 3 of co-culture: dose duration E of RGFP966 exposure was from day 0 to day 5 of co-culture. These time windows (dose durations A-E) correspond roughly to the early (day 0 to 3), mid-(day 3 to 5), and late (day 5 to 7) phases of T cell activation described in the literature.

T cells were thoroughly washed with culture media during media changes at a transition point (i.e. drug to no drug or vice versa). T cells in samples D and E (light gray arrows) were re-suspended in conditioned media from parallel cultures of DMSO vehicle-treated T cells in order to maintain similar levels of T cell activating cytokines in the media.

HDAC3 Inhibition During Early T Cell Activation is Sufficient to Augment CD8$^+$ T Cell Effector Phenotype OT-I$^+$ CD8$^+$ T cells were activated on irradiated SIINFEKL-pulsed BMDCs and treated with 10 µM RGFP966 as described above. After 7 days, cells were collected and analyzed by flow cytometry for expression of markers correlated with the activated T cell phenotype previously observed.

Figure 7B:
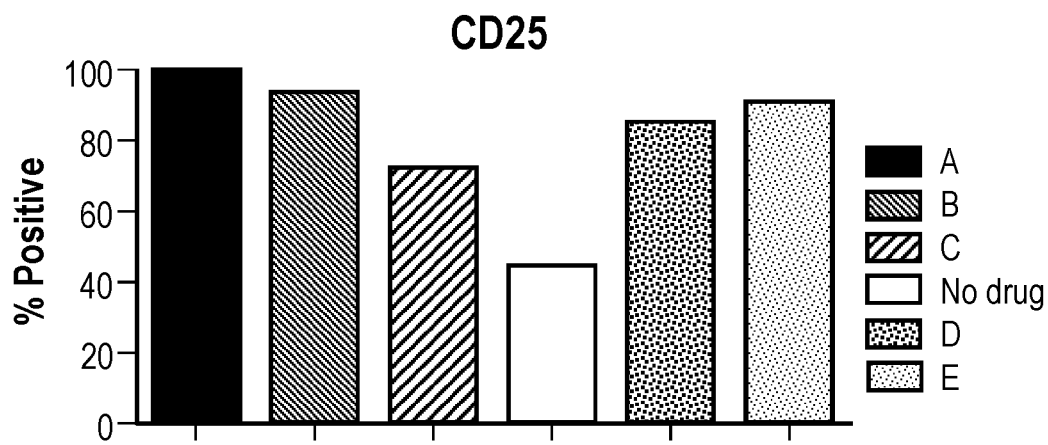
FIG. 7B is a bar chart for the percentage of CD25-positive T cells following exposure to RGFP966 using the dose durations of FIG. 7A.
Figure 7C:
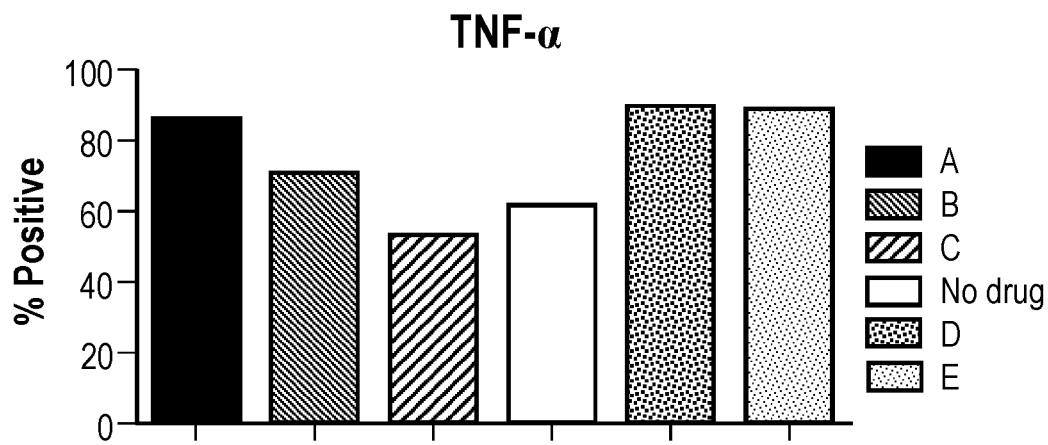
FIG. 7C is a bar chart for the percentage of TNF-α-positive T cells following exposure to RGFP966 using the dose durations of FIG. 7A.

FIGS. 7B-7C depict bar charts for the percentage positive cells for T cell effector markers at each of the time windows shown in FIG. 7A and described above. FIG. 7A shows the percentage of cells expression CD25, and FIG. 7B shows the percentage of cells expressing TNF-α. Reducing the duration of RGFP966 exposure by starting drug dosing at later time points within the 7-day activation time course was found to reduce the expression of markers of T cell activation (black bars). However, reducing the duration of RGFP966 treatment by washing out the drug midway through the activation time course did not reduce the expression of CD25 and TNF-α relative to cells treated with RGFP966 through all 7 days (gray bars).

This indicated that inhibiting HDAC3 during the first 3 days of CD8$^+$ T cell activation (early activation) was sufficient to augment their effector phenotype. The results of the study also demonstrate that inhibition of HDAC3 during the late stage of T cell activation (day 5 onwards) has minimal effect on augmenting T cell effector function. Thus HDAC3 acts early during T cell activation to negatively regulate the T cell activation phenotype.

Example 8: Dose Titration of RGFP966 Using In Vitro T Cell Activation Assay

A dose titration study of RGFP966 was undertaken to determine the minimum dose required for augmentation of $CD8^+$ T cell effector phenotype post-activation. Although previous experiments were well within the reported concentration range at which RGFP966 does not inhibit other HDACs (<15 μM), it was desirable to further minimize any potential side effects of the drug.

For the dose titration study, OT-I$^+$ $CD8^+$ T cells were activated with irradiated SIINFEKL-pulsed BMDCs as described above in the presence of 0, 1, 3, and 5 μM RGFP966. T cells were activated for 7 days, with media changes on days 3 and 5, and collected for flow cytometry analysis for markers of T cell activation.

Figure 8A:
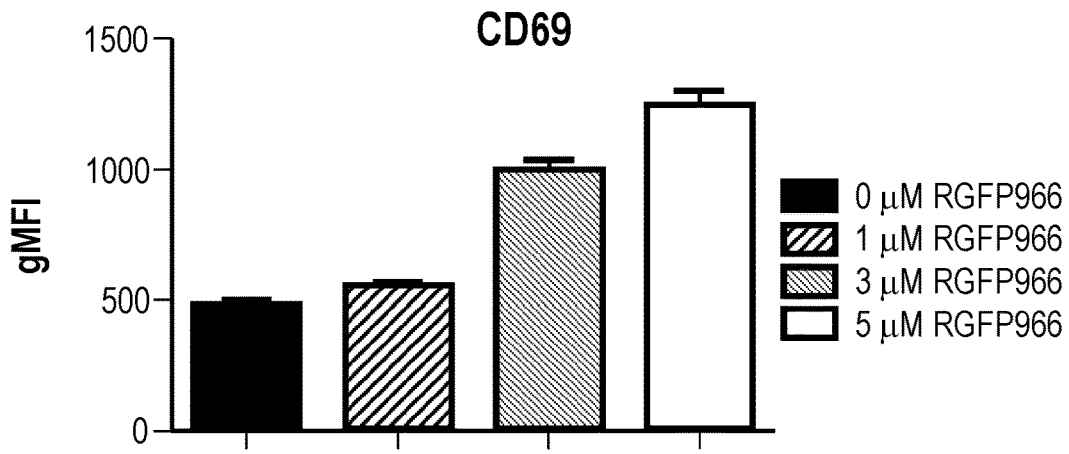
FIG. 8A shows a bar chart of the percentage of CD69-positive T cells following exposure to various doses of RGFP966. Details are discussed in Example 8.
Figure 8B:
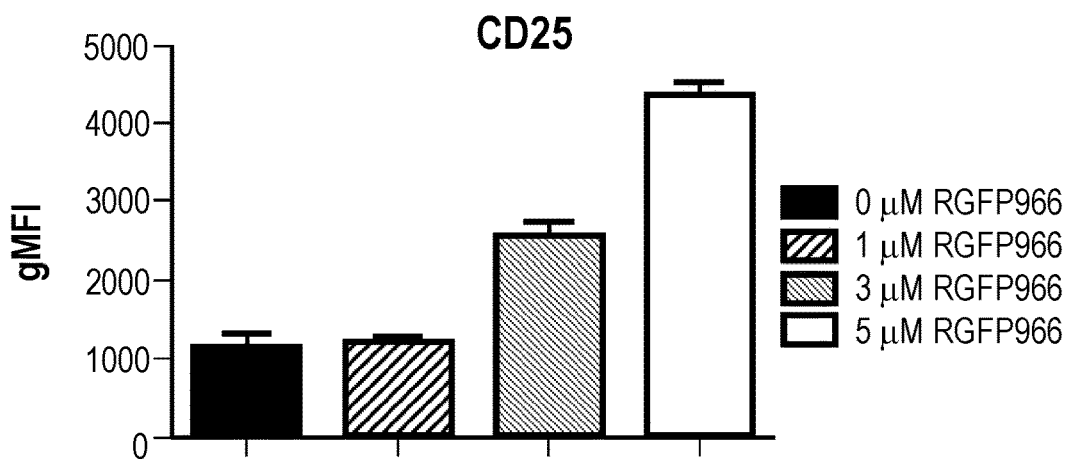
FIG. 8B shows a bar chart of the percentage of CD25-positive T cells following exposure to various doses of RGFP966.
Figure 8C:
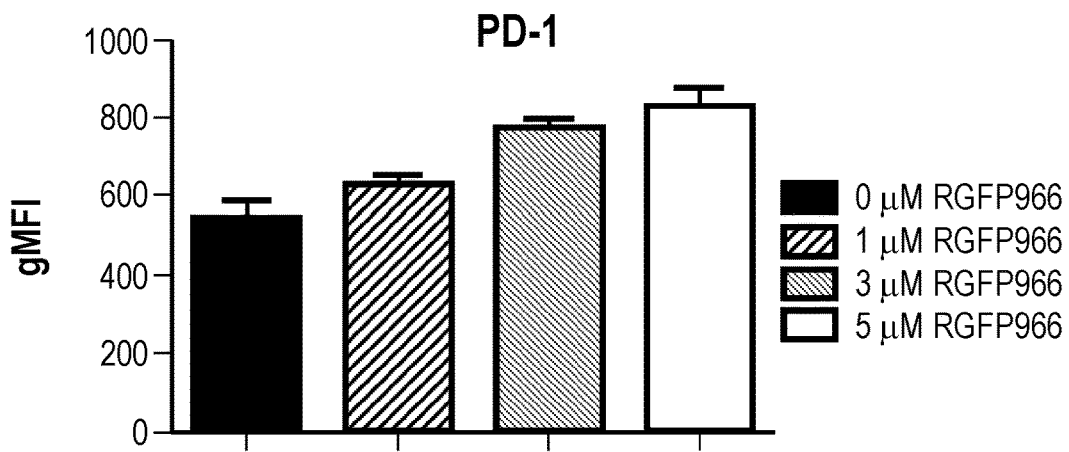
FIG. 8C shows a bar chart of the percentage of PD-1-positive T cells following exposure to various doses of RGFP966.
Figure 8D:
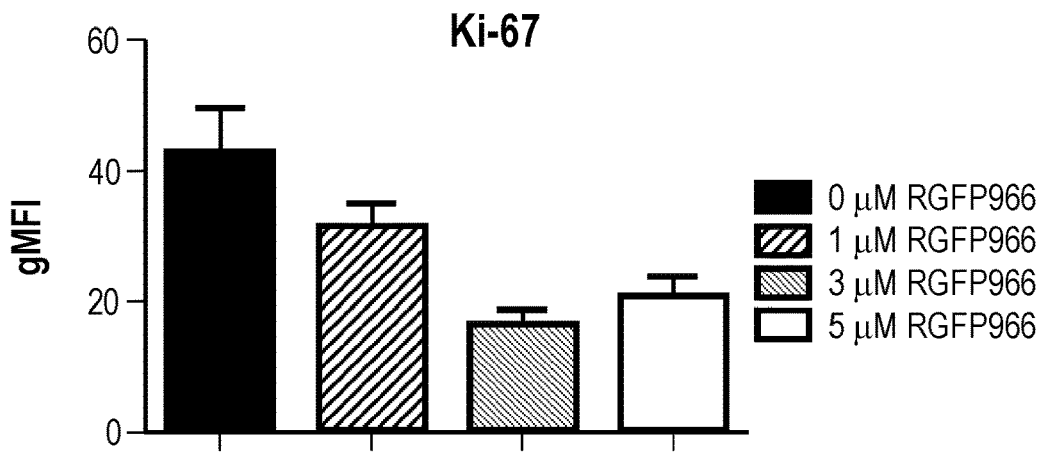
FIG. 8D shows a bar chart of the percentage of Ki-67-positive T cells following exposure to various doses of RGFP966.
Figure 8E:
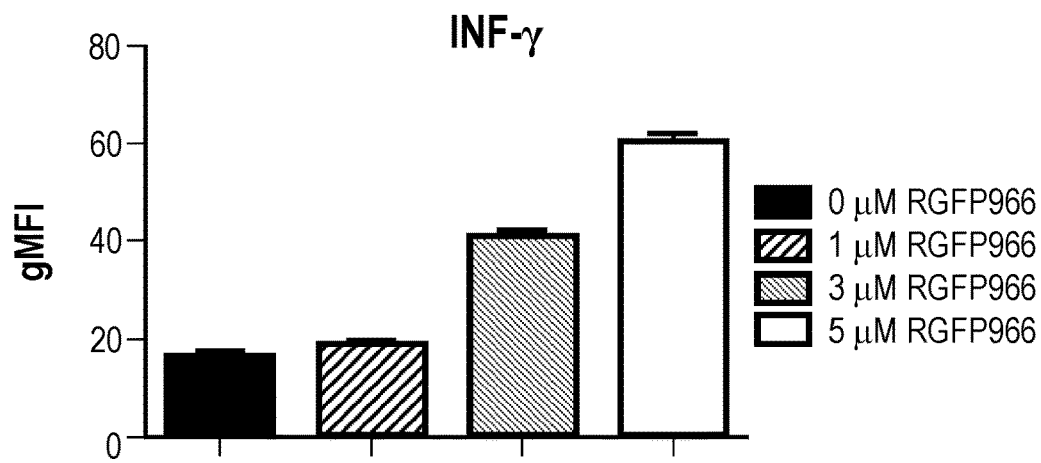
FIG. 8E shows a bar chart of the percentage of IFN-γ-positive T cells following exposure to various doses of RGFP966.
Figure 8F:
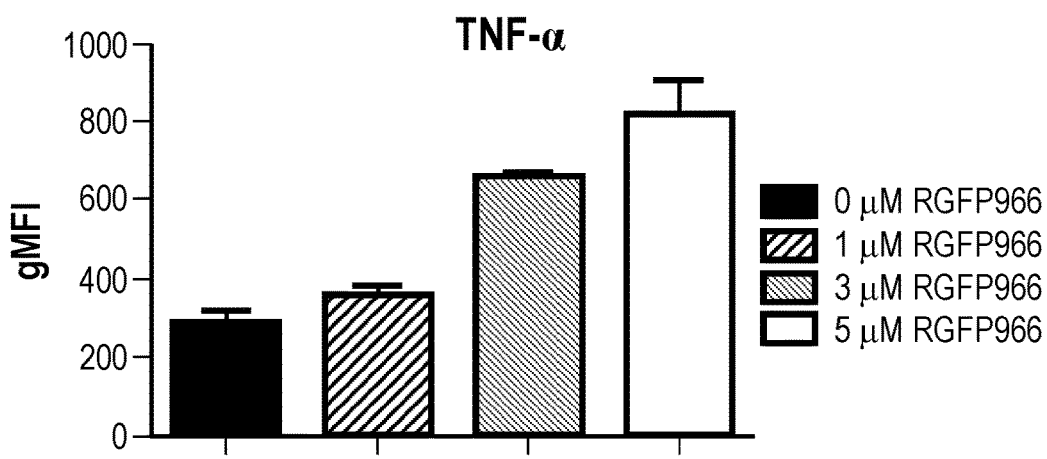
FIG. 8F shows a bar chart of the percentage of TNF-α-positive T cells following exposure to various doses of RGFP966.
Figure 8G:
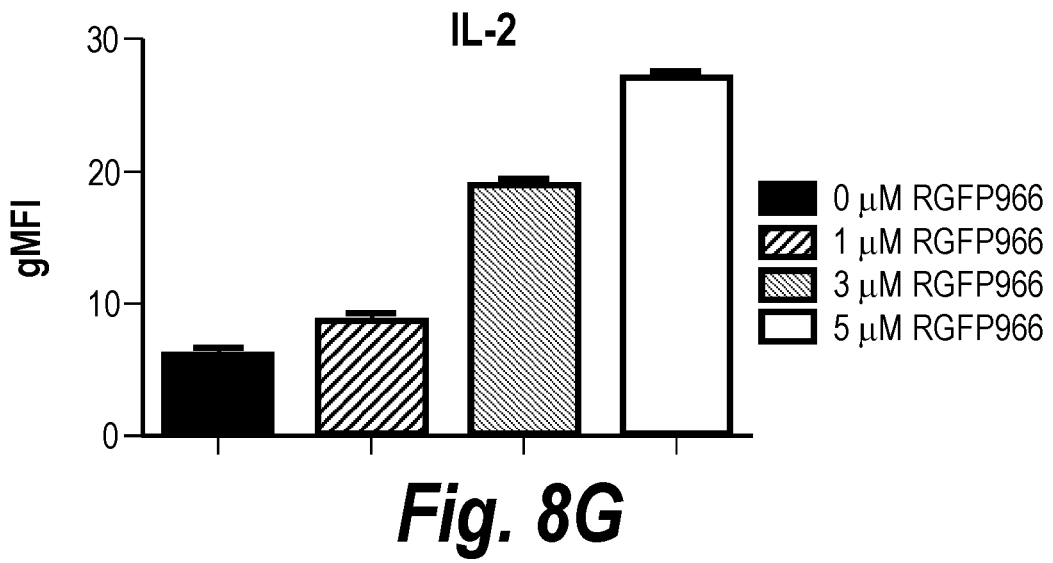
FIG. 8G shows a bar chart of the percentage of IL-2-positive T cells following exposure to various doses of RGFP966.
Figure 8H:
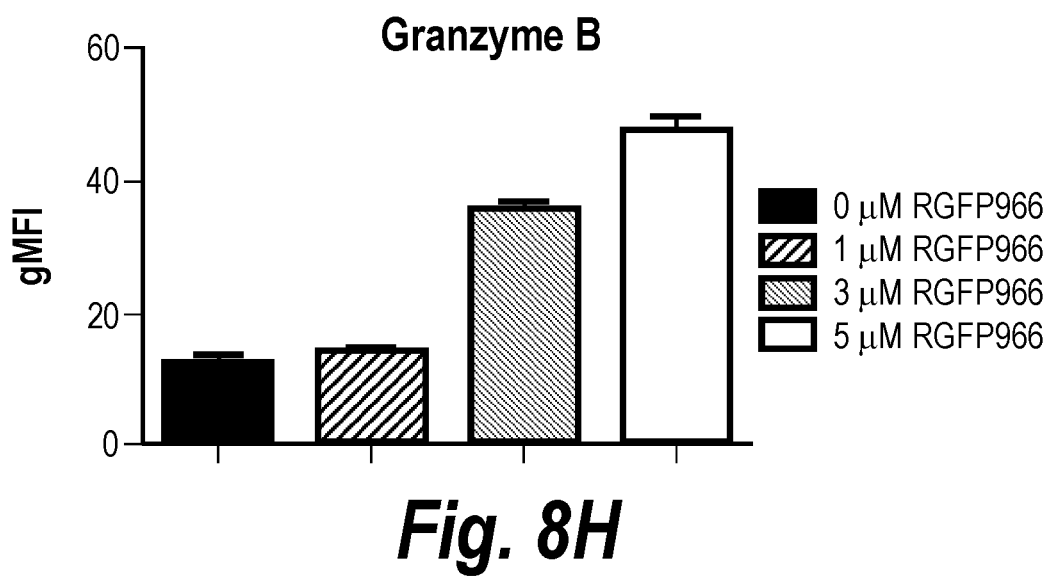
FIG. 8H shows a bar chart of the percentage of granzyme B-positive T cells following exposure to various doses of RGFP966.

FIGS. 8A-8H are bar charts showing the percentage of cells detected for various effector T cell markers in response to various doses of RGFP966 (mean fluorescence intensity on y-axis). FIG. 8A shows cell percentages for CD69; FIG. 8B shows cell percentages for CD25: FIG. 8C shows cell percentages for PD-1: FIG. 8D shows cell percentages for Ki-67: FIG. 8E shows cell percentages for IFN-γ: FIG. 8F shows cell percentages for TNF-α: FIG. 8G shows cell percentages for IL-2: FIG. 8H shows cell percentages for granzyme B. The data shows a dose-dependent effect of RGFP966 beginning at doses greater than 1 μM in augmenting the T cell effector phenotype across all parameters analyzed. Analysis included markers of activation (CD69, CD25, PD-1), effector cytokines (IFN-γ, TNF-α, IL-2), and cytotoxicity (granzyme B). A reduction in the percentage of actively proliferating cells was also observed, as measured by Ki-67 expression with increasing drug dose.

The data demonstrate that a dose of 3 μM RGFP966 is sufficient to augment the effector phenotype of $CD8^+$ T cells during in vitro activation.

Example 9: HDAC3 Downregulates Activating Histone Acetylation at $CD8^+$ T Cell Cytotoxic Effector Gene Loci Possible mechanisms of how HDAC3 negatively regulates $CD8^+$ T cell effector function were investigated. In general, acetylation of histone lysine residues are epigenetic markers broadly associated with increased gene expression, particularly at the lysine residues 9 and 27 of histone 3 (H3K9-ac and H3K27-ac, respectively). Therefore, it is possible that HDAC3 might negatively regulate $CD8^+$ T cell effector function post-activation by removing acetylation marks from key T cell effector gene loci, thereby epigenetically downmodulating their expression.
HDAC3 Inhibition Increases H3K9-Acetylation and Expression of the Key $CD8^+$ Transcription Factor T-BET Analysis was first made on expression of HDAC3 and its known binding partners, global histone acetylation levels, and known regulatory transcription factors of $CD8^+$ T cell effector function across a time course of T cell activation in the absence or presence of the HDAC3 inhibitor RGFP966. To do so, OT-I$^+$ $CD8^+$ T cells were activated in vitro for 7 days, as described in FIG. 1 and Example 1 above.

Activated cells received either 0 μM or 3 μM of HDAC3 inhibitor RGF966. Sorted $CD8^+$ T cells from the in vitro co-cultures were then assessed for HDAC3 and various markers by immunoblot at 2, 22, 72, 120, and 168 hours after activation (see immunoblot of FIG. 9A). The markers assessed included: NCOR1 and NCOR2 (part of the HDAC3/NCOR complex): BCL-6, T-BET, and BLIMP-1 (markers of the BCL-6-5-bet pathway): GAPDH and LAMIN BI (protein loading controls): acetylated residues H3K9 and H3K27, and histone H3 (markers of histone H3 acetylation).

Figure 9A:
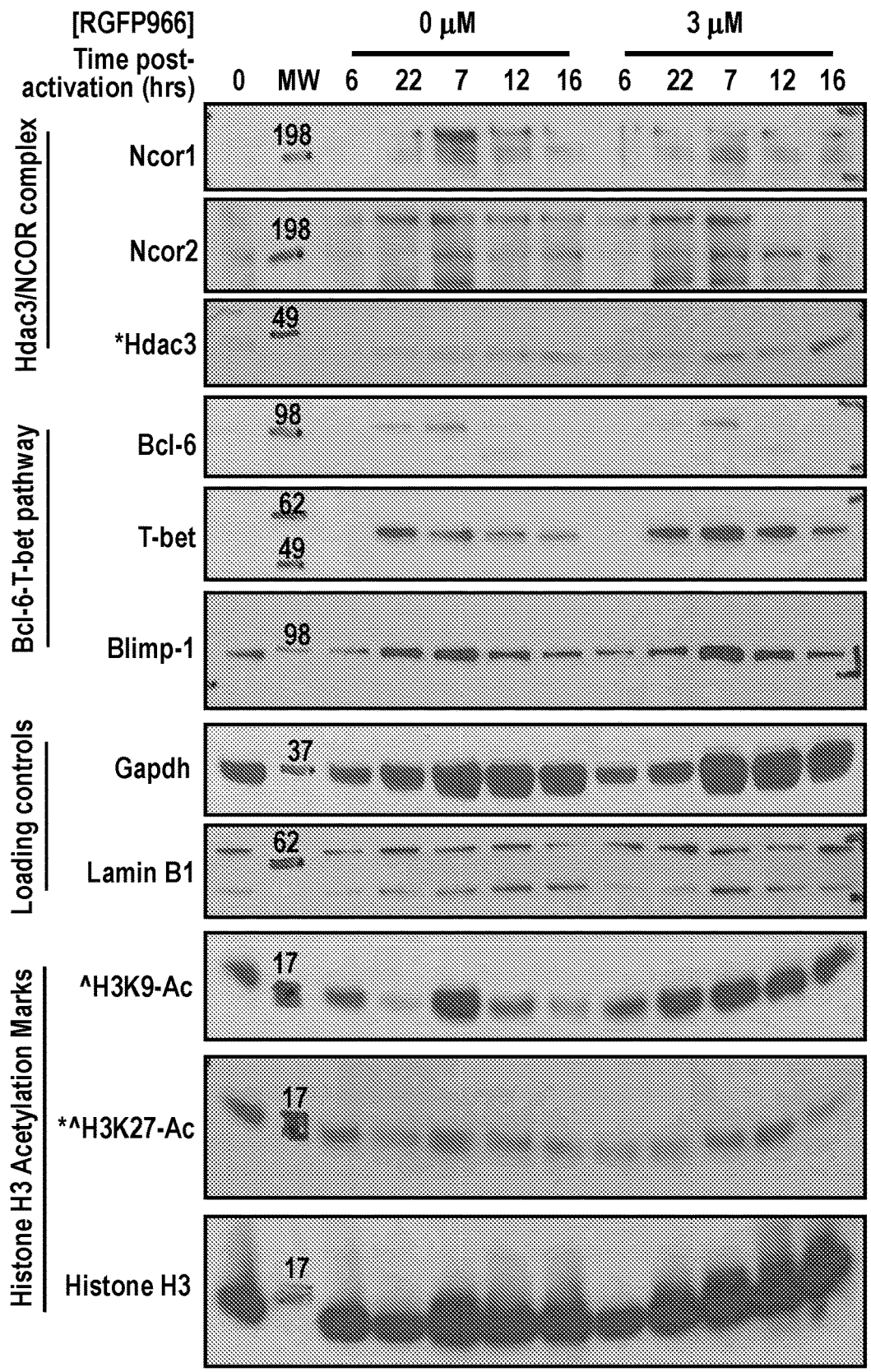
FIG. 9A shows immunoblots of sorted CD8$^+$ T cells exposed to either 0 μM (control) or 3 μM RGF966, and stained with antibodies against NCOR1, NCOR2, HDAC3, BCL-6, T-BET, BLIMP-1, GAPDH, LAMIN B1, H3K9-Ac, H3K27-Ac, and histone H3.

The immunoblots showed that expression of HDAC3 increases with time across both treatment conditions, indicating that RGFP966 does not result in loss of HDAC3 protein (see FIG. 9A). This is consistent with the hypothesis that HDAC3 regulates $CD8^+$ T cell function after initial activation. Additionally, levels of the HDAC3-associated co-repressors NCOR1 and NCOR2, required for HDAC3 deacetylation function, first increase with time and then decrease after 72 hours post-activation in the control treatment condition. Interestingly, NCOR2 was also almost completely absent in the drug-treated cells starting at 120 hours post-activation.

The global levels of histone acetylation at the key residues H3K9 and H3K27 first increased with time and then decreased after a peak at 72 hours post-activation in the control condition. In contrast, histone acetylation at H3K9, and to a lesser extent at H3K27, were persistently high after 72 hours, the time of peak acetylation in the control-treated cells. This was consistent with the hypothesis that HDAC3 histone deacetylase activity negatively regulates $CD8^+$ T cell function post-activation, and that $CD8^+$ T cells reach the height of their activated state at around day 3 post-activation in this in vitro co-culture system.

Furthermore, expression of T-BET (TBX21), a key "master" transcription factor regulating $CD8^+$ T cell effector function, was also increased in the drug-treated cells relative to control-treated cells. At the same time, no significant changes were observed in the levels of BLIMP-1 (PRDM1), another transcription factor known to regulate $CD8^+$ T cell terminal effector differentiation, or in the levels of BCL-6, a transcription factor known to antagonize T-BET activity.
HDAC3 Deacetylates H3 Residues at Genes Regulating $CD8^+$ T Cell Cytotoxic Effector Function Next, it was determined whether HDAC3 regulated histone 3 acetylation globally, or at a specific set of genes relevant to $CD8^+$ T cell effector function—an important question to address in elucidating the mechanism of action of HDAC3 regulatory action in $CD8^+$ T cells.

Chromatin was extracted from sorted $CD8^+$ T cells activated with or without RGFP966 for 5 days as described in FIG. 1 and Example 1 above, and chromatin immunoprecipitation (ChIP) was performed for H3K9ac and H3K27 markers.

Figure 9B:
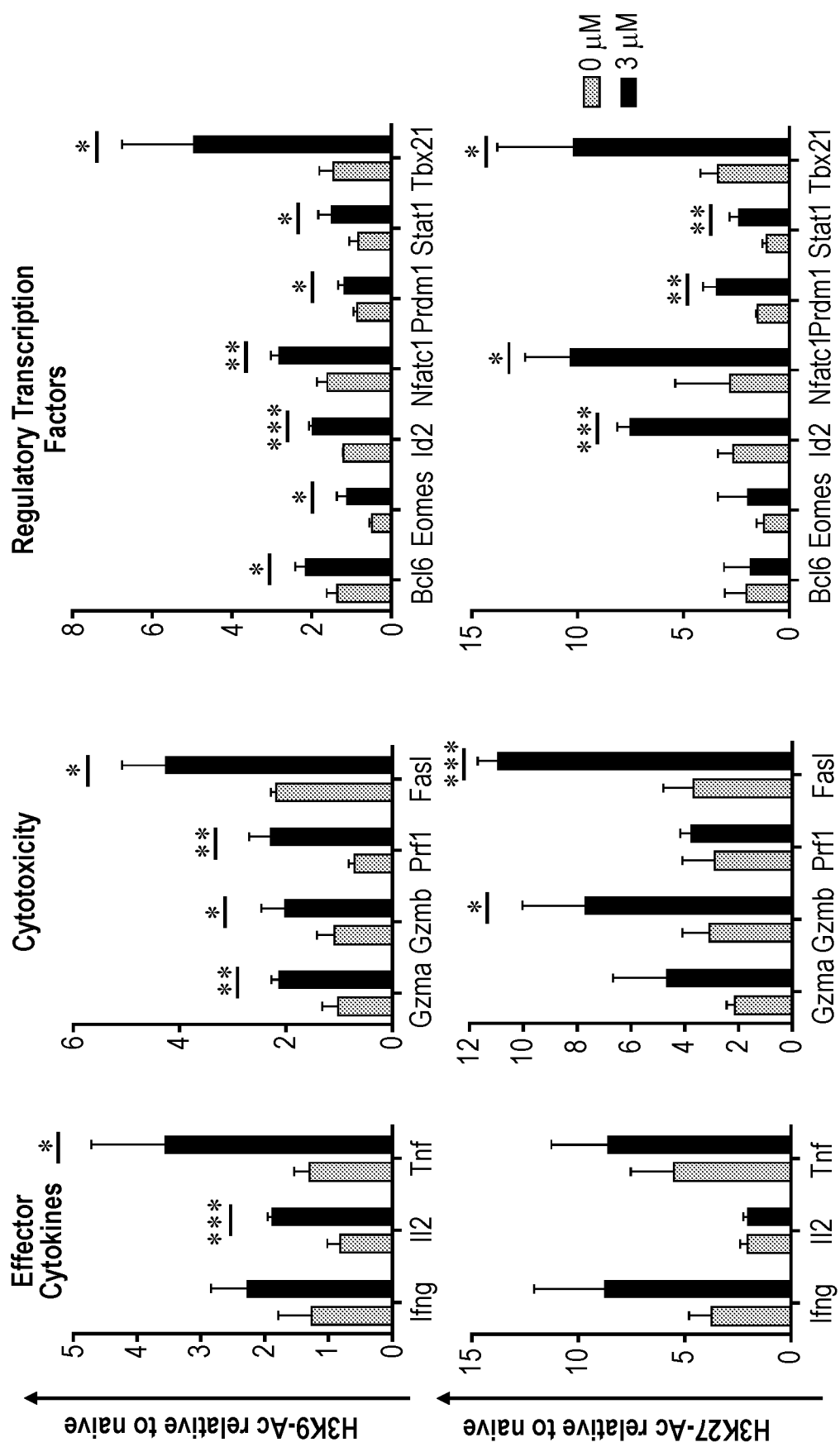
FIG. 9B shows histograms of H3K9-Ac residues relative to naïve H3K9 residues (top row) and H3K27-Ac residues relative to naïve H3K27 residues.
Figure 9C:
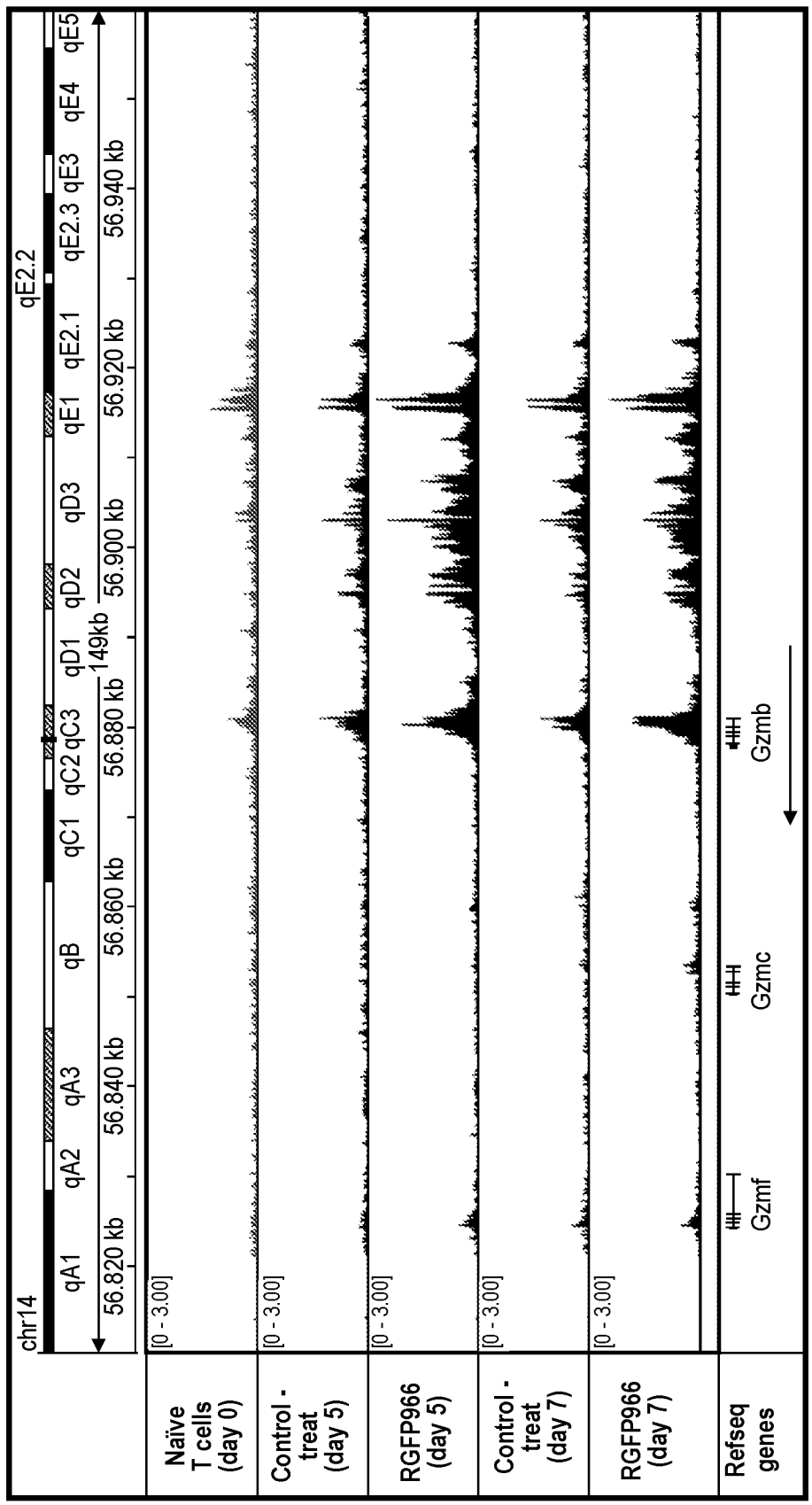
FIG. 9C shows H3K27-ac ChIP-sequence tracks for the gene GZMB, from top to bottom: naïve CD8$^+$ T cells (day 0); control-treated cells, day 5 post-activation; RGFP966-treated cells, day 5 post-activation: control-treated cells, day 7 post-activation; and RGFP966-treated cells, day 7 post-activation.
Figure 9D:
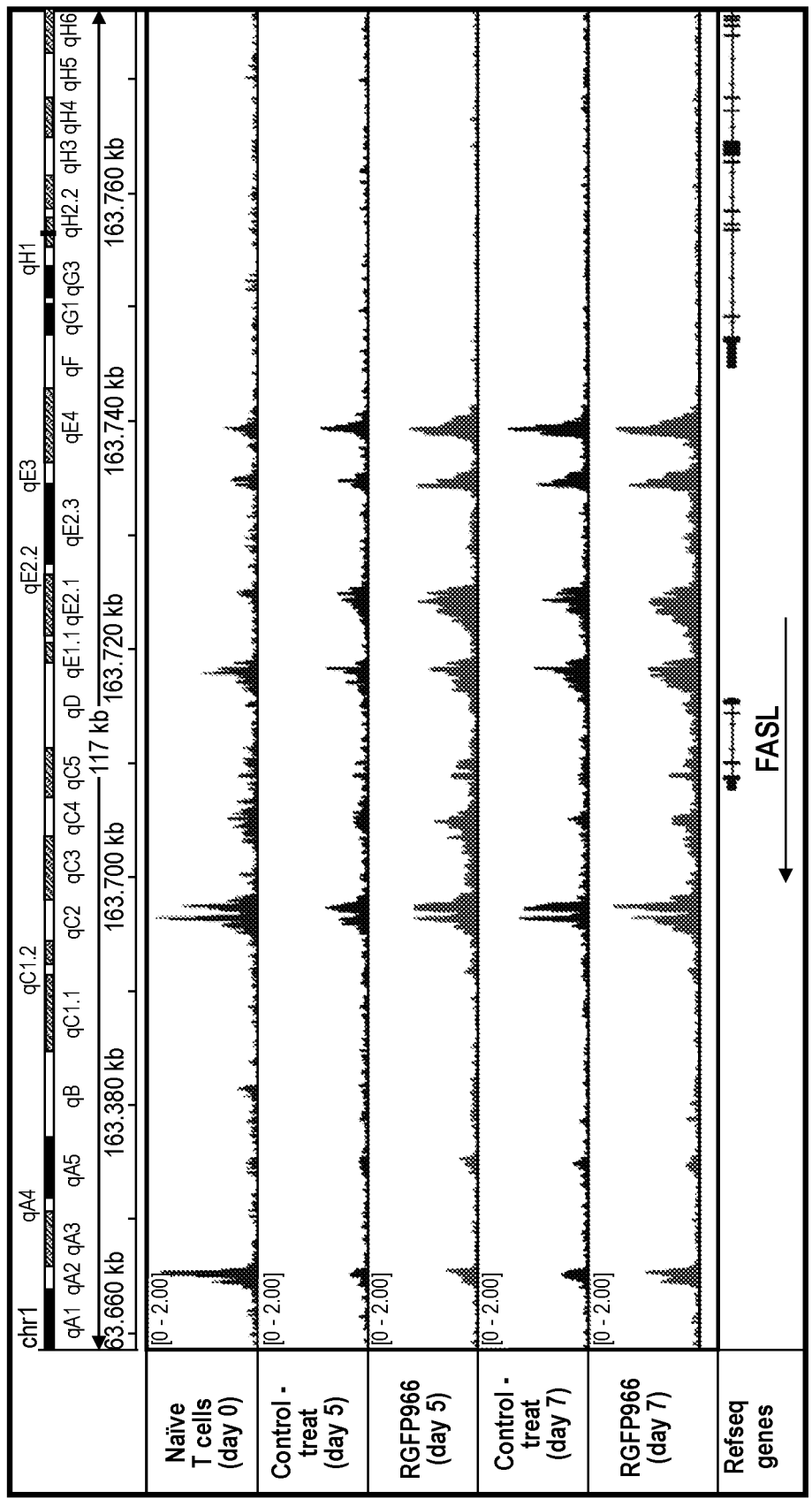
FIG. 9D shows H3K27-ac ChIP-sequence tracks for the gene FASL, from top to bottom: naïve CD8$^+$ T cells (day 0); control-treated cells, day 5 post-activation; RGFP966-treated cells, day 5 post-activation: control-treated cells, day 7 post-activation; and RGFP966-treated cells, day 7 post-activation.
Figure 9E:
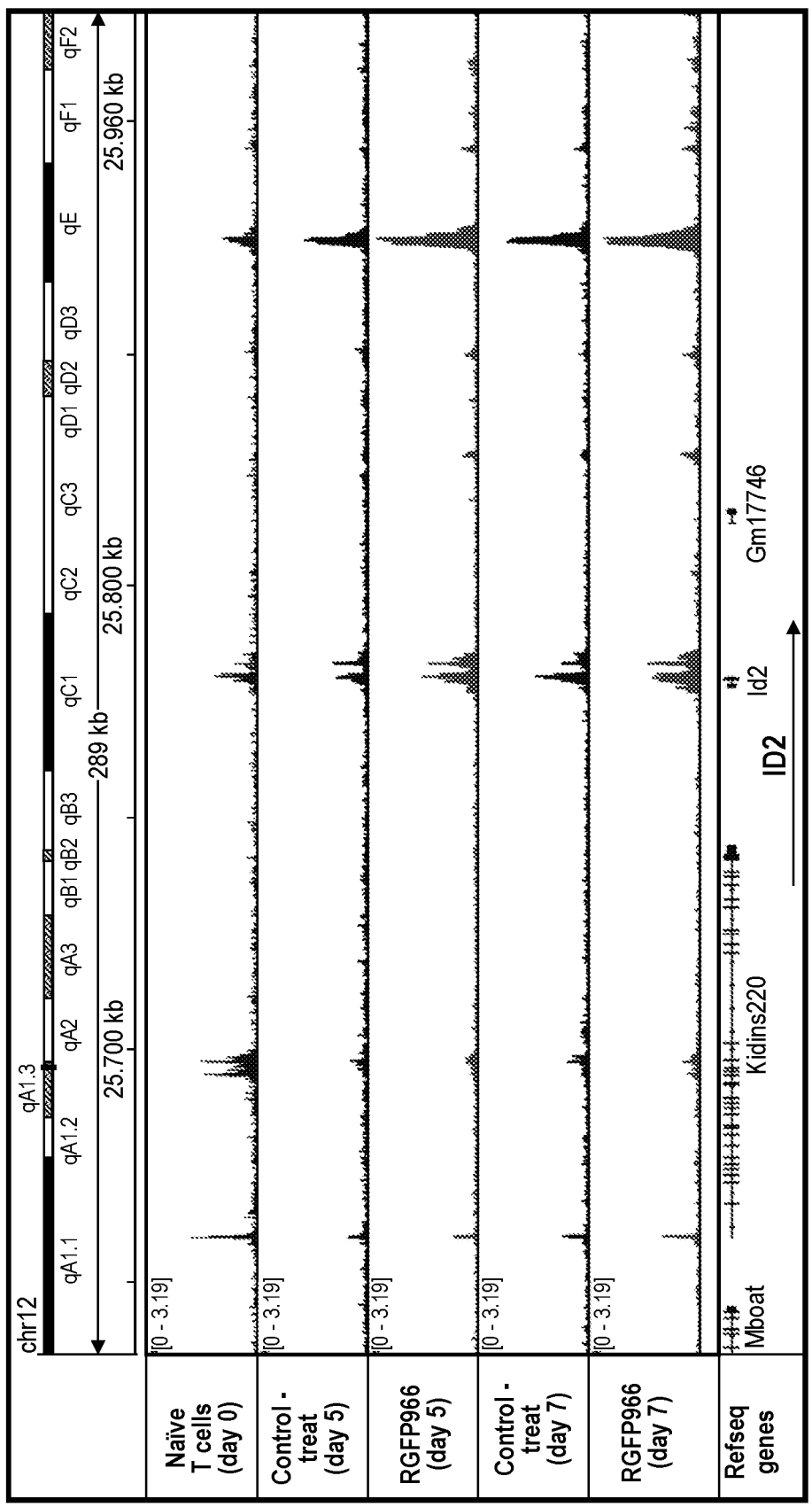
FIG. 9E shows H3K27-ac ChIP-sequence tracks for the gene ID2, from top to bottom: Naïve CD8$^+$ T cells (day 0): control-treated cells, day 5 post-activation: RGFP966-treated cells, day 5 post-activation: control-treated cells, day 7 post-activation; and RGFP966-treated cells, day 7 post-activation.
Figure 9F:
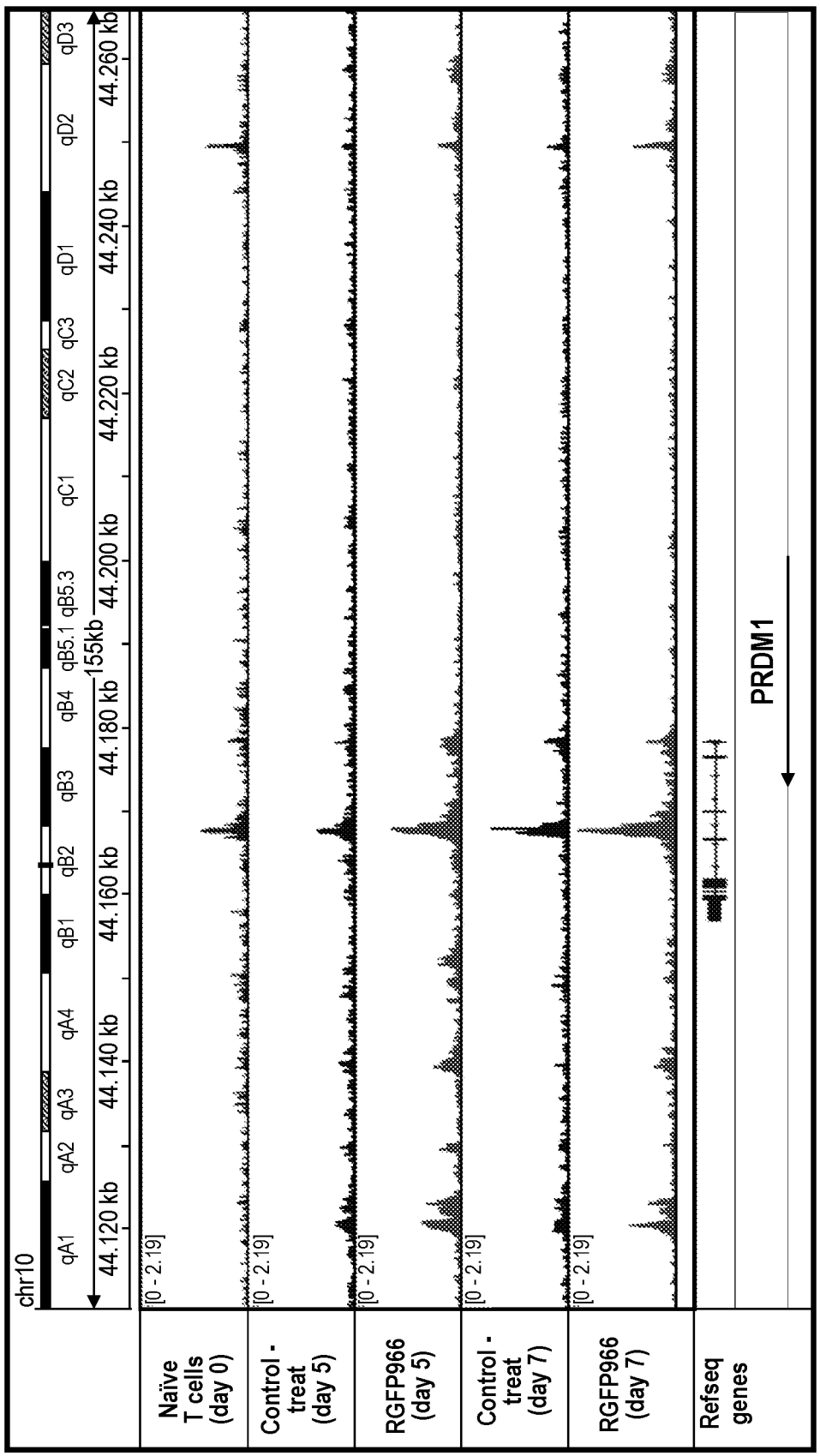
FIG. 9F shows H3K27-ac ChIP-sequence tracks for the gene PRDM1, from top to bottom: Naïve CD8$^+$ T cells (day 0): control-treated cells, day 5 post-activation: RGFP966-treated cells, day 5 post-activation: control-treated cells, day 7 post-activation; and RGFP966-treated cells, day 7 post-activation.
Figure 9G:
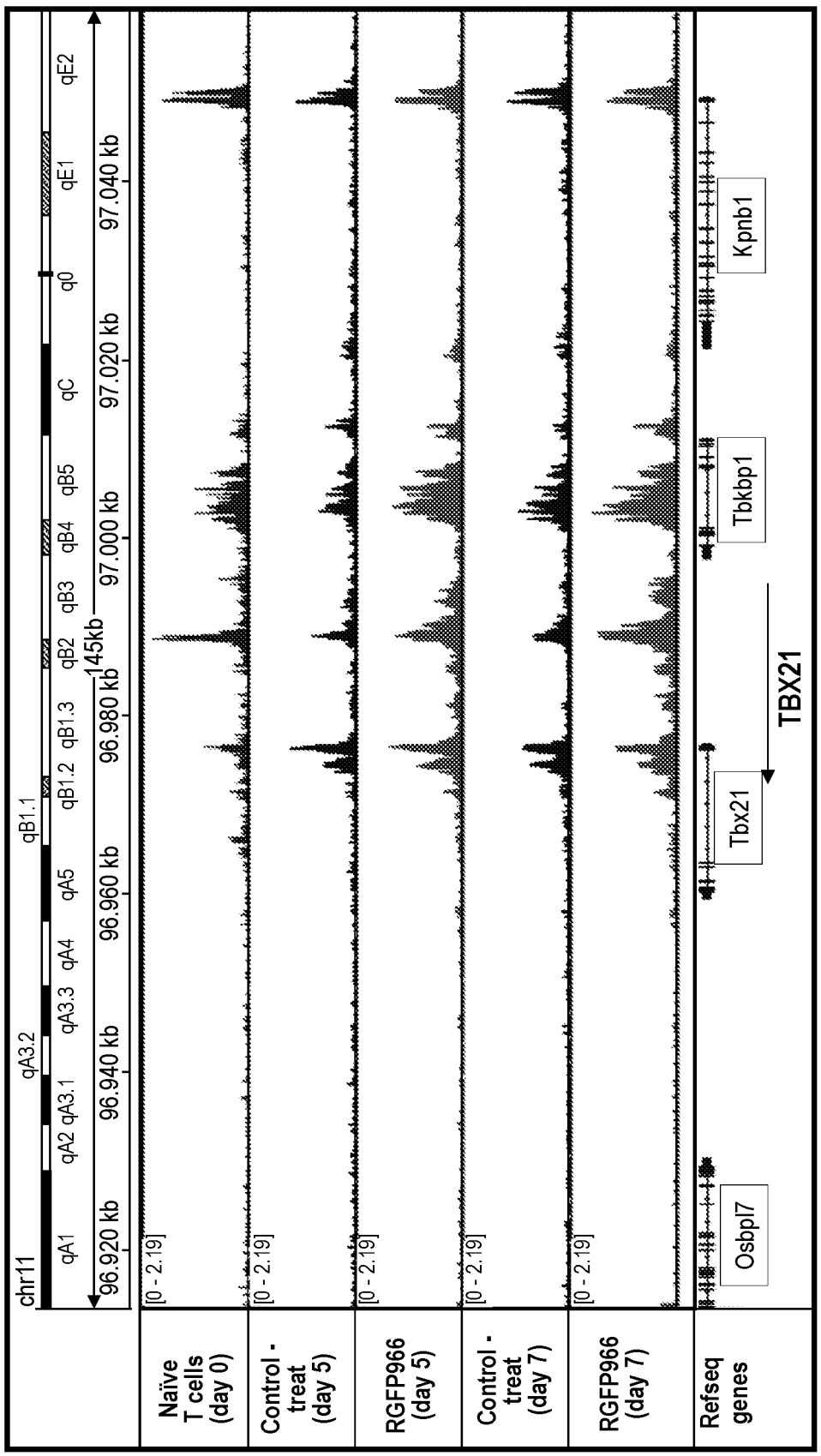
FIG. 9G shows H3K27-ac ChIP-sequence tracks for the gene TBX21, from top to bottom: naïve CD8$^+$ T cells (day 0): control-treated cells, day 5 post-activation: RGFP966-treated cells, day 5 post-activation: control-treated cells, day 7 post-activation; and RGFP966-treated cells, day 7 post-activation.

Immunoprecipitated chromatin was analyzed using quantitative real-time PCR (qPCR) with primer probes for the promoter regions of a custom set of 32 genes known to be associated with various aspects of $CD8^+$ T cell effector function (effector cytokines, cytotoxicity, regulatory transcription factors, as well as positive and negative controls for data quality control). Results are shown in FIG. 9B, which shows histograms of H3K9-Ac residues relative to naïve H3K9 residues (top row) and H3K27-Ac residues relative to naïve H3K27 residues. Histogram bars are presented in pairs for each marker, with the left hand bar of each pair (gray) representing data from untreated $CD8^+$ T cells and the right hand bar of each pair (black) representing data from CD8+ T cells treated with 3 μM RGF966.

It was found that the promoters of the effector cytokines IFN-γ (labeled Ifng in FIG. 9B), Tnf TNF-α (labeled Tnf), and IL-2 (labeled Il2) generally had increased H3K9 and H3K27 acetylation when HDAC3 was inhibited, but this was not always significant. The most significant changes in histone acetylation were observed (1) in the set of genes required for CD8+ T cell cytotoxicity, such as GZMB (granzyme B) and FASL (Fas ligand), which mediate two different mechanisms of cell-contact dependent CD8+ T cell killing; and (2) in a subset of the regulatory transcription factors required for effector function, in particular TBX21 (T-BET), PRDM1 (BLIMP-1), and ID2 (ID2), but not in the subset of transcription factors associated with memory function, such as BCL6 (BCL-6) and EOMES.

ChIP-sequencing was then performed to survey the genomic landscape of H3K27 acetylation in the absence or the presence of HDAC3 activity on days 5 and 7 post-activation using the same in vitro activation co-culture system as in as described in FIG. 1 and Example 1 above.

FIGS. 9C-9H show H3K27-ac ChIP-sequence tracks, from top to bottom: naïve CD8+ T cells (day 0): control-treated cells, day 5 post-activation: RGFP966-treated cells, day 5 post-activation: control-treated cells, day 7 post-activation: RGFP966-treated cells, day 7 post-activation. Arrows under gene names indicate direction of transcription. Tracks were visualized with the IGV genome browser (Broad Institute, MA).

This experiment confirmed the previous observations of increased H3K27-ac at cytotoxicity-associated genes such as GzmB and Fasl (FIGS. 9C and 9D) and at the effector function-associated transcription factors ID2, PRDM1, and TBX21 (FIGS. 9E-9G) in the presence of HDAC3 inhibition.

Figure 9H:
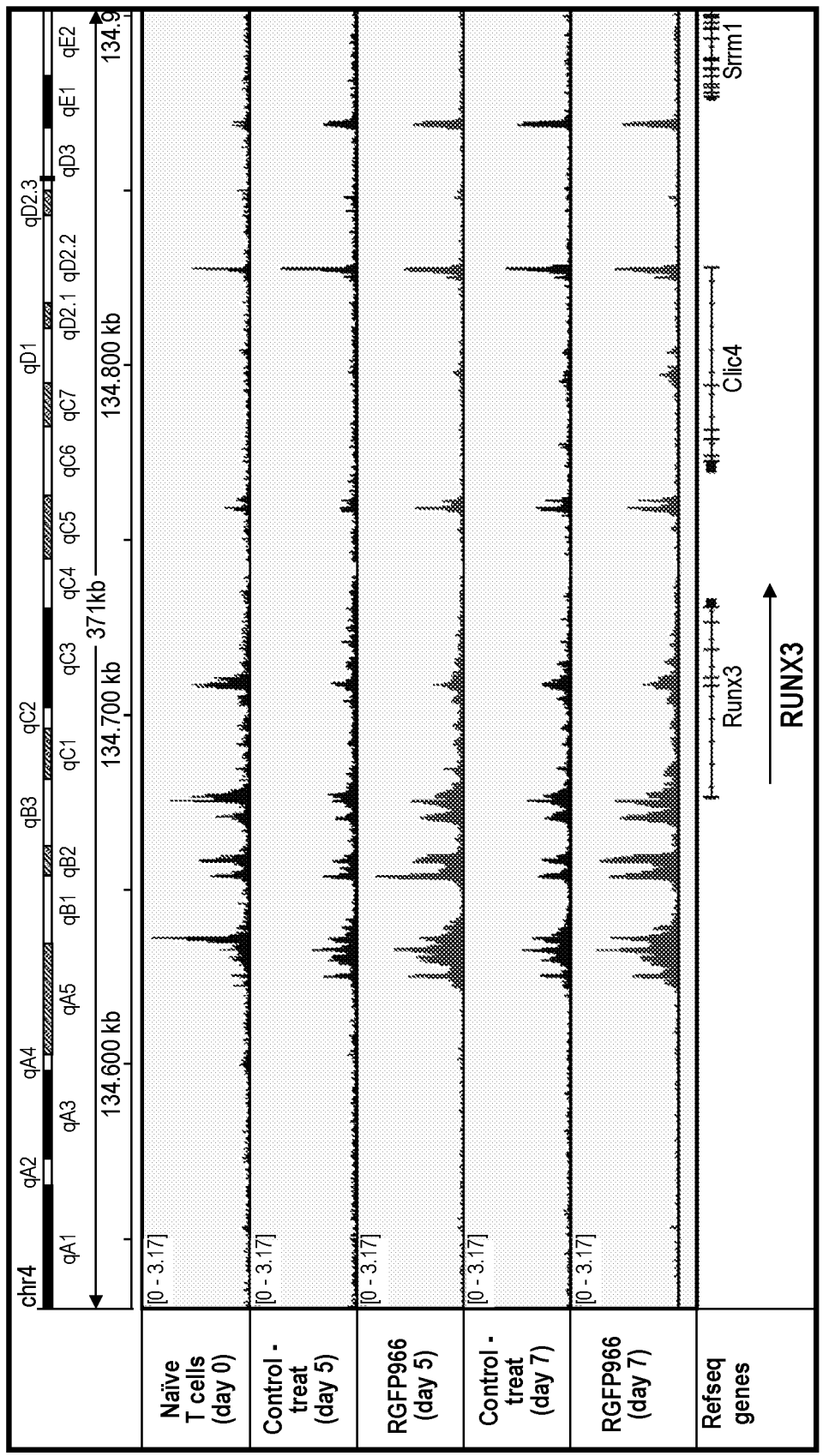
FIG. 9H shows H3K27-ac ChIP-sequence tracks for the gene RUNX3, from top to bottom: naïve CD8$^+$ T cells (day 0): control-treated cells, day 5 post-activation: RGFP966-treated cells, day 5 post-activation: control-treated cells, day 7 post-activation; and RGFP966-treated cells, day 7 post-activation.

Furthermore, it was also found that there was increased H3K27-ac at RUNX3 in the absence of HDAC3 activity (FIG. 9H). Consistent with this finding, a separate unbiased bioinformatic analysis of the sequences differentially-acetylated genomic loci revealed that RUNX3 binding motifs were the top most enriched transcription factor binding motifs (data not shown), demonstrating that HDAC3 regulates CD8+ T cell effector function, at least in part, by regulating RUNX3 binding to its downstream target genes. RUNX3 is a critical lineage-specifying transcription for CD8+ T cell development and is required for the development and maintenance of the cytotoxic gene program, making this potential connection between HDAC3 and RUNX3 especially attractive target for modulating CD8+ effector function.

Additionally, no significant changes in H3K27ac were observed by ChIP-sequencing at the loci of effector cytokines, or at the loci of transcription factors such as EOMES and BCL6, in agreement with our previous ChIP-qPCR experiment (data not shown).

Overall, the data demonstrate that HDAC3 is a bona fide histone deacetylase that deacetylates histones at gene loci required for CD8+ T cell cytotoxic effector function.

Example 10: Validation of HDAC3-CD8 Conditional Knockout Mice

In order to generate a critical tool to investigate the role of HDAC3 in CD8+ T cells within an intact immune system, and to evaluate the role of HDAC3 in CD8+ T cell-mediated anti-tumor immunity, HDAC3-conditional knockout mice (HDAC3-CD8 cKO mice) were generated with a CD8+ T cell-restricted deletion of HDAC3. This was done by crossing HDAC3fl/fl mice (Scott Hiebert, Vanderbilt University, TN) to E8I-Cre driver mice that express Cre recombinase in peripheral CD8+ T cells, but not during thymic selection (Ichiro Taniuchi, RIKEN, Japan). This latter point was an important consideration because work from Virginia Shapiro's group (Mayo Clinic, MN) has shown that the use of other common T cell-specific Cre drivers (e.g. CD4-Cre, Lck-Cre) to delete HDAC3 resulted in ablation of T cells in the periphery due to developmental blocks in the thymus: we wanted to generate a mouse with an intact peripheral T cell compartment without affecting thymic development of the T cell lineage.

HDAC3-CD8 cKO Mice have an Intact Peripheral T Cell Compartment

Figure 10A:
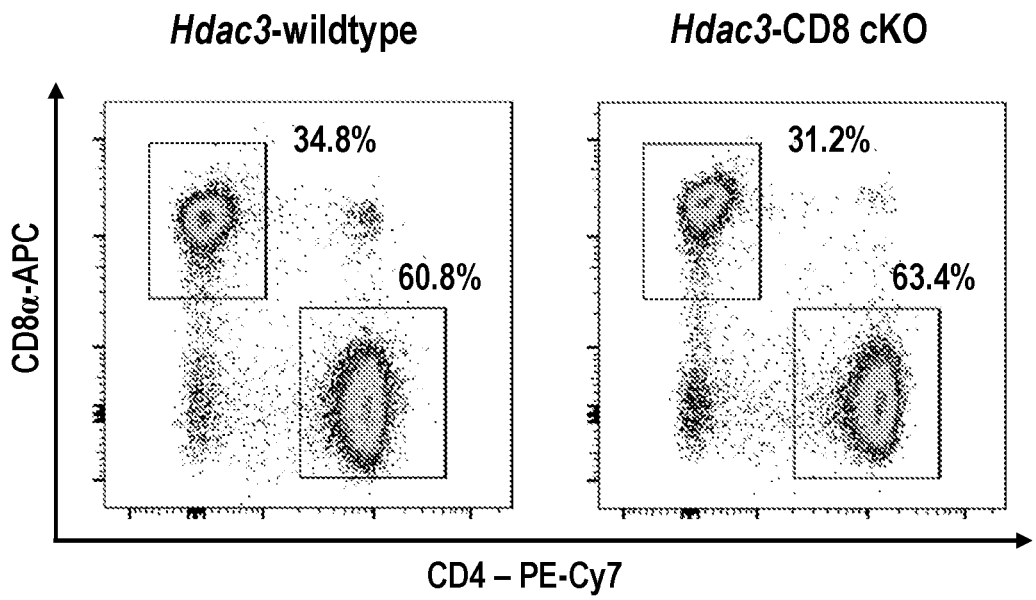
FIG. 10A shows scatterplots depicting flow cytometry analysis of CD8 and CD4 markers in wildtype and HDAC3-CD8 cKO mice.

To verify that the HDAC3-CD8 cKO mice did not have a defective peripheral T cell compartment in T cell development, we analyzed the spleen and peripheral lymph nodes of 6-week old HDAC3-CD8 cKO mice and HDAC3-wildtype littermates by flow cytometry. FIG. 10A shows scatterplots depicting flow cytometry analysis of CD8 and CD4 markers in wildtype and HDAC3-CD8 cKO mice. An intact peripheral T cell compartment was observed, with CD8+ and CD4+ T cells being present at essentially the same ratios in both HDAC3-CD8 cKO mice and their HDAC3-wildtype littermates.

Validation of CD8+ T Cell-Restricted Deletion of HDAC3 in HDAC3-CD8 cKO Mice

Figure 10B:
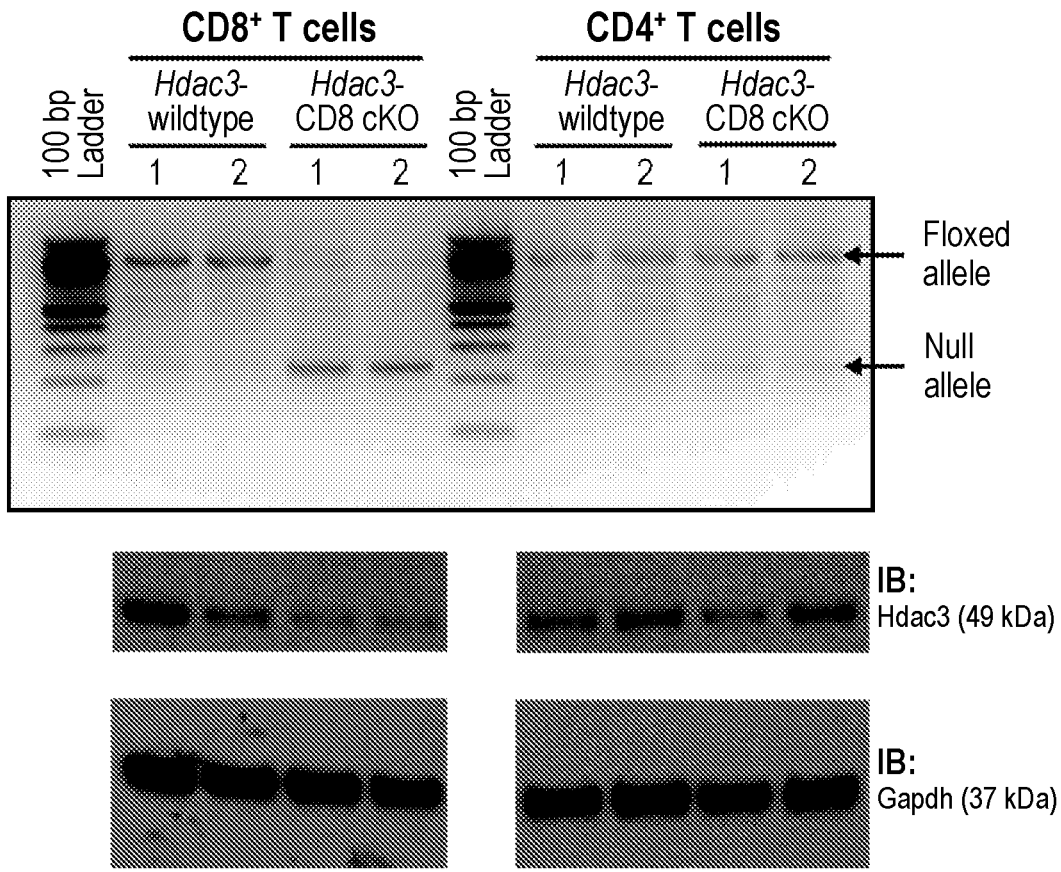
FIG. 10B, top panel, shows nucleic acid gels for the HDAC3 gene in CD8$^+$ and CD4$^+$ cells from HDAC3-wildtype and HDAC3-CD8 cKO mice.

To verify that the deletion of HDAC3 was restricted to the CD8+ T cell compartment alone, CD8+ and CD4+ T cells were isolated from 6-week old HDAC3-CD8 cKO and HDAC3-wildtype littermates, and probed for the deletion of HDAC3 by performing PCR for the null allele (see FIG. 10B, top panel) as well as by immunoblotting whole cell lysates for the presence of HDAC3 protein (see FIG. 10B, bottom panel). We verified that the HDAC3 null allele was verified as only present in the CD8+ and not the CD4+ T cell compartment of HDAC3-CD8 cKO mice. It was also verified that this deletion correlates with a visible decrease in HDAC3 protein levels in CD8+ but not CD4+ T cells in HDAC3-CD8 cKO mice.

Thymic Development in HDAC3-CD8 cKO Mice is Normal

Figure 10C:
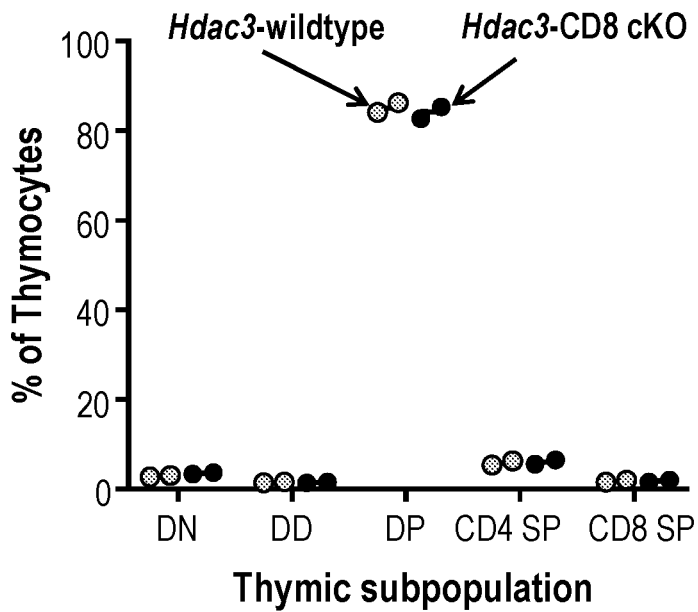
FIG. 10C shows a plot of the percentage of different types of thymocytes in wildtype (gray double-dots on left side of each thymic subpopulation on the x-axis) and Cdeac3-CD8 cKO (black double-dots on right side of each thymic subpopulation on the x-axis) "DN" represents CD4-CD8-thymocytes: "DD" represent CD4low CD8low thymocytes: "DP" represents CD4high CD8high thymocytes: "CD4 SP" represents CD4$^+$CD8-thymocytes; and "CD8 SP" represents CD4-CD8$^+$ thy mocytes.
Figure 10D:
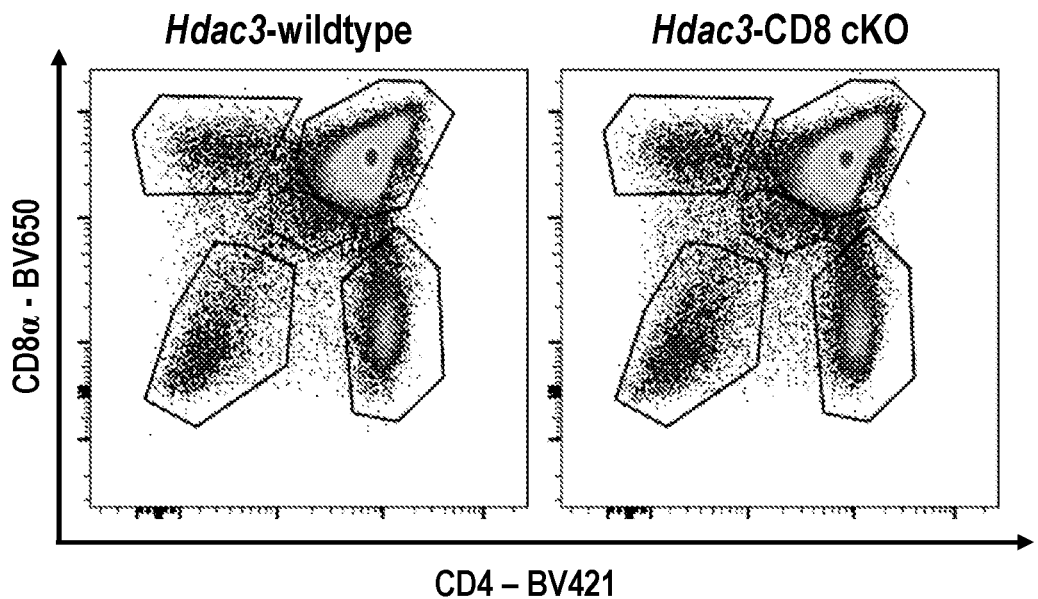
FIG. 10D is a scatterplot depicting results of flow cytometry analysis of CD8$^+$ and CD4$^+$ T cells from wildtype and HDAC3-CD8 cKO mice, shown in FIG. 10C.

Thymic development of T cells was essentially identical between 6-week old HDAC3-CD8 cKO and HDAC3-wildtype littermates. FIG. 10C shows a plot of the percentage of different types of thymocytes in wildtype (gray double-dots on left side of each thymic subpopulation on the x-axis) and Cdeac3-CD8 cKO (black double-dots on right side of each thymic subpopulation on the x-axis). "DN" represents CD4− CD8− thymocytes: "DD" represent CD4low CD8low thymocytes: "DP" represents CD4high CD8high thymocytes: "CD4 SP" represents CD4+CD8-thymocytes: and" CD8 SP" represents CD4− CD8+ thymocytes. FIG. 10D is a scatterplot depicting flow cytometry analysis of CD8+ and CD4+ T cells from wildtype and HDAC3-CD8 cKO mice. The data confirmed that the HDAC3-CD8 cKO mice did indeed have an otherwise normal T cell compartment, and that thymic development was not compromised.

Example 11: CD8+ T Cells from HDAC3-CD8 cKO Mice have an Augmented Effector Phenotype Post-Activation To investigate whether CD8+ T cells from HDAC3-CD8 cKO mice had an augmented effector phenotype post-activation (as previously shown with drug- and Cas9)-mediated ablation of HDAC3 activity), OT-I+ transgenic HDAC3-CD8 cKO mice were generated to serve as a source of large numbers of antigen-specific HDAC3-deficient CD8+ T cells. OT-I+ CD8+ T cells were then activated from HDAC3-deficient and -wildtype littermates with irradiated SIINFEKL-pulsed BMDCs as described in FIG. 1 and Example I above.

Figure 11A:
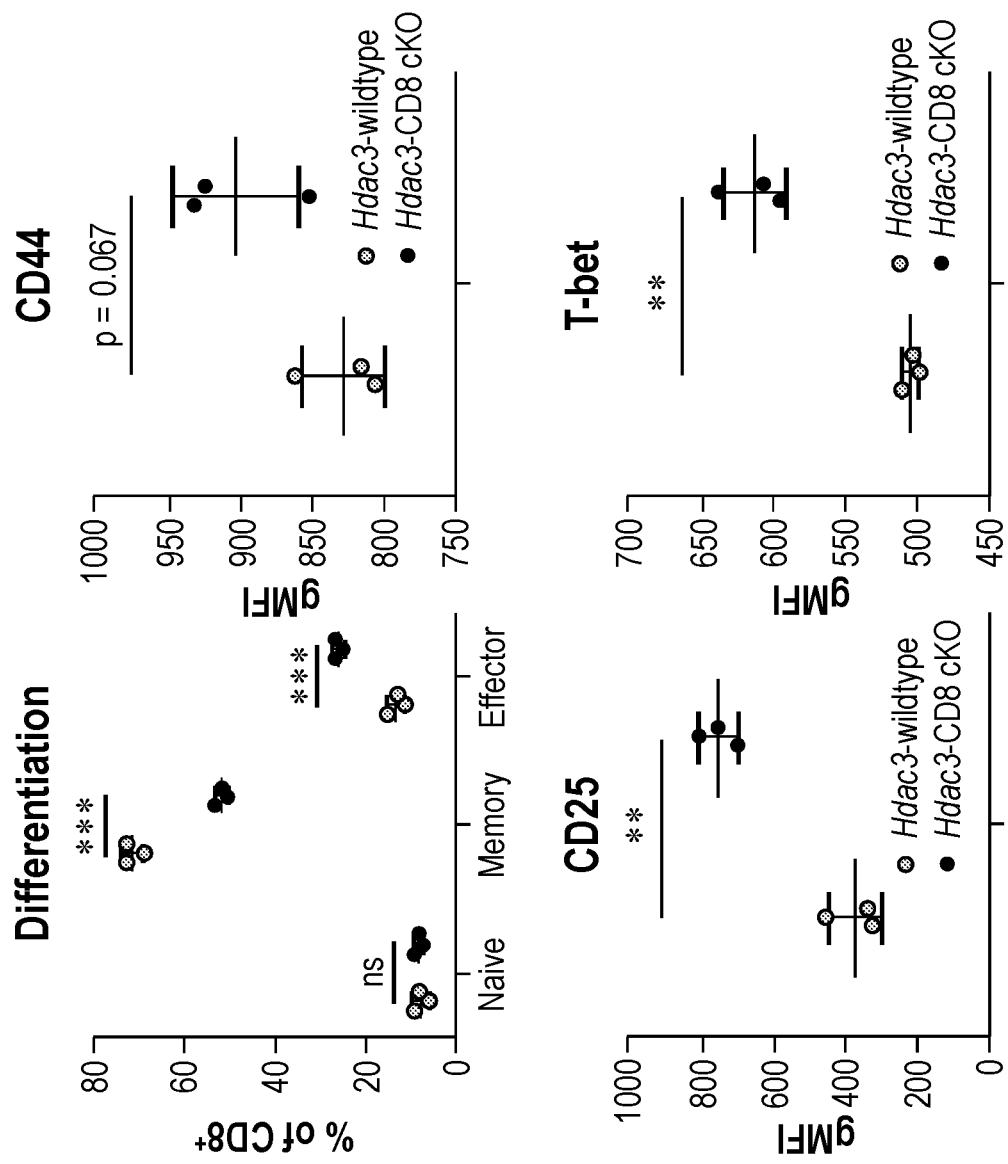
FIG. 11A shows dot plots of percentages of CD8$^+$ cells considered naïve, memory cells, or effector cells (gray/left hand clusters for each type are HDAC3-wildtype, while black/right hand clusters are HDAC3-CD8 cKO). The top right panel shows a dot plot of expression levels of the activation marker CD44. The lower left panel shows a dot plot of expression levels of the activation marker CD25. The lower right panel shows a dot plot of expression levels of the activation marker T-BET.
Figure 11B:
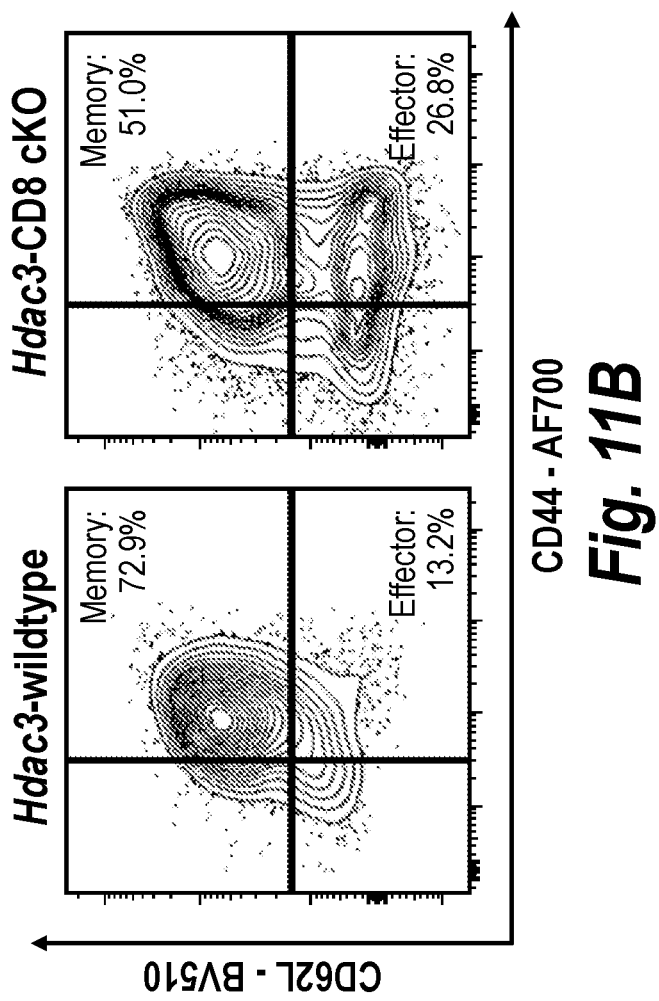
FIG. 11B shows scatterplots (top panel) of the flow cytometry results shown in FIG. 11A, for cells labeled for CD62L and CD44.
Figure 11C:
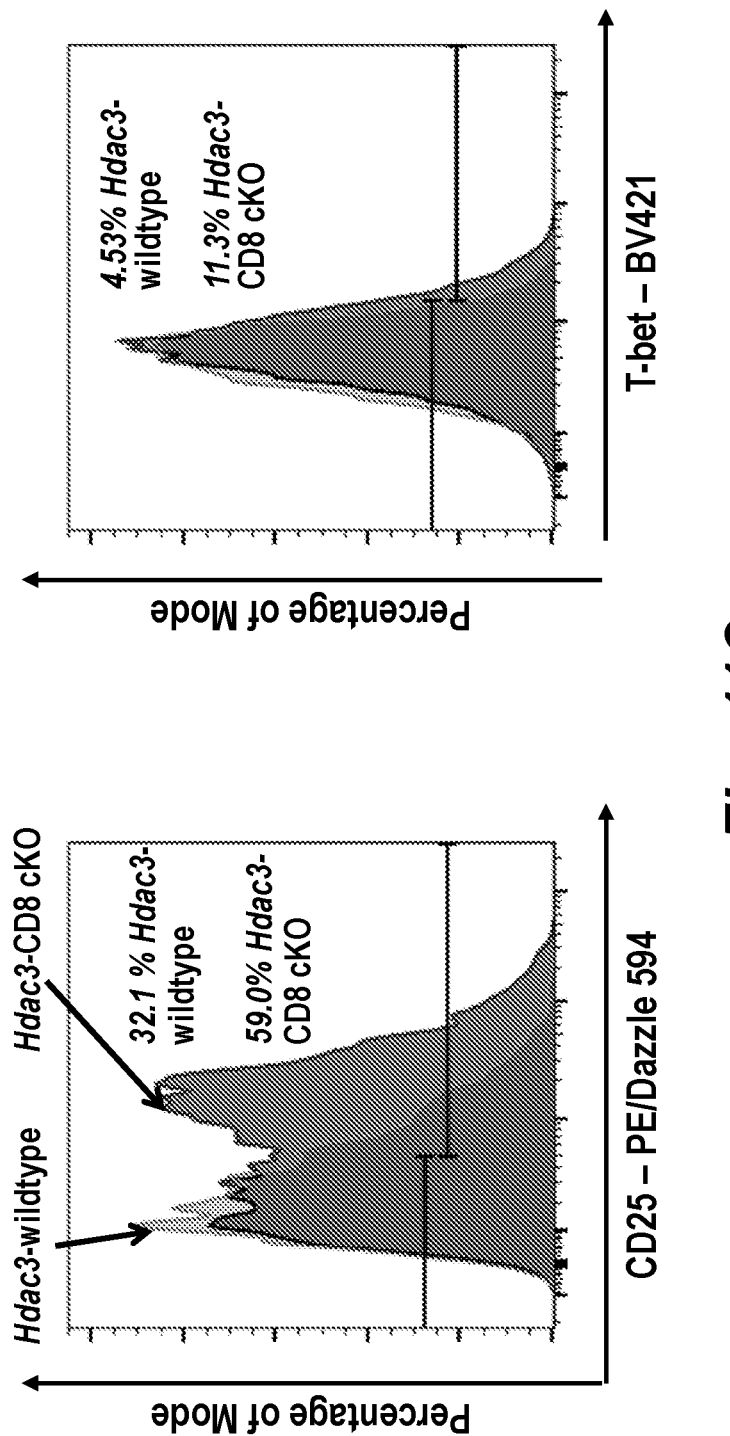
FIG. 11C shows normalized histograms of flow cytometry results for wildtype and HDAC3CD cKO cells labeled for activation markers CD25 and T-BET.

HDAC3-deficient and -wildtype OT-I+ CD8+ T cells were analyzed by flow cytometry after 7 days of in vitro activation for expression of markers associated with effector differentiation. The results are summarized in the graphs of FIG. 11A. Top left panel of FIG. 11A shows dot plots of percentages of CD8+ cells considered naïve, memory cells, or effector cells (gray/left hand clusters for each type are HDAC3-wildtype, while black/right hand clusters are HDAC3-CD8 cKO). The top right panel shows a dot plot of expression levels of the activation marker CD44. The lower left panel shows a dot plot of expression levels of the activation marker CD25. The lower right panel shows a dot plot of expression levels of the activation marker T-BET. FIG. 11B shows scatterplots (top panel) of the flow cytometry results shown in FIG. 11A, for cells labeled for CD62L and CD44. FIG. 11C shows normalized histograms of flow cytometry results for wildtype and HDAC3CD cKO cells labeled for activation markers CD25 and T-BET.

The differentiation of HDAC3-deficient CD8+ T cells was skewed towards an effector-like phenotype (CD62Llow CD44high) (see FIG. 11A, top left panel: see also FIG. 11B) at the expense of a memory-like phenotype (CD62Lhigh CD44high) relative to HDAC3-wildtype T cells (FIG. 11A, top left panel: see also FIG. 11B).

Furthermore, expression of markers of activation such as CD44 (see FIG. 11A, top right panel and FIG. 11C) and CD25 (see FIG. 11A, bottom left panel: see FIG. 11C) were also increased in HDAC3-deficient relative to HDAC3-wildtype CD8+ T cells, as was expression of the effector phenotype-associated transcription factor T-BET (FIG. 11A, bottom right panel: see FIG. 11C).

HDAC3-Deficiency Results in an Increase in CD8+ T Cell Effector Function

Figure 11D:
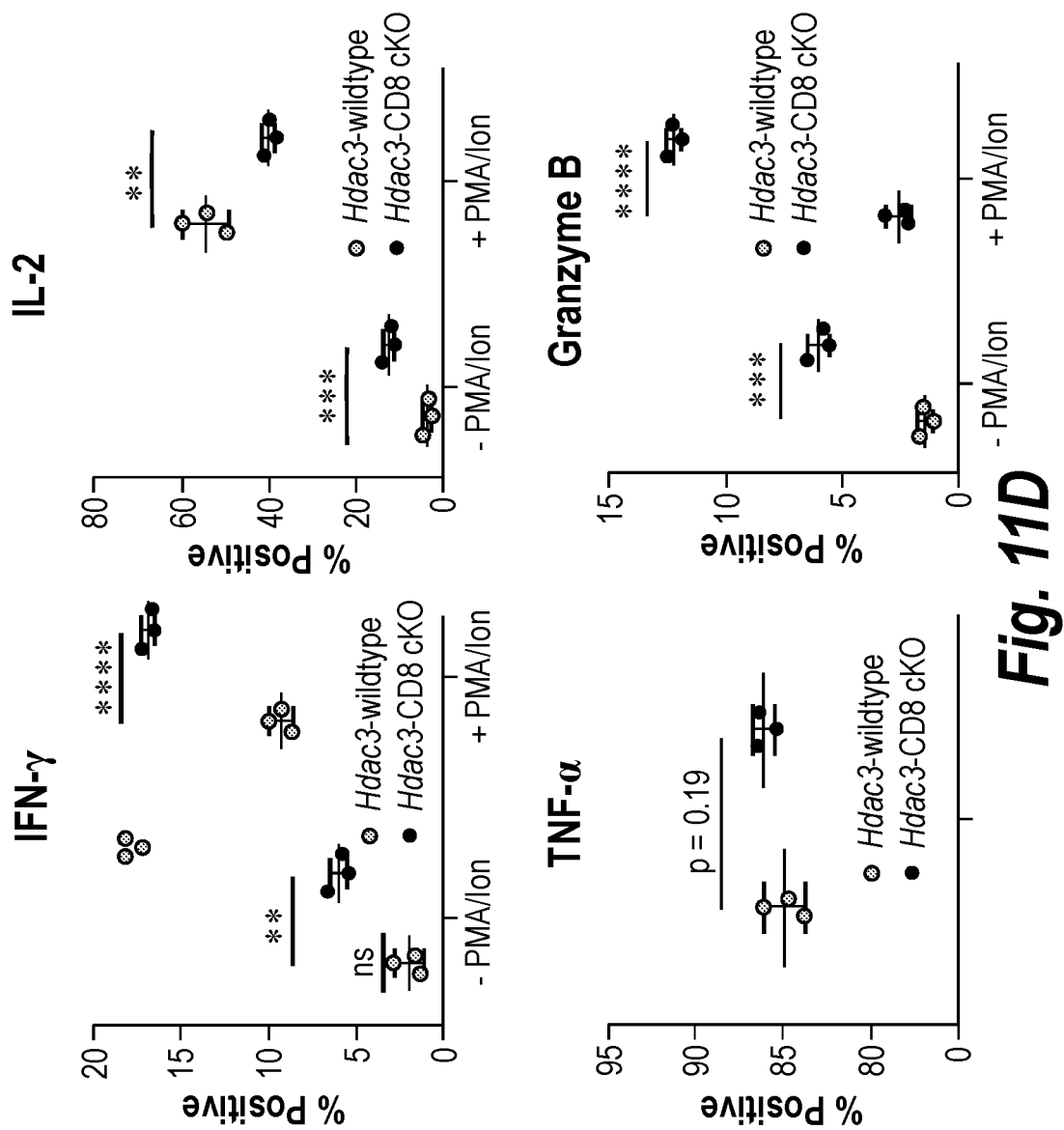
FIG. 11D, top panel, shows a dot plot of expression levels of the effector cytokine IFN-γ (gray/left hand clusters for each type are HDAC3-wildtype, while black/right hand clusters are HDAC3-CD8 cKO). The top right panel shows a dot plot of expression levels of the effector cytokine IL-2. The lower left panel shows a dot plot of expression levels of the effector cytokine TNF-α. The lower right panel shows a dot plot of expression levels of the cytotoxic mediator granzyme B.
Figure 11E:
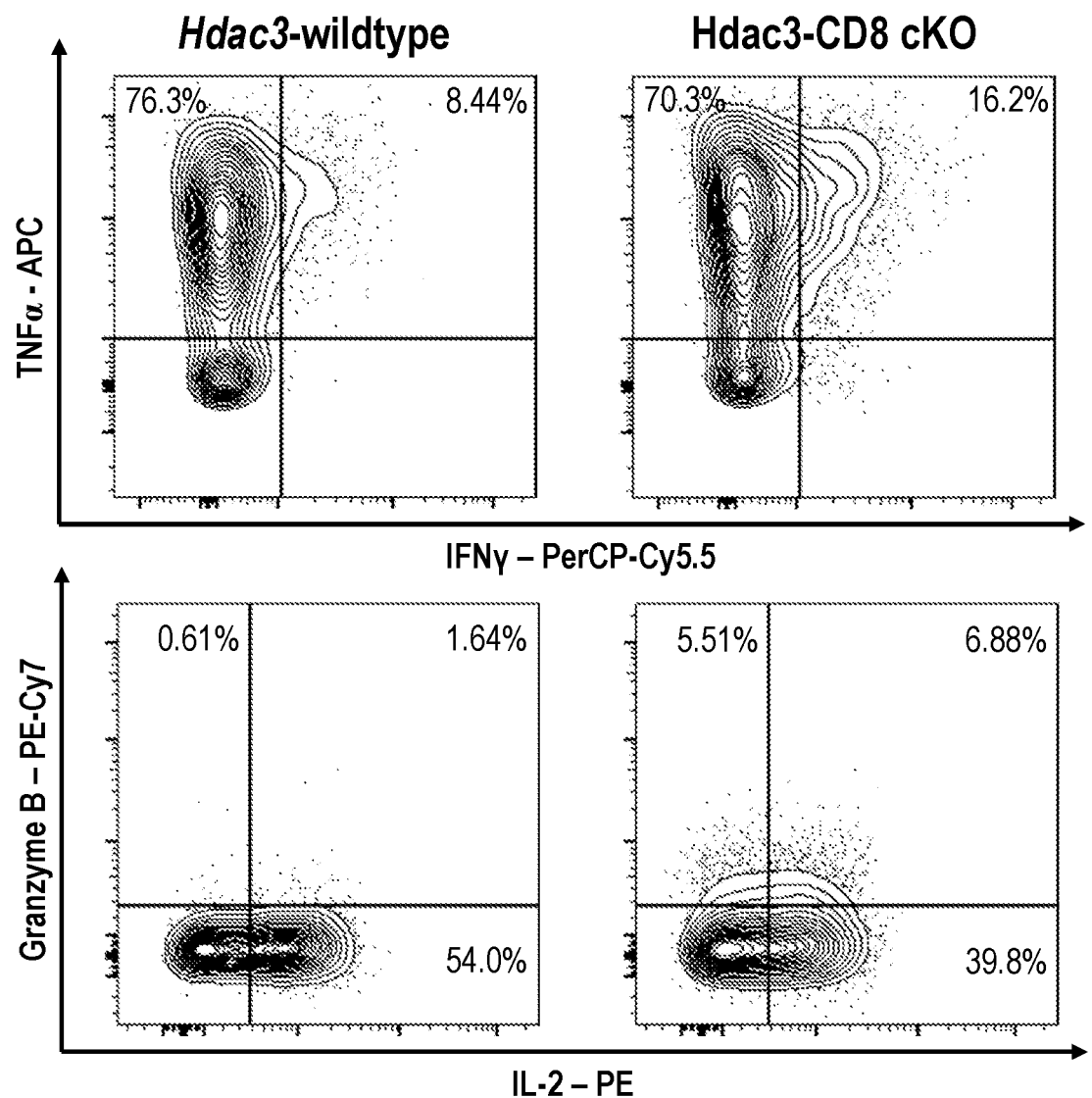
FIG. 11E shows the corresponding scatterplots from the flow cytometry data shown in FIG. 11D.

HDAC3-deficient and -wildtype OT-I+ CD8+ T cells were analyzed by flow cytometry after 7 days of in vitro activation for expression of markers of CD8+ T cell effector function (see Example 1 above). FIG. 11D summarizes the results in the four graphs. The top left panel of FIG. 11D shows a dot plot of expression levels of the effector cytokine IFN-γ (gray/left hand clusters for each type are HDAC3-wildtype, while black/right hand clusters are HDAC3-CD8 cKO). The top right panel shows a dot plot of expression levels of the effector cytokine IL-2. The lower left panel shows a dot plot of expression levels of the effector cytokine TNF-α. The lower right panel shows a dot plot of expression levels of the cytotoxic mediator granzyme B. FIG. 11E shows the corresponding scatterplots from the flow cytometry data shown in FIG. 11D.

It was found that HDAC3-deficient CD8+ T cells expressed increased levels of the effector cytokines IFN-γ and IL-2 as well as the cytotoxic mediator granzyme B even without in vitro restimulation with PMA/Ionomycin (C, –PMA/Ion). This was also true when the T cells were restimulated with PMA/Ionomycin (C, +PMA/Ion: D), although HDAC3-deficient CD8+ T cells had a reduced expression of IL-2 when restimulated. Expression of TNF-α was not significantly different between HDAC3-deficient and -wildtype CD8+ T cells.

HDAC3-Deficiency Augments CD8+ T Cell In Vitro Cytotoxicity Post-Activation

Figure 11F:
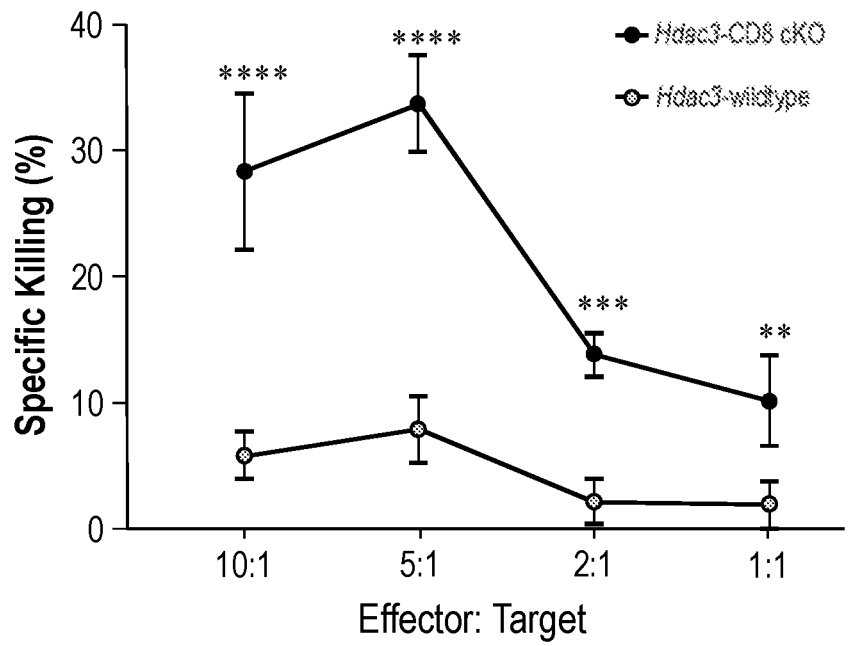
FIG. 11F is a line graph showing the percentage of specific lysis of SIINFEKL-pulsed BMDCs by activated OT-I$^+$ CD8$^+$ T cells from HDAC3-deficient and -sufficient littermates.

To evaluate the cytotoxic function of HDAC3-deficient CD8+ T cells, an in vitro cytotoxicity assay was performed with activated OT-I+ CD8+ T cells from HDAC3-deficient and -sufficient littermates as described in Example 3. FIG. 11F is a line graph showing the percentage of specific lysis of SIINFEKL-pulsed BMDCs by activated OT-I+ CD8+ T cells from HDAC3-deficient and -sufficient littermates. It was found that HDAC3—deficient CD8+ T cells killed B16 tumor cells more efficiently than their HDAC3-wildtype counterparts across all effector: target ratios tested.

Overall, these data with T cells from OT-I+ HDAC3-CD8 cKO mice strongly show that HDAC3 is a negative regulator of CD8+ T cell effector function.

Figure 12A:
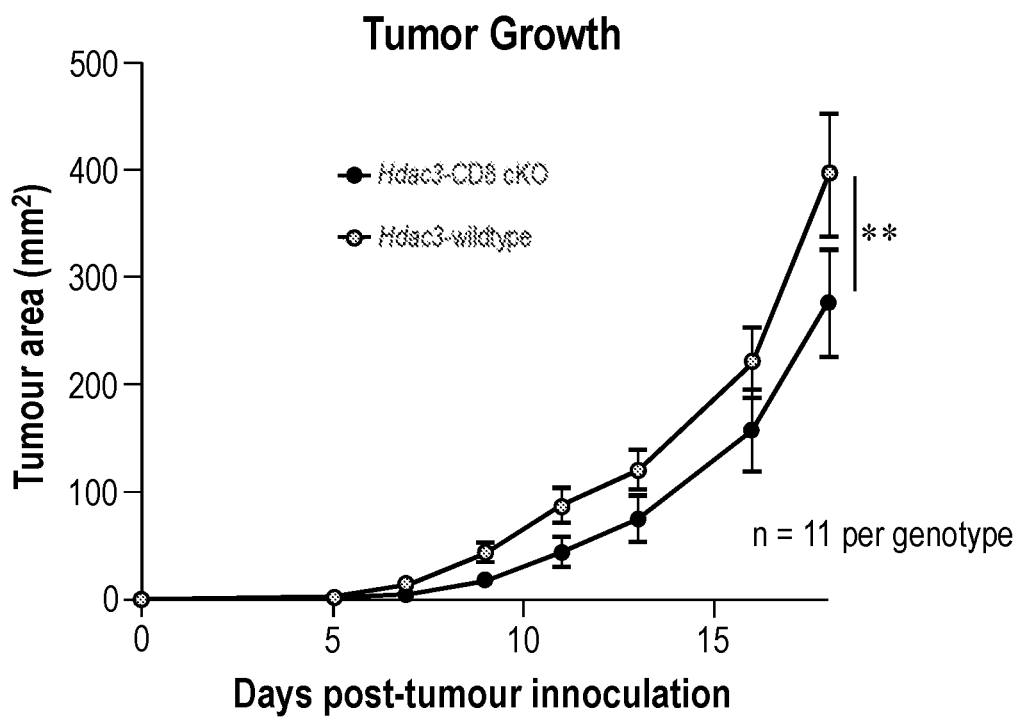
FIG. 12A is a line graph of tumor area (y-axis) plotted across days post-tumor inoculation (x-axis) for HDAC3-wildtype (gray/larger tumor area data points) and HDAC3-CD8 cKO mice (black/smaller tumor area data points).
Figure 12B:
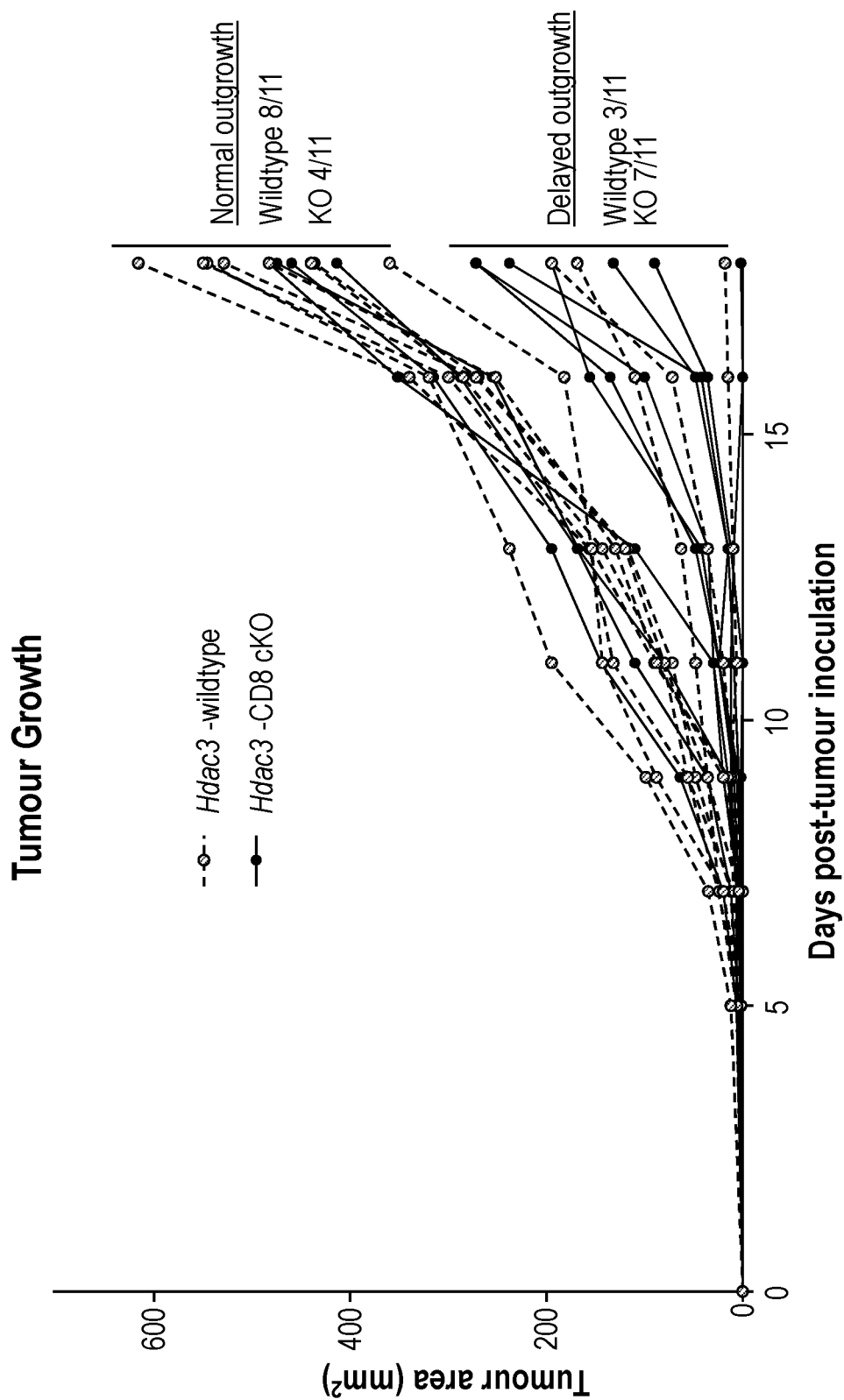
FIG. 12B is a more detailed analysis of tumor growth data shown in FIG. 12A, with data from each subject plotted individually (HDAC3-wildtype are gray data points and HDAC3-CD8 cKO mice are black data points).

Example 12: HDAC3-CD8 cKO Mice are More Resistant to Tumor Growth than HDAC3-Wildtype Mice To understand whether HDAC3 in CD8+ T cells plays a role in anti-tumor immunity, tumor growth kinetics were measured in a pre-clinical mouse model of melanoma. B16F10 melanoma tumor cells ($2 \times 10^5$) were inoculated subcutaneously into 6 to 7 week-old HDAC3-CD8 cKO and -wildtype littermates, pooled across 3 litters of first cousins, and measured the areas of the resulting tumors every alternate day beginning on day 5 when the tumors were first visible. The data presented here are characteristic of two independent experiments. FIG. 12A is a line graph of tumor area (y-axis) plotted across days post-tumor inoculation (x-axis) for HDAC3-wildtype (gray/larger tumor area data points) and HDAC3-CD8 cKO mice (black/smaller tumor area data points). FIG. 12B is a more detailed analysis of tumor growth data shown in FIG. 12A, with data from each subject plotted individually (HDAC3-wildtype are blue data points and HDAC3-CD8 cKO mice are red data points).

It was found that the average growth of B16F10 tumors was delayed in HDAC3-CD8 cKO mice relative to HDAC3-wildtype controls. However, there was no effective tumor control or rejection, and tumors in HDAC3-CD8 cKO mice eventually grew out to sizes comparable to those in HDAC3-wildtype mice, albeit with a delay of about 2 days.

Closer analysis of individual tumor growth curves (see individually plotted data points in FIG. 12B) revealed that whereas the majority (73%: 8/11) of tumors in HDAC3-wildtype hosts grew out with normal kinetics (gray data points), only 36% (4/11) of the tumors in HDAC3-CD8 cKO tumors grew out with similar kinetics (black data points).

Conversely, this trend was reversed in the tumors that grew out with delayed kinetics, with 27% (3/11) versus 64% (7/11) of tumors in HDAC3-wildtype and -CD8 cKO hosts, respectively. This 4-5 day delay before aggressive tumor outgrowth corresponded to approximately 20-25% of the total duration of tumor growth before the mice had to be euthanized.

HDAC3 plays a similar regulatory role in human CD8+ T cells as it does in mouse CD8+ T cells.

All references cited herein are incorporated herein by reference in their entirety and for all purposes to the same extent as if each individual publication or patent or patent application was specifically and individually indicated to be incorporated by reference in its entirety for all purposes.

SEQUENCE LISTING

```
<160> NUMBER OF SEQ ID NOS: 1

<210> SEQ ID NO 1
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 1

Ser Ile Ile Asn Phe Glu Lys Leu
1               5
```

These data demonstrate that loss of HDAC3 in the CD8+ T cell compartment confers an initial resistance to tumor growth, but that this resistance is probably not sufficiently durable or effective to allow for complete recovery or tumor control.

Figure 13A:
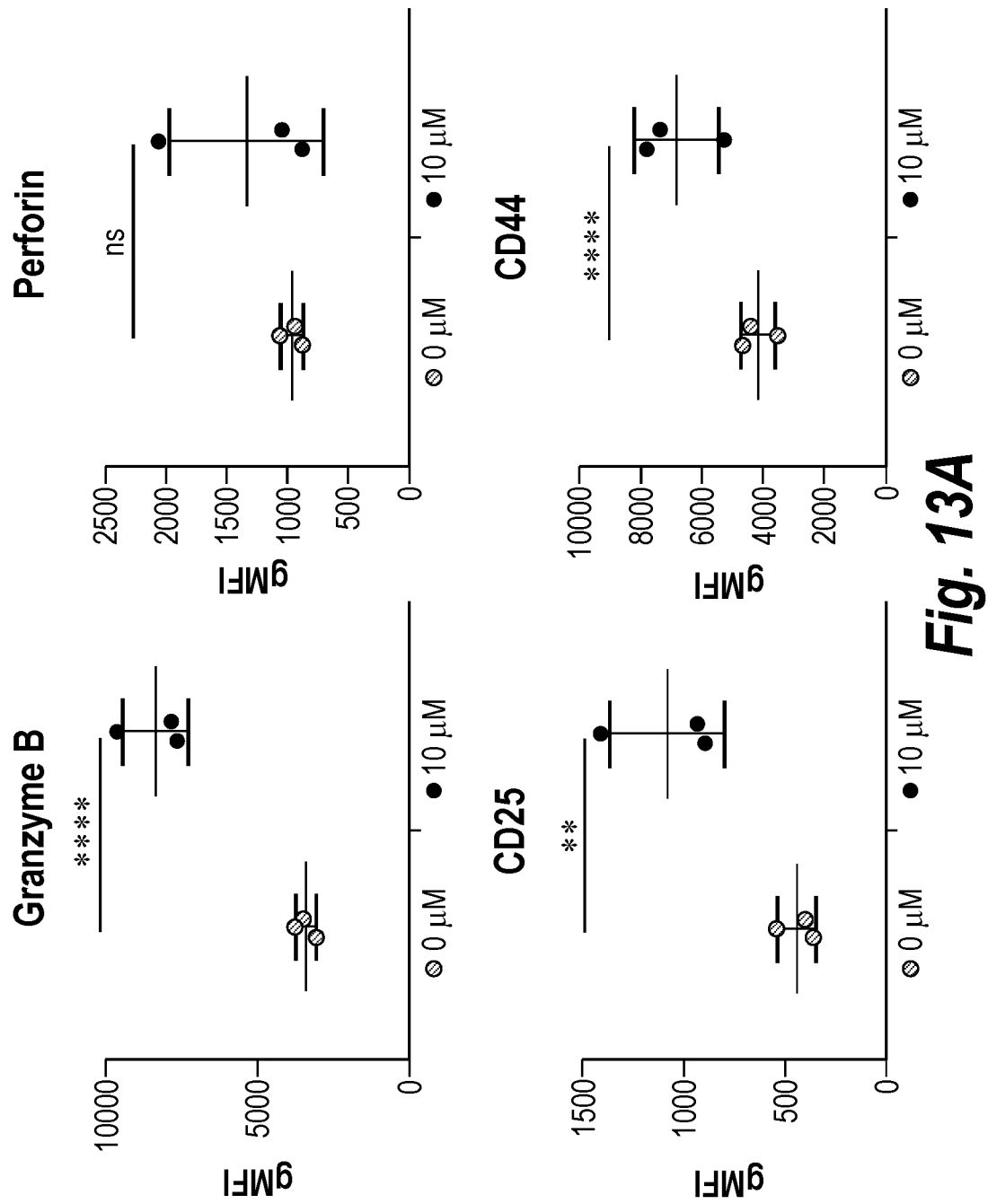
FIG. 13A, top left panel, shows cellular expression of the cytotoxic mediator granzyme B in human cytotoxic T cells treated with RGFP966 (gray/left hand clusters for each type are 0 μM control-treated cells, while black/right hand clusters are 10 μM RGFP966-treated cells). The top right panel shows cellular expression of the cytotoxic mediator perforin in human cytotoxic T cells treated with RGFP966. The bottom left panel shows expression levels of effector differentiation marker CD25 in human cytotoxic T cells treated with RGFP966. The bottom right panel shows expression levels of the activation marker CD44 in human cytotoxic T cells treated with RGFP966.
Figure 13B:
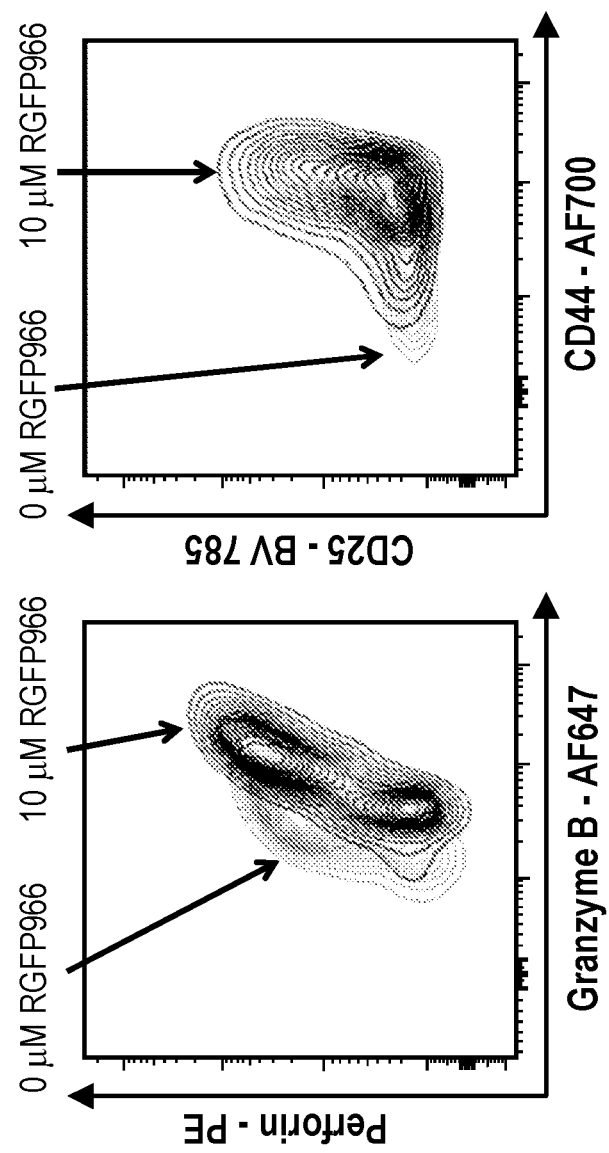
FIG. 13B shows scatterplots of the flow cytometry results of FIG. 13A, with control-treated human cytotoxic T cells indicated by the arrows (light gray), and the 10 μM RGFP966-treated human cytotoxic T cells indicated by the arrows (dark gray).

Example 13: HDAC3 Regulates Markers of Cytotoxicity in Human CD8+ T Cells Post-Activation Further investigation was conducted to discover whether the augmented cytotoxic effector phenotype observed in mouse CD8+ T cells post-activation with HDAC3 inhibition was also true in human CD8+ T cells. Total CD8+ T cells were negatively isolated from the peripheral blood of healthy human donors, and activated in vitro using plate-bound anti-CD3 and soluble anti-CD28 antibodies in the presence or absence of 0 µM (vehicle control) or 10 µM RGFP966. Following 7 days of in vitro activation, without additional IL-2 supplementation, CD8+ T cells were analyzed by flow cytometry for expression of markers associated with T cell activation, effector cytokines, and cytotoxicity. The results are summarized in the graphs of FIG. 13A. The top left panel of FIG. 13A shows expression levels of the cytotoxic mediator granzyme B (gray/left hand clusters for each type are 0 µM control-treated cells, while black/right hand clusters are 10 µM RGFP966-treated cells). The top right panel shows expression levels of the cytotoxic mediator perforin. The bottom left panel shows expression levels of effector differentiation marker CD25. The bottom right panel shows expression levels of the activation marker CD44. FIG. 13B shows scatterplots of the flow cytometry results, with control-treated cells indicated by the arrows (light gray), and the 10 µM RGFP966-treated cells indicated by the arrows (dark gray).

It was found that, similar to mouse CD8+ T cells, HDAC3 inhibition during activation of human CD8+ T cells resulted in an upregulation of the activation markers CD25 and CD44, as well as in expression of the cytotoxic molecule granzyme B, although not of perforin. These data show that

What is claimed is:

1. A method for increasing T cell effector function in a T cell population, the method comprising contacting a T cell in the T cell population with a pharmaceutical composition comprising a histone deacetylase 3 (HDAC3) antagonist, wherein the HDAC3 antagonist is RGFP966 and wherein the effect of RGFP966 on T cell effector function is dose-dependent T cell cytotoxicity,
   wherein the pharmaceutical composition comprises a delivery vehicle that is a nanoparticle, and
   wherein the nanoparticle comprises a moiety that specifically binds to a T cell.

2. The method of claim 1, wherein the T cell is a CD8+ T cell.

3. The method of claim 1, wherein the HDAC3 antagonist reduces the activity of the HDAC3 protein in the T cell by at least 50%, 60%, 70%, 80%, 90%, 95%, or 99%.

4. The method of claim 3, wherein the half maximal inhibitory concentration (IC50) of the HDAC3 antagonist in reducing the activity of HDAC3 is smaller than the IC50 of the HDAC3 antagonist in reducing the activity of HDAC1, HDAC2, or HDAC8 proteins.

5. The method of claim 4, wherein the IC50 of the HDAC3 antagonist in reducing the activity of HDAC3 protein is smaller than each of the IC50s of the antagonist in reducing the activity of HDAC1, HDAC2, and HDAC8 proteins.

6. The method of claim 5, wherein the IC50 of the HDAC3 antagonist in reducing the activity of HDAC3 protein is smaller than each of the IC50s of the HDAC3 antagonist in reducing the activity of HDAC1, HDAC2, HDAC4, HDAC5, HDAC6, HDAC7, HDAC8, HDAC9, HDAC10, HDAC11, SIRT1, SIRT2, SIRT3, SIRT4, SIRT5, SIRT6, and
   SIRT7 proteins.

7. The method of claim 1, wherein the HDAC3 antagonist reduces the amount of the HDAC3 protein in the T cell by at least 50%, 60%, 70%, 80%, 90%, 95%, or 99%.

8. A method for increasing T cell effector function in a subject, the method comprising administering to the subject a therapeutically effective amount of a pharmaceutical composition comprising an HDAC3 antagonist, wherein the HDAC3 antagonist is RGFP966, and wherein the effect of RGFP966 on T cell effector function is dose-dependent T cell cytotoxicity, wherein the pharmaceutical composition comprises a delivery vehicle that is a nanoparticle, and wherein the nanoparticle comprises a moiety that specifically binds to a T cell.

* * * * *